3,598,801
WATER-SOLUBLE AZO-PYRIMIDINE DYESTUFFS
Fabio Beffa, Basel, and Paul Lienhard, Herbert Seiler, Hans Ackermann, and Hans E. Wegmüller, Rienhen, Switzerland, assignors to J. R. Geigy A.G., Basel, Switzerland
No Drawing. Filed Jan. 8, 1968, Ser. No. 696,115
Claims priority, application Switzerland, Jan. 9, 1967, 316/67
Int. Cl. C09b 29/36, 62/24; D06p 1/06
U.S. Cl. 260—154                                            5 Claims

ABSTRACT OF THE DISCLOSURE

Water-soluble azo-pyrimidine dyestuffs obtained by coupling diazo or tetrazo compounds derived from aromatic monoamines or diamines in an equivalent ratio of about 1:1 with an optionally substituted 2,4,6-triamino-pyrimidine compound which can be coupled in the 5-position, or in an equivalent ratio of 1:2 with identical or different 2,4,6-triamino-pyrimidine compounds of this type, or with one equivalent of such a triamino-pyrimidine compound and one equivalent of another coupling component and, in the case of coupling components containing diazotizable amino groups, the disazo dyestuffs resulting from coupling such diazotized aminoazo-pyrimidine dyestuffs with another coupling component, or dyestuffs obtained by coupling two equivalents of the aforesaid diazotized monoamines with a coupling component comprising two pyrimidyl nuclei linked together via a hydrazino bridge or via certain organic bridge members, the components being so chosen that the final dyestuff contains at least one salt-forming, water solubilizing group which dissociates acid in water and at least three rings per molecule, which are not fused with one another, and of which preferably at least two are carbocyclic or heterocyclic and of aromatic character and the third can be aromatic, or a partly unsaturated or a saturated alicyclic ring. Said dyestuffs produce polyamide dyeings having good fastness to light and abrasion and excellent wet-fastness properties and when they contain fiber-reactive substituents, the azo-pyrimidine dyestuffs can also be used for the dyeing of cellulose fibers on which they afford dyeings having good wet-fastness properties, especially fastness to washing.

DESCRIPTION OF THE INVENTION

The present invention concerns new, water-soluble azo-pyrimidine dyestuffs, a process for the production thereof, their use for the dyeing of organic material, particularly for the dyeing of polyamide-containing fiber material, as well as, as industrial product, the organic material dyed with the aid of these dyestuffs.

It has been found that technically valuable, water-soluble azo-pyrimidine dyestuffs are obtained when diazo or tetrazo compounds from aromatic monoamines or diamines are coupled with 1 equivalent of an optionally substituted 2,4,6-triamino-pyrimidine compound which can be coupled in the 5-position or with 2 equivalents of identical or different 2,4,6-triamino-pyrimidine compounds of this type, or with one equivalent of such a triamino-pyrimidine compound and 1 equivalent of any other coupling compound desired and, if the coupling components contain amino groups which can be diazotized, then optionally, the aminoazo-pyrimidine dyestuffs obtained are diazotized and again coupled with any coupling component desired, the components being so chosen that the end dyestuff contains at least one salt-forming, water solubilizing group which dissociates acid in water and at least three rings which are not fused with one another.

The desired wet-fastness and, to some extent also, the light-fastness properties required of dyeings obtained with such dyestuffs demand that the water-soluble azopyrimidine dyestuffs according to the invention contain at least three rings, which are not fused with one another and of which at least two are of aromatic character and the third can also be partly unsaturated or alicyclic. These can be both carbocycles as well as heterocycles.

By soft-forming, water solubilizing groups which dissociate acid in water is meant, chiefly, the sulfonic acid group, in addition however, also the carboxyl group, acylated sulfonic acid amide groups such as alkyl- or aryl-disulfimide groups or alkyl- or aryl-carbonylsulfimide groups, as well as sulfate groups, sulfinic, phosphinic or phosphonic acid groups. Both the diazo and the coupling components can contain these water solubilizing groups.

Azo-pyrimidine dyestuffs according to the invention, are suitable for the dyeing and printing, optionally in the presence of polyfunctional fixing agents, of leather, paper and fiber material of the most various types such as native or regenerated cellulose, particularly however, of natural and synthetic polypeptide textile material such as wool, silk, synthetic polyamide and polyurethane fibers. For polypeptide fibers, azo-pyrimidine dyestuffs according to the invention are used which, in particular, contain one or two acid, salt-forming groups, particularly sulfonic acid groups and, optionally, a substituent which promotes water solubility but which does not dissociate acid in water, e.g. a lower alkylsulfonyl or sulfonic acid amide radical, or a sulfonic acid amide group substituted by lower alkyl radicals.

Sometimes the water solubility of such dyestuffs is increased by the admixture of anion active or non-ionogenic wetting or dispersing agents or of diluting agents.

These new dyestuffs have very good affinity particularly to synthetic polyamide fibers such as nylon, Perlon, Banlon; they draw evenly onto this material from a neutral to acid bath and produce level dyeings some of which are free from streatliness or brilliant. In addition, some of the dyestuffs are distinguished by good migration power. It is surprising that mixed fabric of nylon and wool is often dyed in the same shade.

Azo-pyrimidine dyestuffs according to the invention have great color strength and pure shades. The dyeings attained therewith are yellow, orange, red, violet and brown. Polyamide dyeings are particularly distinguished by good fastness to light and abrasion and excellent wet-fastness properties, e.g. good fastness to washing, water, milling, chlorine, alkali, carbonizing, decatizing and perspiration.

When the azo-pyrimidine dyestuffs according to the invention contain fiber-reactive groupings, they can also be used for the dyeing and printing of materials containing hydroxyl and/or amino groups, e.g. wool or nylon, particularly, however, for the dyeing of cellulose material such as spun rayon, jute, ramie, hemp and, chiefly, cotton. To attain sufficient solubility of fiber-reactive dyestuffs according to the invention, the latter should generally contain in the dyeing of polyamide fibers, at least two, preferably however, 3, or, in the dyeing of cellulosic fibers, at least 2 to 6 water solubilizing groups which dissociate acid in water, such as sulfonic acid groups, in the molecule.

In a first aspect, the invention provides more in particular monoazo dyestuffs of the formula

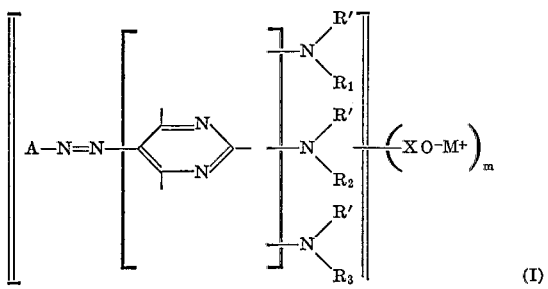

the molecule of which dyestuffs contains at least three six-membered aromatic rings which are not fused with one another and one of which is the above pyrimidine ring, and in which Formula I A represents (a) an optionally substituted naphthyl radical any substituents of which are selected from chlorine, bromine, and a grouping

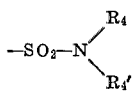

wherein each of $R_4$ and $R_4'$ represents hydrogen, lower alkyl or hydroxy-lower alkyl; (b) pyridyl-(3); (c) benzotriazolyl-(4); (d) quinolyl-(8); (e) benzothiazolyl-(2); (f) 6-lower alkoxy-benzothiazolyl-(2); or (g) an optionally substituted phenyl radical any substituents of which, apart from $—XO^-M^+$ groups, are selected from halogen, cyano, lower alkyl, trifluoromethyl, hydroxy-lower alkyl, lower alkoxy-lower alkyl, lower alkanoyloxy-lower alkyl, lower alkyl substituted by $—COO^-M^+$, lower alkoxycarbonyl-lower alkyl, cyano-lower alkyl, lower alkoxy, an optionally substituted phenoxy radical, lower alkylthio, phenylthio, lower alkanoyl, an optionally substituted benzoyl radical, lower alkoxycarbonyl, phenoxycarbonyl, lower alkylsulfonyl, an optionally substituted phenylsulfonyl radical, an optionally substituted phenoxysulfonyl radical, the group $—CH_2—NH—CO—L$, the grouping

and the grouping

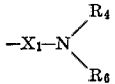

in which groupings

L represents lower alkyl, lower alkenyl, halogeno-lower alkyl, halogeno-lower alkenyl, phenyl or halogenophenyl, $X_1$ represents $SO_2$ or $CO$, $R_4$ has the aforesaid meaning, $R_5$ represents phenyl, lower alkanoyl, an optionally substituted benzoyl radical, lower alkoxycarbonyl, lower alkylsulfonyl, or an optionally substituted phenylsulfonyl radical, $R_6$ represents hydrogen, lower alkyl, hydroxy-lower alkyl, an optionally substituted benzyl, cyclohexyl, phenylsulfonyl or benzoyl radical, or an optionally substituted phenyl radical any substituent of which is selected from lower alkyl, chlorine and bromine;

Each $R'$, independently, represents hydrogen or lower alkyl;

$R_1$ represents hydrogen, alkyl of from 1 to 8 carbonatoms, hydroxy-lower alkyl, lower alkoxy-lower alkyl, an optionally substituted benzyl radical, cyclohexyl, or an optionally substituted phenyl radical any substituent of which is selected from lower alkyl and lower alkoxy;

$R_2$ represents the same substituents as $R_1$ or lower alkyl substituted by one of the groups $—X_1O^-M^+$, an optionally substituted naphthyl radical any substituents of which are selected from chlorine, bromine and the group

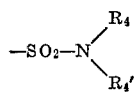

wherein each of $R_4$ and $R_4'$ represents hydrogen, lower alkyl or hydroxy-lower alkyl, or an optionally substituted phenyl radical bearing a substitution exclusively selected from halogen, lower alkylsulfonyl, an optionally substituted phenylsulfonyl radical, lower alkanoyl, an optionally substituted benzoyl or phenoxy radical, or the aforesaid grouping

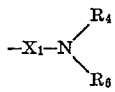

or the aforesaid grouping $—CH_2—NH—CO—L$;

$R_3$ represents a substituent as defined under $R_2$ or aminophenyl, nitrophenyl, lower alkylthiophenyl, phenylthiophenyl, pyridinyl-(3), benzotriazolyl-(4) or quinolinyl-(8); or from one to three of the substituents

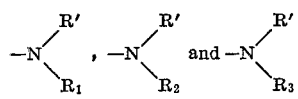

represent aziridino, pyrrolidino, piperidino, hexamethyleneimino or morpholino; any substituents in the benzene nuclei of any of the aforesaid benzyl, benzoyl, phenoxy, phenylsulfonyl and phenoxysulfonyl radicals being selected, apart from any group $—XO^-M^+$, from chlorine, bromine and lower alkyl, and "halogen" having an atomic number of at most 35;

X represents $SO_2$, $CO$ or $PO(O^-M^+)$;

$M^+$ represents one equivalent weight of a colorless cation; and $m$ represents a number ranging from 1 to 2; each grouping $—XO^-M^+$ in Formula I and all subsequent formulas being linked to an aromatic ring carbon atom, unless defined otherwise in a specific grouping.

The definitions given for a symbol in Formula I and those newly occurring in subsequent formulas apply to that same symbol in all later formulas, unless expressly stated otherwise.

All substitutions of aromatic nuclei listed above in connection with Formula I and hereinafter in connection with subsequent formulas in this specification and the appended claims are understood to be apart from any groups $—XO^-M^+$ which may be present as substituents of such aromatic nuclei. Where water-solubilizing substituents have been specifically listed, e.g. as substituents of alkyl groups, etc., they are included in the total of such groups mentioned in connection with each formula.

Dyestuffs according to the invention, which are particularly preferred because dyeings on Banlon material (especially nylon fabrics made of crimp yarn) free from streaks can be obtained with these dyes, unexpectedly even when no anionic dye assistants are employed, and because of the good light fastness and fastness to wet treatments of dyeings on polyamide fibers, are those falling under Formula I wherein:

A represents monochlorophenyl, dichlorophenyl, monobromophenyl, dibromophenyl, lower alkyl-monochlorophenyl, lower alkyl-sulfonyl-phenyl, lower alkyl-lower alkylsulfonylphenyl, carboxyphenyl, cyanophenyl, trifluoromethylphenyl, lower alkoxycarbonylphenyl, carbamoylphenyl, N,N-(di-lower alkyl)-carbamoyl-phenyl, N-lower alkyl-carbamoyl-phenyl, sulfamoyl-phenyl, N,N-(di-lower alkyl)-sulfomoylphenyl, lower alkyl-N,N-(di-lower alkyl)-sulfamoyl-phenyl, sulfamoylchloro-phenyl, N-lower alkyl-sulfamoyl-phenyl, lower alkyl-N-lower alkyl-sulfamoyl-phenyl;

$R'$ represents hydrogen, $R_1$ represents phenyl or lower alkylphenyl, or lower alkoxyphenyl and each of $R_2$ and $R_3$ represents hydrogen or lower alkyl; one of said groups $—XO^-M^+$ being a group wherein X represents $SO_2$ and which is linked to a ring carbon atom of $R_1$.

In a second aspect, the invention provides disazo and triazo dyestuffs of the formula

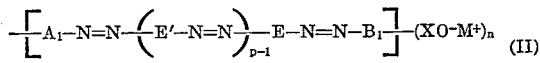 (II)

wherein:

$A_1$ represents naphthyl or an optionally substituted phenyl radical any substituent of which, apart from any group $-XO^-M^+$, is selected from chlorine, bromine, nitro, cyano, trifluoromethyl, lower alkyl, lower alkoxy, lower alkanoyl, lower alkylsulfonyl, and a grouping

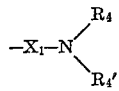

wherein $X_1$ represents CO or $SO_2$ and each of $R_4$ and $R_4'$ represents hydrogen, lower alkyl or hydroxy-lower alkyl;

$p$ represents one of the integers 1 and 2; each of E and $E'$ represents naphthylene, or an optionally substituted phenylene radical any substituent of which, apart from groups $-XO^-M^+$, is selected from lower alkyl, lower alkoxy, lower alkylsulfonylamino, lower alkanoylamino, an optionally substituted benzoylamino or phenylsulfonylamino radical any substituents of which benzoylamino and phenylsulfonylamino radicals are those defined in Formula I;

$B_1$ represents a coupling compound of the formula

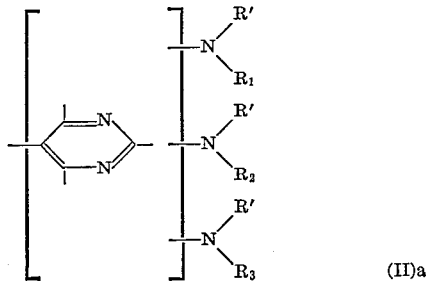 (II)a wherein:

$R'$, $R_1$, $R_2$, $R_3$, X and $M^+$ have the same meanings as given in Formula I, While $n$ represents a number ranging from 1 to 4.

In this and subsequent formulas the two substituents of each of the three amino nitrogen atoms at the pyrimidyl nucleus preferably do not form a heterocycle with the nitrogen atom.

Particularly preferred disazo dyestuffs falling under Formula II which are distinguished by particularly good drawing power on polyamide fibers from neutral to weakly acid dyebaths are those in which $p$ is 1 and $n$ ranges from 1 to 3.

When $p$ is 2, $n$ ranges preferably from 2 to 4. These two dyestuff subclasses are distinguished by good solubility in aqueous dyebaths.

Preferably, the groupings

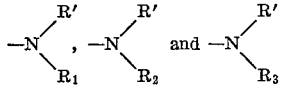

in the disazo and trisazo dyestuffs of Formula II and all subsequently described disazo and trisazo dyestuffs according to the invention are non-cyclic groups.

In a third aspect, the invention provides disazo dyestuffs of the formula

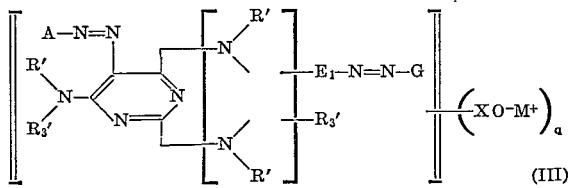 (III)

wherein:

A, $M^+$, $R'$ and X have the same meanings as in Formula I;

Each $R_3'$ herein and in the following represents hydrogen, lower alkyl, cyclohexyl, benzyl, phenyl, lower alkylphenyl or lower alkoxyphenyl;

$E_1$ represents naphthylene, diphenylene or an optionally substituted phenylene radical any substituent of which is selected from halogen, $-XO^-M^+$, lower alkyl and lower alkoxy;

G represents a grouping selected from (a) a phenyl radical substituted by hydroxy or an amino group of the formula

or both, any further substituent of said phenyl radical being selected from chlorine, bromine, and lower alkyl; (b) a naphthyl radical substituted by hydroxy or an amino group of the formula

or both; (c) a residue of the formula

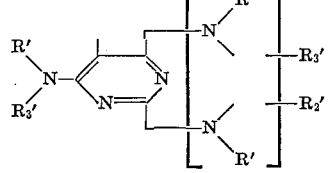 (IIIa)

wherein $R_2'$ represents hydrogen, unsubstituted lower alkyl, lower alkyl substituted by a group $-X_1O^-M^+$, cyclohexyl, benzyl, or an optionally substituted phenyl radical any substituent of which is selected from lower alkyl, lower alkoxy, halogen, lower alkyl-sulfonyl, a grouping $-XO^-M^+$, a grouping

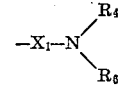

an optionally substituted phenoxy radical and an optionally substituted phenylsulfonyl radical; any substituents in the benzene nuclei of all aforesaid benzyl, benzoyl, phenoxy, phenylsulfonyl and phenoxysulfonyl radicals being selected from chlorine, bromine and lower alkyl; and "halogen" having an atomic number of at most 35; (d) a radical of the formula

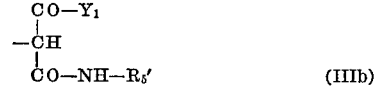 (IIIb)

wherein:

$Y_1$ represents lower alkyl or phenyl, and $R_5'$ represents hydrogen, lower alkyl, or an optionally substituted phenyl radical any substituents of which are selected from lower alkyl, chlorine and bromine; and (e) a radical of the formula

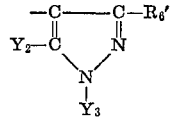 (IIIc)

wherein:

$Y_2$ represents hydroxy or amino, $R_6'$ represents lower alkyl, $-(COO^-M^+)$ or phenyl, $Y_3$ represents naphthyl, or an optionally substituted phenyl radical any substituent of which is selected from chlorine, bromine, nitro, lower alkyl, the grouping

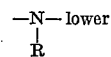

alkanoyl, $-XO^-M^+$ and the grouping

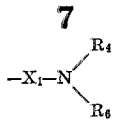

wherein $X_1$, $R_4$ and $R_6$ have the aforesaid meanings; and $q$ represents a number ranging from 1 to 3, and includes substituents $—COO^-M^+$ mentioned above.

In a fourth aspect, the invention provides disazo dyestuffs of the formula

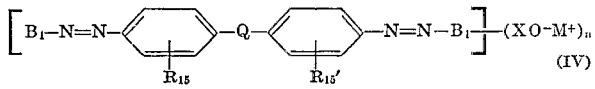

wherein:

Q represents a linking member selected from a single direct carbon-to-carbon bond, $—O—$, $—S—$,

alkylene of from 1 to 3 carbon atoms, cyclohexylene, $—CH=CH—$, $—CO—$, $—SO—$, $—SO_2—$, $—CO—CO—$, $—CO—$alkylene$—CO—$ of a total of from 4 to 5 carbon atoms, $—CO—$alkenylene$—CO—$ of a total of from 4 to 5 carbon atoms, $—SO_2—O—$,

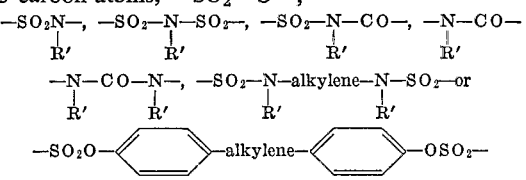

wherein alkylene has from 1 to 4 carbon atoms,

Each of R  Each of $R_{15}$ and $R_{15}'$ represents from 1 to 2 substituents selected from hydrogen, lower alkyl, lower alkoxy, lower alkylsulfonyl, chlorine or bromine and

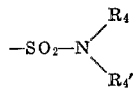

and

Each $B_1$ represents an identical coupling components as defined in Formula II, All other symbols having the same meaning as given for them in connection with preceding formulas.

In a fifth aspect, the invention provides disazo dyestuffs of the formula

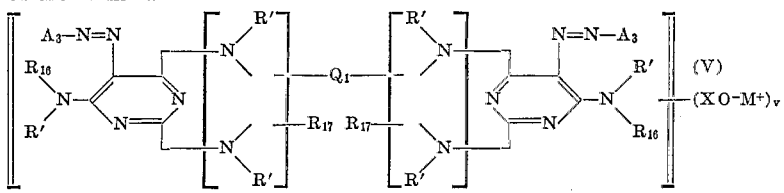

wherein:

$Q_1$ represents a linking member selected from a single direct nitrogen-to-nitrogen bond, alkylene of from 1 to 5 carbon atoms, alkylene-O-alkylene of a total of from 2 to 6 carbon atoms, alkylene-S-alkylene of a total of from 2 to 6 carbon atoms, cyclohexylene or phenylene, One of $R_{16}$ and $R_{17}$ represents hydrogen, lower alkyl, hydroxy-lower alkyl, cyclohexyl or benzyl, and the other represents hydrogen, lower alkyl, cyclohexyl, benzyl, lower alkyl substituted by $—XO^-M^+$, phenyl, lower alkyl-phenyl, halogeno-phenyl, phenoxy-phenyl, phenylsulfonyl-phenyl, lower alkoxy-phenyl or naphthyl, $A_3$ represents an optionally substituted phenyl radical any substituent of which is selected, apart from groups $—XO^-M^+$, from lower alkyl, halogen, trifluoromethyl, nitro, cyano, lower alkylsulfonyl, an optionally substituted phenylsulfonyl radical, or a grouping

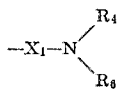

$v$ represents a number ranging from 2 to 4; and all other symbols have the same meaning as given for them in connection with preceding formulas.

In a sixth aspect, the invention provides fiber-reactive monoazo dyestuffs containing per molecule from one to two fiber-reactive groupings

and a total of from two to five water-solubilizing groupings $—XO^-M^+$ as well as at least three separate six-membered aromatic rings which are not fused with one another and at least one of which is a pyrimidine ring, said dyestuff being of the formula $$A_2—N=N—B \quad (VI)$$

$A_2$ represents: (i) a diazo component selected from (a) a component A as defined in connection with Formula I (ii) a diazo component of the formula

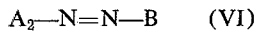

wherein:

Z herein and in all subsequent formulas of fiber-reactive dyes represents a fiber-reactive substituent which will be defined in more detail further below;

R' has the meaning given hereinbefore; and $A_2'$ represents an optionally substituted phenylene radical any substituents of which are selected, apart from any groups $—XO^-M^+$ and $—NR'—Z$, from lower alkyl, lower alkoxy, an optionally substituted phenoxy radical, lower alkylsulfonyl, an optionally substituted phenylsulfonyl radical, or the aforesaid group

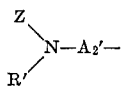

B represents: (iii) a coupling component $B_1$ of the Formula IIa, or (iv) a coupling component of the formula

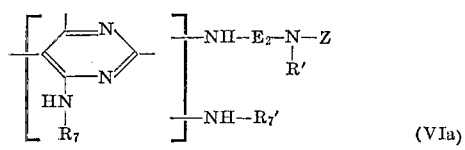

wherein:

$E_2$ represents a divalent radical selected from alkylene of from 1 to 8 carbon atoms, cyclohexylene, phenylene-lower alkylene, naphthylene, or an optionally substituted phenylene radical any substituents of which are selected from chlorine, bromide, power alkyl and lower alkoxy; and Each of $R_7$ and $R_7'$ represents hydrogen, alkyl of from 1 to 8 carbon atoms, hydroxy-lower alkyl, lower alkoxy-lower alkyl, an optionally substituted phenyl-lower alkyl radical, cyclohexyl, naphthy, or an optionally substituted phenyl radical any substituent of which is selected, apart from any groups $—XO^-M^+$ and $—NR'—Z$, from fluorine, chlorine, bromine, lower alkyl, lower alkoxy, an optionally substituted phenoxy radical and lower alkylsulfonyl; any substituents in the benzene nuclei of all of the aforesaid benzyl, phenyl-lower alkyl, benzoyl, phenoxy, phenylsulfonyl and phenoxysulfonyl radicals being selected, apart from any groups $—XO^-M^+$ and $—NR'—Z$, from chorine, bromine and lower alkyl; and "halogen" having an atomic number of at most 35; and X and $M^+$ have the aforesaid meanings.

In Formula VI and all subsequent formulas, the grouping $$Z-N- \atop R'$$

is linked to an aromatic ring carbon atoms unless expressly defined otherwise.

The aforesaid fiber-reactive substituent Z is in particular selected from (a) a radical of the formula

[structure: triazine ring with $R_8$ and $R_9$ substituents]

wherein, either (i) $R_8$ represents halogen, tri-lower alkylammonio, a group of the formula $$-\overset{+}{N}\diagup\overset{\text{lower alkyl}}{\underset{\text{lower alkyl}}{\diagdown}}-NH_2$$

or the radical

[structure: piperazinium ring]

or the radical

[structure: pyridinium ring]

and $R_9$ represents lower alkoxy, phenoxy, lower alkylthio, phenylthio, amino, mono-lower alkyl-amino, di-lower alkylamino, phenylamino, sulfophenylamino or di-sulfophenyl-amino; or (ii) both $R_8$ and $R_9$ represent halogen; (b) a radical of the formula

[structure: pyrimidine ring with $R_{10}$, $R_8$, $R_9$]

wherein $R_{10}$ represents hydrogen, halogen, lower alkyl, lower alkanoyl, cyano, nitro, phenyl, N-phenyl-carbamoyl or phenylsulfonyl, $R_8$ represents halogen; and $R_9$ represents halogen or lower alkylsulfonyl; (c) a radical of one of the formulas

[two structures with $-CO$, $R_{11}$, $R_8'$, $R_9'$, $R_{10}'$]

wherein $R_{10}'$ represents hydrogen or halogen, and either (i) each of $R_8'$ and $R_9'$ represents halogen or $-SO_3^-M^+$, or (ii) $R_8'$ represents lower alkoxy, phenoxy, amino, mono-lower alkyl-amino, di-lower alkyl-amino, phenylamino, sulfophenylamino or di-sulfophenyl-amino, and $R_9'$ represents tri-lower alkyl-ammonio, the grouping $$-\overset{+}{N}\diagup\overset{\text{lower alkyl}}{\underset{\text{lower alkyl}}{\diagdown}}-NH_2$$

the radical

[structure: piperazinium ring]

or the radical

[structure: pyridinium ring]

and $R_{11}$ represents hydrogen or lower alkyl;

(d) 2,3-dihalogeno-quinoxaline-6-carbonyl;
(e) 2,3-dihalogeno-quinoxaline-6-sulfonyl;
(f) 1,4-dihalogeno-phthalazine-6-carbonyl;
(g) 2,4-dihalogeno-quinazoline-6-carbonyl;
(h) 2,4-dihalogeno-quinazoline-7-carbonyl;
(i) [4',5'-dihalogeno-6'-pyridazonyl-(1')]-lower alkanoyl;
(j) p-[4',5'-diahlogeno-6'-pyridazonyl-(1')]benzoyl;
(k) a heterocyclic radical of the formula

[structure: benzazole ring with $-X_1-$, $C-R_{12}$, $X_2$]

wherein $R_{12}$ represents halogen or $-SO_3^-M^+$, $X_1$ has the aforesaid meaning, and $X_2$ represents sulfur or oxygen;

(l) a radical of the formula

[structure: benzene ring with $R_{13}$, Hal, $-X_1-$]

wherein $R_{13}$ represents nitro, lower alkylsulfonyl or sulfamoylphenyl, and

Hal represents fluorine or chlorine in ortho- or para-position to $R_{13}$, and $X_1$ has the aforesaid meaning;

(m) α-halogeno-lower alkanoyl;
(n) α,β-dihalogeno-lower alkanoyl;
(o) lower alkenoyl;
(p) halogeno-lower alkenoyl;
(q) 2,2,3,3-tetrafluoro-cyclobutyl-carbonyl;
(r) β-(2,2,3,3-tetrafluoro-cyclobutyl)-acryloyl; and
(s) a residue of the formula

[structure: $-CO-N(\text{lower alkyl})-$ triazine with halogen and $R_{14}$]

wherein:

$R_{14}$ represents lower alkoxy, lower alkylthio, phenoxy, phenylthio, or a grouping $$-N\diagup\overset{R'}{\underset{R'}{\diagdown}}$$

and in the above residues representing Z:

"Halogen" means halogen of an atomic number of at most 35, and

"Halogeno" means chloro or bromo.

In a seventh aspect, the invention provides fiber-reactive disazo dyestuffs of the formula $$\left(\overset{Z-N}{\underset{R'}{\mid}}\right)_{p'}\!\left[A_1-N\!=\!N\!-\!\!\left(\!E'\!-\!N\!=\!N\!\right)_{p-1}\!\!-\!E\!-\!N\!=\!N\!-\!B_1\right]\!-\!(XO^-M^+)_r \quad (VII)$$

wherein:

$A_1$ represents naphthyl or an optionally substituted phenyl radical any substituent of which is selected from chlorine, bromine, nitro, cyano, trifluoromethyl, lower alkanoyl, lower alkylsulfonyl, and a grouping $$-X_1-N\diagup\overset{R_4}{\underset{R_4'}{\diagdown}}$$

wherein:

$X_1$ represents CO and $SO_2$ and each of $R_4$ and $R_4'$ represents hydrogen, lower alkyl or hydroxy-lower alkyl; each of $p$ and $p'$ independently represents one of the integers 1 and 2; each of E represents naphthylene or an optionally substituted phenylene radical any substituent of which is selected, apart from any groups —XO⁻M⁺ and —NR'—Z, from lower alkyl, lower alkoxy, lower alkanoylamino, lower alkylsulfonylamino, or an optionally substituted benzoylamino radical, or an optionally substituted phenylsulfonylamino radical; any substituent of which latter radical is selected from chlorine, bromine and lower alkyl;

$B_1$ represents a coupling component, which is preferably of Formula IIa, or is of Formula VIa;

"Halogeno" means chloro or bromo;

Z represents a fiber-reactive substituent as defined hereinbefore;

r represents a number ranging from 2 to 6; each grouping $$\begin{array}{c} Z-N- \\ | \\ R' \end{array}$$

being linked to an aromatic ring carbon atom of the moieties $A_1$, E and $B_1$, each of these moieties bearing at most one such grouping.

When there are two fiber-reactive groupings Z—NR'— present in the diazo dyestuffs of Formula VII, one of those is linked preferably to the moiety $A_1$ and the other to the moiety $B_1$, because such dyestuffs are particularly easy to produce.

Of those dyestuffs of Formula VII which have per molecule a single fiber-reactive grouping Z—NR'— linked to the moiety E, those of the formula (VII A)

wherein $A_1$, $B_1$, M⁺, R' and Z have the aforesaid meanings, are preferred because they can be produced from readily available starting materials and are, therefore, particularly suited for production on an industrial scale.

Fiber-reactive disazo dyestuffs falling under Formula VII, wherein:

$B_1$ represents a coupling component of the aforesaid Formula VIa are especially preferred because of their particularly great color strength in dyeing cellulosic fiber materials.

A third group of preferred dyestuffs falling under Formula VII corresponds to the formula $$\left[ Z-\underset{\underset{R'}{|}}{N}-A_1'-N=N-E-N=N-B_1 \right]-(XO^-M^+)_r$$

(VII B)

wherein:

$A_1'$ represents an optionally substituted phenylene radical any substituent of which is selected from chlorine, bromine, nitro, lower alkylsulfonyl, or a grouping $$-SO_2-N\begin{array}{c}R'\\ \diagdown \\ R'\end{array}$$

wherein each R' (independently has the aforesaid meaning; are still more preferred because of their great color strength and the particularly good fastness properties, especially to all wet treatments and the alkali, of dyeings obtained with these dyestuffs on cellulosic and natural polyamide fibers.

Another class of fiber-reactive disazo dyes, are provided, under an eighth aspect of the invention, by dyestuffs containing per molecule a total of from one to two fiber-reactive groupings $$-N\begin{array}{c}Z\\ \diagdown \\ R'\end{array}$$

and a total of from two to five water-solubilizing groupings —XO⁻M⁺, which dyestuffs fall under the formula (VIII)

wherein:

$A_2$ represents a diazo component as defined in describing Formula VI, supra, $E_1$ and G have the same meanings as in Formula III, and all other symbols have the same meanings as in preceding formulas.

Preferably, however, G represents one of the aforesaid groupings as defined under (e), (b) and (c) following Formula III, which grouping is substituted at an aromatic ring carbon atom thereof by one of the said fiber-reactive groupings —NR'—Z.

Furthermore, the invention provides, in a ninth aspect, fiber-reactive disazo dyestuffs of the formula (IX)

wherein:

s represents a number ranging from 1 to 6,

Q, $R_{15}$ and $R_{15}'$ have the same meanings as given in Formula IV,

Each $B_2$ represents a preferably identical coupling component of the formula wherein:

Both p's represent identical integers selected from 1 and 2, and $E_2$, $R_7$, $R_7'$, R' and Z have the same meanings as in Formula VIa, said dyestuffs containing per molceule from one to two fiber-reactive substituents Z.

In a tenth aspect, the invention provides fiber-reactive dyestuffs of the formula (X)

wherein:

$A_3$, $Q_1$, R', $R_{16}$, $R_{17}$, M⁺ and X have the same meanings as in Formula V, Z represents a fibre-reactive grouping, p represents one of the integers 1 and 2, s represents a number ranging from 1 to 6, and each groupings —NR'—Z present in the above formula X being linked to an aromatic ring carbon atom of different benzene nuclei belonging to groups $R_{16}$, $R_{17}$ and $A_3$.

Whenever the term "lower" is used herein in connection with an aliphatic radical, it means that such radical has not more than 5 carbon atoms. "Halogeno" means "chloro and bromo."

Solubilizing groups —XO⁻M⁺ are groups which dissociate in water to form an anionic dyestuff residue. Cations M⁺ are preferably hydrogen or alkali metal ions, but can also be ammonium or alkaline earth metal ions, or zinc or aluminum ions.

Where solubilizing groups are shown in a general dyestuff formula they include all solubilizing groups mentioned subsequently in the definitions of individual moieties or substituents of such formula.

The production of all starting materials necessary for producing dyestuffs according to the invention is well known, many of these starting materials being commercially available compounds.

Diazo compounds suitable for making the dyestuffs according to the invention can be obtained by diazotation of the desired diazotizable aromatic carbocyclic or heterocyclic monoamine. Carbocyclic diazo compounds can be, for example, of the benzene and naphthalene series. In addition to the diazonium group, solubilizing groups which dissociate acid in water and optionally, other substituents usual in azo dyestuffs can be present, as can be seen from Formulas I to X, supra.

Arylazo groups are preferably in the p-position to the diazonium group in a benzene ring. A benzene ring substituted in such a way can form part of a condensed ring system, e.g. a naphthalene, or a benzotriazole ring. Any aromatic rings present in the substituents listed above can be similarly substituted.

Heterocyclic diazo components are primary amines which can be diazotised, mainly 5- or 6-membered heterocycles of aromatic character, particularly those containing nitrogen. Also amines of polynuclear condensed heterocycles can be used. These then preferably contain a fused benzene ring such as the optionally substituted benzothiazole, benzotriazole or quinoline rings. These mono- or poly-nuclear heterocyclic diazo components can also contain substituents usual in azo dyestuffs preferably those which do not substantially elongate the resonance system of the dyestuffs.

As tetrazo compounds obtained by tetrazotation of aromatic diamines, tetrazotized phenylenediamines, diaminodiphenyls or diaminodiphenyl derivatives, for x- ample, are used, the benzene nuclei of which can contain the substituents mentioned above. The benzene nuclei in the diaminodiphenyl derivatives are bound by way of a divalent bridging member. Said bridging member can be divalent atoms such as oxygen or sulphur, or divalent groups. Examples of divalent groups are the unsubstituted or substituted imino group. divalent hydrocarbon radicals, e.g. lower, straight or branched chain alkylene radicals such as the methylene, 1,2-ethylene or 2,1-propylene group, or lower alkenylene radicals such as the vinyl group, also acyl radicals which can be derived from an inorganic or organic dibasic acid. Such divalent groups are, in particular, the radicals —CO—, —SO—, —SO₂— of inorganic acids and, e.g. the radicals of satuarted or unsaturated aliphatic dicarboxylic acids such as oxalic acid, fumaric acid or succinic acid.

As other divalent bridging groups can be mentioned, e.g.

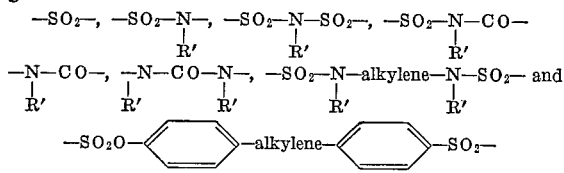

wherein:
Each R' independently represents hydrogen or a lower alkyl radical and

"Alkylene" represents an alkylene group having preferably 1 to 4 carbon atoms such as the ethylene or propylene group.

In addition to p- and m-phenylenediamines and the 4,4-diaminodiphenyl compounds, particularly easily accessible and, therefore, preferred, tetrazo compounds are the diaminodiphenyl derivatives having —O—, —S—, —CH₂—,

—CH₂CH₂—, —CH=CH—, —NH—, —CO—,
—SO₂—, —SO₂—NH—SO₂—
—SO₂NH—, —NH—CO— or —NH—CO—NH— as bridging member. As such diamines can be mentioned, for example:

m- and p-phenylenediamine,
benzidine, tolidines, dianisidine,
4,4'-diaminostilbene,
4,4'-diaminodiphenyl sulfone,
3,3'-diaminodiphenyl sulfone,
2,2'-diaminodiphenyl sulfone,
4,4'-diaminodiphenyl sulfide,
2,2'-diaminodiphenyl sulfide,
4,4'-diaminodibenzene disulfimide,
4,4'-diaminodiphenylmethane,
4,4'-diaminodiphenylethane,
2,2-bis-(4'-aminophenyl)-propane,
4,4'-diaminodiphenyl ether,
4,4'-diaminodiphenylamine,
4,4'-diaminodiphenyl urea,
3,3'-diaminodibenzene sulfimide,
1-amino-4-(4'-amino-benzoylamino)-benzene
as well as their substitution products such as
1,4-diamino-benzene-3-sulfonic acid,
1,3-diamino-benzene-4-sulfonic acid,
1,4-diamino-3-nitrobenzene,
4,4'-diamino-diphenyl-3-sulfonic acid,
4,4'-diamino-diphenyl-2,2'-disulfonic acid,
4,4'-diamino-3,3'-dimethoxy-diphenyl-2,2'-disulfonic acid,
4,4'-diamino-diphenylamine-2-sulfonic acid,
4,4'-diaminostilbene-2,2'-disulfonic acid,
4,4'-diamino-dibenzyl-2,2'-disulfonic acid,
2,2'-diamino-4,4'-dichloro-diphenyl sulfide,
2,2'-diamino-4,4'-dichloro-diphenyl-sulfone,
4,4'-diamino-3,3'-dichloro-diphenyl,
4,4'-diamino-3,3'-dichloro-diphenylmethane,
1-amino-4-(4'-aminobenzoyl-amino)-benzene-3-sulfonic acid,
4,3'-diamino-diphenyl urea-3-sulfonic acid, also
2,2-bis-[4'-(2''-aminophenyl-sulfonyl-oxy)-phenyl)]-propane.

The 2,4,6-triamino-pyrimidine compounds used as coupling components can have one or two substituents at each of the three amino groups; these can consist of optionally further substituted hydrocarbon radicals or heterocyclic radicals. Two substituents of the same nitrogen atom—optionally with the inclusion of further hetero atoms such as oxygen or nitrogen—can also form a ring.

Thus, examples of hydrocarbon radicals are straight or branched chain alkyl groups having up to 8, preferably 1 to 5, carbon atoms, cycloalkyl groups such as the cyclohexyl group, aralkyl groups, particularly phenylalkyl groups such as the benzyl group, and homocyclic aryl groups such as phenyl, diphenyl, phenylalkylphenyl or naphthyl groups.

If the aromatic rings of the nitrogen substituents are further substituted then they contain substituents conventional in azo dystuffs mentioned hereinbefore, and especially in Formulae I to X.

As heterocyclic radicals comprising the amino nitrogen atom, those derived from five- or six-membered, optionally substituted and/or fused rings which, preferably, contain tertiary nitrogen, particularly heterocycles containing aromates such as pyridine, benzotriazole or quinoline are suitable in dyestuffs according to the invention. If two substituents of the same amino nitrogen atom form a ring together with the said nitrogen atom, then this is, e.g. the aziridine, pyrrolidine, piperidine or morpholine ring.

Of the 2,4,6-triamino-pyrimidine compounds usable according to the invention, those are preferably used in which the amino groups at the pyrimidine nucleus are either unsubstituted or, particularly, monosubstituted.

In the azo-pyrimidine dyestuffs which can be produced according to the invention, a sulfonic acid group is preferably present in substituents of the pyrimidine component. Particularly valuable mono- or dis-azo-pyrimidine dyestuffs, which are distinguished, among other things, by easy accesibility and very great affinity to polyamide fibers as well as by good stability in the boiling dyebath, are obtained by coupling the diazonium compound of a carbocyclic or heterocyclic arylamine optionally containing an arylazo group with those 2,4,6-triamino-pyrimidine compounds which can be coupled in the 5-position, which are optionally further substituted and which contain at least one arylamine substituent.

Thus, preferred coupling products are derived from 2,4,6-triamino-pyrimidine compounds of formula

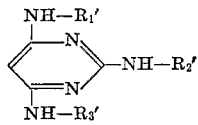

(XI)

wherein of $R_1'$, $R_2'$ and $R_3'$, one represents an optionally substituted phenyl or naphthyl radical, and the others each represent hydrogen or an unsubstituted or substituted alkyl, cycloalkyl, phenylalkyl, phenyl or naphthyl group.

When using, in the making of dyestuffs according to the invention, a tetrazonium compound which is formed from a diaminodiphenyl compound the benzene nuclei of which are bound directly to each other or by way of a bridging member, such compound is preferably coupled with two equivalents of identical, optionally substituted 2,4,6-triamino-pyrimidine compounds which can be coupled in the 5-position, the coupling component containing preferably at least one sulfo-aryl radical as N-substituent. For this purpose, amino-pyrimidines of Formula XI wherein of $R_1'$, $R_2'$ and $R_3'$, one represents a sulfophenyl radical and the other R's each represent hydrogen or identical alkyl radicals, are particularly suitable.

Instead of with two equivalents of identical aminopyrimidines, the tetrazo compound can also be reacted, however, in any order desired with either one equivalent of an optionally substituted 2,4,6-triamino-pyrimidine compound or with one equivalent of another 2,4,6-triamino-pyrimidine compound, or with one equivalent of any other coupling component desired. Suitable coupling components in the latter case are phenols, naphthols, 5-pyrazolones, 2,4-dioxyquinolines, 3,5-dioxo-pyrazolidines, barbituric acids, malonic acid dianilides, acyl acetic acid amides or aminonaphthalenes and 5-aminopyrazoles which couple in a position adjacent to the hydroxyl group or to an amino group. These coupling components can contain the substituents usual in azo dyestuffs listed above, particularly sulfonic acid groups.

Other modes of carrying out the general production process described above in practice, comprise, for example, coupling two equivalents of identical or different diazonium compounds of carbocyclic or heterocyclic arylamines with a coupling component containing two optionally substituted 2,4,6 - triamino-pyrimidine groupings which can be coupled in 5-position. Coupling components suitable for this modification according to the invention are derived, e.g. from compounds of the formula

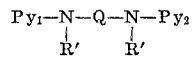

(XII)

In this formula, $Py_1$ and $Py_2$ represent identical or different radicals of pyrimidine compounds which can be coupled in the 5-position, which radicals are bound in 2- or 4-position with

and contain primary, secondary or tertiary amino groups at the other ring carbon atoms, Each R' independently represents hydrogen or lower alkyl radicals and Q represents a divalent bridging member containing hydrocarbon, particularly an aliphatic hydrocarbon radical which is optionally interrupted or substituted by hetero atoms, particularly oxygen, sulfur or amino nitrogen, or it represents an aromatic hydrocarbon radical which can contain the substituents usual in azo dyestuffs mentioned above.

Another modification of the process according to the invention consists in coupling the diazonium compound of a carbocyclic or heterocyclic arylamine with a 2,4,6-triamino-pyrimidine compound which can be coupled in 5-position and which contains a diazotizable aminoaryl group at an amine nitrogen atom, further diazotizing the aminoazo compound obtained and coupling with a coupling component coupling in o-position to a hydroxyl or amino group.

Preferred amino pyrimidine components having diazotizable aminoaryl groups, which components can be coupled in 5-position and subsequently diazotized are, among others, the pyrimidine compounds of the formula

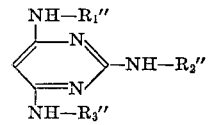

(XIII)

In this formula, one of the substituents $R_1''$, $R_2''$ and $R_3''$ represents an optionally further substituted aminophenyl radical. The other nitrogen substituents are, in particular, hydrogen or lower alkyl radicals.

Any coupling components of the type listed above, including 2,4,6 - triamino-pyrimidine compounds can be used as terminal coupling components which couple in o-position to a hydroxyl or amino group. However, coupling components of the naphthol, 1-aryl-5-pyrazolone, naphthylamine and 1-aryl-5-amino-pyrazole series lead to particularly valuable end products.

In addition to the substituents usual in azo dyestuffs listed above, the azo-pyrimidine dyestuffs according to the invention can also contain so-called fiber-reactive groupings, i.e. groups which can enter into a chemical bond with certain types of fiber such as cellulose fibers.

Such groups are bound to an aromatic ring of the dyestuff structure directly or by ways of bridging members such as oxygen, sulfur, preferably however, by way of an amino, lower alkylamino, sulfonylamino, carbonylamino or a ureido group and can be introduced into the monoazo or polyazo molecule by the usual conversion reactions during various steps in the production of the new dyestuffs. Conventional conversion reactions are, e.g. the reaction of a component containing an acylatable amino group with a compound which, in addition to the reacting substituent, contains at least one other radical which can be split off as anion under the dyeing conditions or it contains, a polylinkage to which addition can be made. Substituents which can be split off as anion are chiefly mobile halogen atoms, preferably chlorine, or also bromine or fluorine, the mobility of which is due, e.g. to the bond at α- or β-carbon atoms in negatively substituted aliphatic radicals, to the presence of electrophilic substituents in o- and/or p-position in aromatic radicals, or to the presence of tertiary ring nitrogen atoms in heterocycles of aromatic character, preferably 6-membered heterocycles having at least two tertiary ring nitrogen atoms. Other mobile substituents which can be split off as anion are hydroxyl groups of aliphatic radicals, electrophilically substituted in β-position, which have been esterified with strong acids, e.g. β-hydroxyalkyl-sulfonyl or β-hydroxyalkyl-sulfamyl groups esterified with sulfuric acid.

Examples of polylinkage to which addition can be made are the

or —C≡C— group in a position adjacent to an electrophilic group; examples of fiber-reactive groupings to which addition can be made are the vinyl sufone group, the acroyl or methacroyl radical, as well as the acid radical of propiolic acid. Preferably the fiber-reactive groupings are introduced into the end products, for example, by acylating azo-pyrimidine dyestuffs containing acylatable amino groups with acids or with reactive functional derivatives of these acids, which contain one of the fiber-reactive groups described above in the acid radical.

As such acylating agents there are preferably used:

(a) s-Triazine compounds containing at least two halogen atoms bound to carbon atoms such as cyanuric chloride, cyanuric bromide, as well as primary condensation products of cyanuric chloride or cyanuric bromide and, e.g. ammonia, amines, alkanols, alkylmercaptans, phenols or thiophenols;

(b) Pyrimidines having at least two reactive halogen atoms such as 2,4,6-trichloro- or 2,4,6-tribromopyrimidine, 2,4,5,6 - tetrachloro- or 2,4,5,6-tetrabromopyrimidine;

(c) Halogen pyrimidine carboxylic acid halides such as 2,4 - dichloro-pyrimidine - 5- or -6-carboxylic acid chloride;

(d) 2,3-dihalogenoquinoxaline carboxylic or sulfonic acid halides such as 2,3-dichloroquinoxaline-6-carboxylic acid chloride or 2,3-dichloroquinoxaline-6-sulfonic acid chloride;

(e) 2-halogen-benzothiazole carboxylic or sulfonic acid halides or 2-halogen-benzoxazole carboxylic or sulfonic acid halides such as 2-chlorobenzothiazole- or 2-chlorobenzoxazole-5- or -6-carboxylic acid chloride or -5- or -6-sulfonic acid chloride;

(f) Anhydrides and halides of aliphatic, unsaturated carboxylic acids such as maleic acid anhydride, acrylic acid chloride, methacrylic acid chloride and propiolic acid chloride;

(g) Anhydrides and halides of aliphatic or aromatic carboxylic acids, containing mobile halogen atoms such as chloracetyl chloride, β-chloropropionic acid chloride, α,β-dichloropropionic acid chloride, α-chloro- or β-chloroacrylic acid chloride, chloromaleic acid anhydride, β-chlorocrotonic acid chloride or fluoronitric- or chloronitricbenzoic acid halides in which the fluorine or chlorine atom is in o- or p-position to the nitro group; also halogen phthalazine carboxylic acid halide such as 1,4-dichloro- or 1,4-dibromo-phthalazine-6-carboxylic acid chloride or bromide, halogen quinazoline carboxylic acid halides such as 2,4-dichloro-quinazoline-6- or -7-carboxylic acid chloride, halogen - 6 - pyridazonyl-1-alkanoyl- or -1-benzoyl halides such as 4,5-dichloro-6-pyridazonyl-1-propionyl chloride or 4,5-dichloro - 6 - pyridazonyl - 1-benzoyl chloride.

The 2,4,6 - triamino-pyrimidine compounds usable as coupling components according to the invention, some of which are known, are produced by reacting the three chlorine atoms of 2,4,6-trichloro-pyrimdine one after another with ammonia, primary or secondary amines. Preferably less reactive amines are used in the first step and in the second and third steps ammonia and/or easily reacting more strongly basic amines are used.

Generally the products resulting from the first step are mixtures of isomers of 2-amino-4,6-dichloro-pyrimidines and 4-amino-2,6-dichloro-pyrimidines and those obtained from the second step are mixtures of isomers of 2,4-diamino-6-chloro-pyrimidines and 2-chloro - 4,6 - diaminopyrimidines, and in the third step mixtures of up to three isomers are obtained. If desired, the isomeric mixtures resulting from the first, second or third step can be separated by recrystallisation or by chromatographic adsorption, e.g. on aluminum oxide. However, since such isolation of isomers is uneconomical and does not lead to dyestuffs of superior dyeing properties, it is preferred to use the isomer mixtures of the third step directly as coupling components in the production of dyestuffs according to the invention. The individual isomers can also be obtained directly from 2,4-diamino-6-chloro-pyrimidines or from 2-amino-4,6-dichloro-pyrimidines by the method described by Langermann et al., J. Am. Chem. Soc. 73, 3011 (1951) and O'Brien et al., J. Org. Chem. 27, 1104 (1962).

The stepwise reaction is performed, e.g. in aqueous organic or organic-aqueous solution or dispersion, optionally in the presence of acid binding agents such as alkali and alkaline earth carbonates or hydroxides, or tertiary nitrogen bases. Suitable organic solvents are, e.g. alcohols such as methanol or ethanol, ethylene glycol monomethyl ether or monoethyl ether, aliphatic ketones such as acetone, methylethyl ketone, or methyl-isobutyl ketone, cyclic ethers, e.g. dioxan or tetrahydrofuran, optionally halogenated or nitrated aromatic hydrocarbons such as toluene, xylenes, chlorobenzene or nitrobenzene.

The first chlorine atom of the 2,4,6-trichloropyrimidine is reacted at low temperatures, advantageously at 30–60° C., the second chlorine atom is reacted at moderate temperatures, preferably at 70–100° C., and the third chlorine atom is reacted at higher temperatures, preferably between 120 and 160° C., optionally in a closed reaction vessel.

The coupling of the diazonium compounds and tetrazonium compounds with the 2,4,6-triamino-pyrimidine compound and, optionally, with any other coupling components desired, is performed by the usual methods in acid, neutral or alkaline medium. In many cases, the presence of water soluble organic solubility promoters such as ethanol or dioxan is advantageous. If the coupling is begun in mineral acid solution, advantageously the acid is gradually buffered, e.g. with alkali metal salts of lower fatty acids. In many cases, the coupling of a mixture of isomers of pyrimidine coupling components usable according to the invention with suitable diazonium or tetrazonium compound has often proved to be particularly advantageous.

The azo-pyrimidine dyestuffs produced according to the invention are also worked up and isolated by the usual methods. Advantageously, the new azo-pyrimidine dyestuffs are isolated in the form of their alkali metal salts, e.g. the lithium, potassium and sodium salts, or also in the form of their ammonium salts. Optionally a subsequent purification can be performed to remove undesirable by-products, e.g. by dissolving and allowing to crystallize.

The invention is further illustrated by the following non-limitative examples, in which the temperatures are given in degree centigrade, and parts and percentages are given by weight unless expressly stated otherwise.

In all formulas of dyestuffs there is shown the free acid form, while, in practice, such dyestuffs are usually produced in the form of their alkali metal salts; in the following examples, they are always recovered in the form of their sodium salts.

EXAMPLE 1

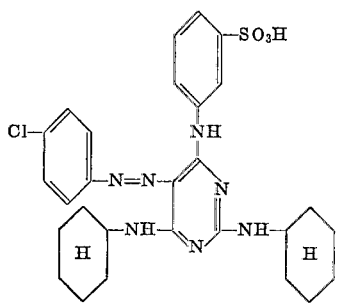

47 g. of 2,6-bis-cyclohexylamino-4-(3'-sulphophenyl-amino)-pyrimidine are dissolved in 300 ml. of water and 150 ml. of ethylene glycol monomethyl ether, with the addition of the amount of sodium hydroxide solution necessary to attain a clearly alkaline reaction. After cooling the solution, the diazonium solution, produced by usual diazotisation, of 12.8 g. of 1-amino-4-chlorobenzene is added at 0–5°. At the same time, the reaction mixture is kept alkaline by the dropwise addition of sodium hydroxide solution. The azo compound formed partly precipitates. This coupling product is precipitated by the addition of sodium chloride, filtered off, washed with dilute sodium chloride solution and dried. The dyestuff obtained of the above formula is a brown powder which dyes wool and polyamide fibres from a weakly acid bath in yellow shades. The dyeings have very good fastness to light, water, perspiration and washing.

Dyeings having similar properties are obtained if, with otherwise the same procedure, instead of the components used in Example 1, an equivalent amount of each of the diazo and coupling components given in the following Table I is used. The last column gives the shades of the dyeings obtained on wool with the corresponding azopyrimidine dyestuffs.

EXAMPLE 39

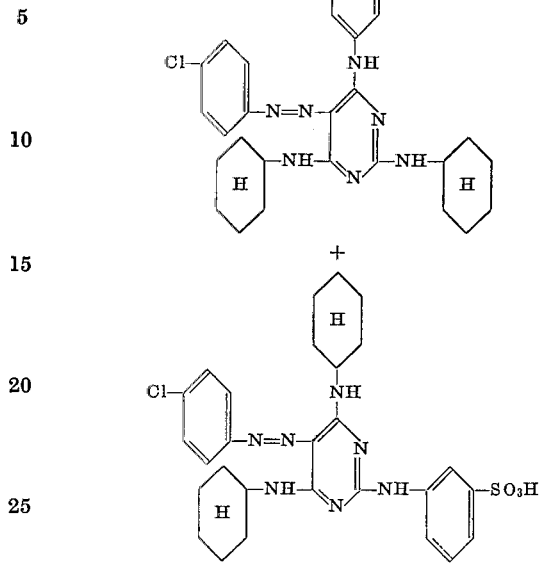

23.5 g. of 2,6-bis-cyclohexylamino-4-(3'-sulphophenyl-amino)-pyrimidine and 23.5 g. of 2-(3'-sulphophenyl-amino)-4,6-bis-cyclo-hexylamino-pyrimidine are dissolved in 300 ml. of water and 150 ml. of ethylene glycol monomethyl ether with the addition of an amount of sodium hydroxide solution necessary to attain a clearly alkaline reaction. At 0–5°, the solution is coupled with the diazonium solution of 12.8 g. of 1-amino-4-chlorobenzene, the reaction mixture being kept alkaline by the addition of further sodium hydroxide solution. A mixture of the sodium salts of the dyestuffs of the above formulae is

TABLE I

| Example Number | Diazo component | Coupling component | Shade on wool |
|---|---|---|---|
| 2 | 1-aminobenzene-3-sulphonic acid amide | 2,6-bis-cyclohexylamino-4-(3'-sulphophenylamino)-pyrimidine | Yellow. |
| 3 | 1-amino-4-methylsulphonyl-benzene | do | Do. |
| 4 | 1-amino-2-methoxy-benzene | do | Do. |
| 5 | 1-amino-4-chlorobenzene | 2,6-bis-phenylamino-4-(3'-sulphophenylamino)-pyrimidine | Yellow-orange. |
| 6 | 1-amino-2-chlorobenzene-4-sulphonic acid | do | Do. |
| 7 | 1-amino-4-chlorobenzene | 2,4-bis-(3'-sulphophenylamino)-6-cyclohexylamino-pyrimidine | Yellow. |
| 8 | 1-aminobenzene-3-sulphonic acid anilide | do | Do. |
| 9 | 1-aminobenzene-3-sulphonic acid-(N-ethyl)-anilide | do | Do. |
| 10 | 1-aminobenzene-2-sulphonic acid phenyl ester | do | Do. |
| 11 | 1-amino-4-chlorobenzene | 2,6-bis-($\beta$-hydroxyethylamino)-4-(3'-sulphophenylamino)-pyrimidine | Do. |
| 12 | do | 2,6-diamino-4-(3'-sulphophenylamino)-pyrimidine | Do. |
| 13 | 2-amino-4'-amyl-diphenyl ether | do | Do. |
| 14 | 1-amino-4-chlorobenzene | 2,6-diamino-4-(6'-sulpho-2'-naphthylamino)-pyrimidine | Do. |
| 15 | do | 2,6-diamino-4-(6'-sulpho-1'-naphthylamino)-pyrimidine | Do. |
| 16 | 1-aminobenzene-2-sulphonic acid-(4'-chloracetylamino)-phenyl ester | 2,6-diamino-4-(4'-sulphophenyl-amino)-pyrimidine | Do. |
| 17 | 1-amino-2,4-dinitrobenzene | 2-phenylamino-4-(3'-sulphophenylamino)-6-amino-pyrimidine | Red. |
| 18 | 1-amino-4-chlorobenzene | 2,6-bis-dimethylamino-4-(N-ethyl-N-4'-sulphophenyl-amino)-pyrimidine | Yellow. |
| 19 | do | 2,6-bis-benzylamino-4-(N-ethyl-N-4'-sulphophenyl-amino)-pyrimidine | Do. |
| 20 | 1-aminobenzene-2-sulphonic acid phenyl ester | 2,4-bis-(3'-sulphophenylamino)-6-phenylamino-pyrimidine | Yellow-orange. |
| 21 | do | 2,6-bis-methylamino-4-($\beta$-sulphoethylamino)-pyrimidine | Yellow. |
| 22 | 1-aminobenzene-3-sulphonic acid anilide | do | Do. |
| 23 | 1-amino-2-chlorobenzene | 2,6-bis-cyclohexylamino-4-($\beta$-sulphoethylamino)-pyrimidine | Do. |
| 24 | 1-amino-4-chlorobenzene | do | Do. |
| 25 | 1-aminobenzene | do | Do. |
| 26 | 1-aminobenzene-2-sulphonic acid phenyl ester | do | Do. |
| 27 | 1-aminobenzene-3-sulphonic acid anilide | do | Do. |
| 28 | 2-aminobenzoic acid-(N-ethyl)-anilide | do | Do. |
| 29 | 2-aminobenzoic acid ethyl ester | do | Do. |
| 30 | 1-amino-2-chlorobenzene | 2,6-bis-phenylamino-4-($\beta$-sulphoethylamino)-pyrimidine | Yellow-orange. |
| 31 | 1-amino-4-chlorobenzene | do | Do. |
| 32 | 1-amino-2-chlorobenzene-4-sulphonic acid | 2,6-bis-ethylamino-4-(4'-methoxyphenylamino)-pyrimidine | Do. |
| 33 | do | 2,6-bis-methylamino-4-(2'-methylphenylamino)-pyrimidine | Yellow. |
| 34 | do | 2,6-bis-propylamino-4-phenylamino-pyrimidine | Do. |
| 35 | do | 2,6-bis-ethylamino-4-(3'-methylphenylamino)-pyrimidine | Do. |
| 36 | do | 2,6-bis-ethylamino-4-(4'-chlorophenylamino)-pyrimidine | Do. |
| 37 | 3-aminopyridine | 2,6-diamino-4-(3'-sulphophenylamino)-pyrimidine | Do. |
| 38 | 1-amino-2-chlorobenzene | 2,6-diamino-4-[4'-(6''-methyl-7''-sulphobenzothiazolyl-(2'')-phenylamino]-pyrimidine | Do. | formed which is precipitated by the addition of sodium chloride, then filtered off, washed with sodium chloride solution and dried. The dyestuff dyes wool, silk and polyamide fibres from a weakly acid bath in yellow shades. The dyeings have very good fastness to light, water, perspiration and washing.

If with otherwise the same procedure, instead of the amounts given above, 37.6 or 9.4 g. of 2,6-bis-cyclohexyl-amino-4-(3'-sulphophenylamino)-pyrimidine and 9.4 or 37.6 g. respectively of 2-(3'-sulphophenylamino)-4,6-bis-cyclohexylamino-pyrimidine are used, then equally valuable dyestuff mixtures are obtained. They dye wool from a weakly acid bath in yellow shades which have similar properties.

EXAMPLE 40

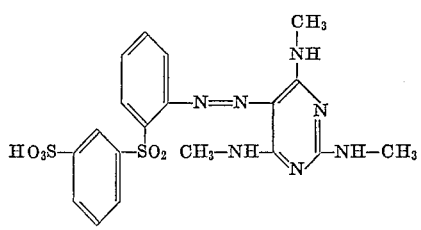

31.1 g. of 2-amino-diphenyl sulphone-3'-sulphonic acid are dissolved in 250 ml. of water and 12 ml. of 10 N sodium hydroxide solution and the solution of 6.9 g. of sodium nitrite is added. The mixture obtained is added dropwise to 250 g. of ice and 45 ml. of 10 N hydrochloric acid and the reaction mixture is stirred until diazotisation is complete. A small quantity of sulphamic acid is added and then the diazonium salt suspension is added to the 0–10° warm solution of 17.6 g. of 2,4,6-trismethylamino-pyrimidine in 100 ml. of 80% acetic acid. Excess mineral acid is then neutralised with sodium hydroxide solution until the reaction mixture no longer turns congo red paper blue. The dyestuff of the above formula precipitates. It is yellow coloured. It is filtered off, washed well with water and dried. It dyes wool and polyamide fibres in very level, reddish yellow shades which have good fastness to light.

If instead of the 31.3 g. of 2-amino-diphenyl sulphone-3'-sulphonic acid, an equivalent amount of 1-amino-naphthalene-6-sulphonic acid or of 2-amino-4,4'-dichloro-diphenyl ether-2'-sulphonic acid is used with otherwise the same procedure, then equally valuable dyestuffs are obtained which dye wool in brown or yellow fast shades respectively.

The 2,4,6-tris-methylamino-pyrimidine used in the above example was produced from 2,4,6-trichloropyrimidine and excess aqueous methylamine solution at 140° in an autoclave. The product was obtained from the reaction mixture by crystallisation and filtration followed by recrystallisation from water.

EXAMPLE 41

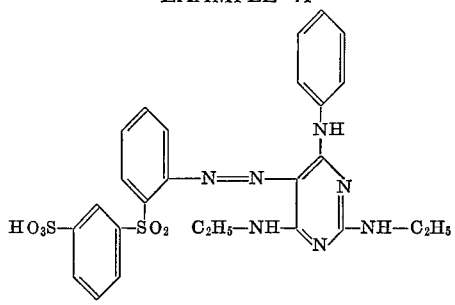

31.3 g. of 2-amino-diphenylsulphone-3'-sulphonic acid are diazotised as described in Example 40 whereupon the diazonium salt suspension obtained is added to the cold solution of 27 g. of 2,6-bis-ethylamino-4-phenylamino-pyrimidine in 100 ml. of 80% acetic acid and excess mineral acid is neutralised with sodium hydroxide solution. The orange-brown coloured dyestuff of the above formula precipitates from the coupling mixture. It is filtered off, washed well with water and dried. It dyes wool and polyamide fibres in level yellow-orange shades which have good fastness to light.

The 2,6-bis-ethylamino-4-phenylamino-pyrimidine used in the above example as coupling component is produced as follows: A mixture of 93 g. of aniline and 200 ml. of acetone is poured into a solution of 10 g. of sodium acetate in 400 ml. of water, the emulsion formed is heated to 50–55°, 184 g. of 2,4,6-trichloro-pyrimidine are added dropwise simultaneously with 5 N sodium hydroxide solution to maintain a pH or 5–6. The reaction mixture is stirred for 4 hours, then left to stand in a separating tunnel, the lower phase is removed and evaporated. The residue melts at 114–128° and is a mixture of 2,6-dichloro-4-phenylamino-pyrimidine and 4,6-dichloro-2-phenylamino-pyrimidine. To separate these isomers, the evaporation residue is crystallised from 400 ml. of benzene and the precipitated product is purified by chromatography on a neutral aluminium oxide column using a mixture of 70% benzene and 30% chloroform as eluent. 2,6-dichloro-4-phenyl-amino-pyrimidine is so obtained in the form of a white crystal powder which melts at 135–136°. This is slurried in water, excess aqueous ethylamine solution is added and the whole is heated in a closed vessel for 10 hours at 150–160°. After cooling, the reaction mixture is neutralised with hydrochloric acid, the precipitated 2,6-bis-ethylamino-4-phenylamino-pyrimidine is filtered off, washed well with water and dried.

The coupling components employed in preceding Examples 1 to 40 and in subsequent Examples 42–47, 49–73 are produced in an analogous manner.

Dyestuffs having similar properties are obtained when the equivalent amount of each of the diazo components given in column 2 of the following Table II is coupled under the conditions given in Example 41 with the equivalent amount of any one of the coupling components given in column 3. The shades of the dyeings obtained on wool with the corresponding azo-pyrimidine dyestuffs are given in the last column.

TABLE II

| Example Number | Diazo component | Coupling component | Shade on wool |
|---|---|---|---|
| 42 | 1-amino-4-nitrobenzene-2-sulphonic acid | 2,6-bis-ethylamino-4-phenylamino-pyrimidine | Red-brown. |
| 43 | 1-aminonaphthalene-4-sulphonic aicd | do | Orange. |
| 44 | 1-amino-4-chloracetylamino-benzene-2-sulphonic acid | do | Yellow. |
| 45 | 1-amino-4-acroylamino-2-sulphonic acid | do | Do. |
| 46 | 1-amino-4-vinylsulphonyl-benzene | 2,4-bis-(3'-sulphophenylamino)-6-cyclohexylamino-pyrimidine. | Do. |
| 47 | 1-amino-4-(β-sulphoxy-ethylsulphonyl)-benzene | do | Do. |

EXAMPLE 48

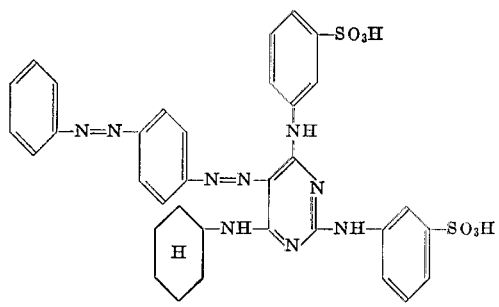

19.7 g. of 4-aminoazobenzene are diazotised direct in the usual way whereupon the solution of the diazonium salt obtained is added, at a temperature of 0–10°, to a solution of 54.5 g. of 2,4-bis-(3'-sulphophenylamino)-6-cyclohexylamino-pyrimidine in 500 ml. of water and 12 ml. of 10 N sodium hydroxide solution. The reaction mixture is kept alkaline by the addition of further sodium hydroxide solution after which the disodium salt of the disazo dyestuff of the above formula dissolves with a red colour. The coupling product formed is then precipitated by the addition of sodium chloride, it is filtered, the filter residue is washed with sodium chloride solution and dried. The dyestuff so formed dyes wool and polyamide fibres from a neutral to weakly acid bath in pure scarlet shades. The dyeings on wool are distinguished by very good fastness to light, sea water, washing and milling. Those on polyamide fibres are distinguished by their evenness and also high grade light, perspiration and washing fastness.

The 2,4 - bis - (3' - sulphophenylamino) - 6 - cyclohexylaminopyrimidine used in the above example is produced as follows: 286 g. of 1-amino-3-phenoxysulphonylbenzene hydrochloride and 63 g. of cyanamide are stirred at the boil in 1000 ml. of abs. ethanol until no more amine can be traced, which is determined by diazotisation of a sample and coupling with 2-naphthol. After cooling, 108 g. of sodium methylate and then 160 g. of malonic acid diethyl ester are added to the reaction mixture at 20–30°, the whole is boiled and kept under reflux for several hours. All the solvent is then distilled off, water is added to the residue and the suspension is neutralised with hydrochloric acid. 2-(3'-phenoxysulphonyl-phenylamino)-4,6-dihydroxy-pyrimidine precipitates. It is filtered off, the residue is washed with water and dried in vacuo. It is then added to 800 ml. of cold phosphorus oxychloride, the mixture is refluxed for 8 hours, the major part of excess phosphorus oxychloride is removed by distillation in vacuo and the residue is poured onto ice. 2-(3'-phenoxysulphonyl-phenylamino)-4,6-dichloropyrimidine precipitates, partly in crystal form, partly in oily form. It is filtered off, washed and recrystallised from chlorobenzene. The product so purified is then added to a solution of 173 g. of 1-aminobenzene-3-sulphonic acid in 1000 ml. of water and 100 ml. of 10 N sodium hydroxide solution and the mixture is boiled overnight. The solution of 2,4-di-(3'-sulphophenylamino)-6-chloropyrimidine so formed is clarified by filtration; 220 g. of cyclohexylamine are added, the whole is heated for some hours in a closed vessel at 130°, again cooled, 120 g. of sodium carbonate are added and excess cyclohexylamine is removed by steam distillation. Hydrochloric acid is added dropwise to the distillation residue until Congo paper turns blue. By then adding sodium chloride, the 2,4-bis-(3'-sulfophenyl-amino-6-cyclohexylamino-pyrimidine compound is precipitated. It is filtered off, washed with sodium chloride solution and recrystallised from water.

Disazo dyestuffs having similar properties are obtained if, with otherwise the same procedure, instead of the components mentioned in the above Example 48, equivalent amounts of each of the aminoazo compounds and coupling components given in the following Table III are used. The shades of dyeings obtained on wool with the corresponding disazo-pyrimidine dyestuffs are given in the last column of the table.

TABLE III

| Example Number | Diazo component | Coupling component | Shade on wool |
|---|---|---|---|
| 49 | 4-aminoazobenzene-3'-sulphonic acid | 2,4,6-tris-methylaminopyrimidine | Orange-red. |
| 50 | do | 2,6-bis-ethylamino-4-phenylamino-pyrimidine | Red. |
| 51 | 4-aminoazobenzene | 2,6-bis-cyclohexylamino-4-(3'-sulphophenylamino)-pyrimidine | Orange-red. |
| 52 | 4-aminoazobenzene-3'-sulphonic acid | do | Red. |
| 53 | 4-aminoazobenzene | 2,6-bis-phenylamino-4-(3'-sulphophenylamino)-pyrimidine | Red. |
| 54 | do | 2,6-bis-dimethylamino-4-(N-ethyl-N-4'-sulphophenyl-amino)-pyrimidine | Red. |
| 55 | do | 2,6-bis-benzylamino-4-(N-ethyl-N-4'-sulphophenyl-amino)-pyrimidine | Orange. |
| 56 | 1-amino-4-(2'-chlorophenylazo)-naphthalene-6-sulphonic acid | 2,6-diamino-4-(3'-sulphophenylamino)-pyrimidine | Violet-brown. |
| 57 | do | 2,6-bis-methylamino-4-(β-sulphoethylamino)-pryimidine | Do. |
| 58 | 2-(4'-amino-2'-methylphenylazo)-naphthalene-6-sulphonic acid | 2,6-diamino-4-(3'-sulphophenylamino)-pyrimidine | Orange-red. |
| 59 | do | 2,6-bis-methylamino-4-(β-sulphoethylamino)-pyrimidine | Do. |
| 60 | 4-aminoazobenzene-3'-sulphonic acid | 2,6-diamino-4-(6'-sulpho-2'-naphthylamino)-pyrimidine | Do. |
| 61 | do | 2,6-diamino-4-(6'-sulpho-1'-naphthylamino)-pyrimidine | Do. |
| 62 | 4-aminoazobenzene-2'-sulphonic acid | 2,6-diamino-4-(3'-sulphophenylamino)-pyrimidine | Red. |
| 63 | 4-aminoazobenzene-4'-sulphonic acid | do | Red. |
| 64 | 4-aminoazobenzene-3-sulphonic acid | 2,6-diamino-4-(3'-sulphophenylamino)-pyrimidine | Red. |
| 65 | 4-amino-3'-chloroazobenzene | do | Red. |
| 66 | 4-amino-2'-methoxyazobenzene | do | Red. |
| 67 | 4-amino-4'-methylazobenzene | do | Red. |
| 68 | 4-amino-2-methylazobenzene | do | Red. |
| 69 | 4-amino-2-methoxyazobenzene | do | Red. |
| 70 | 1-(4'-amino-2'-methylphenylazo)-naphthalene-6-sulphonic acid | do | Violet-brown. |
| 71 | 1-amino-4-phenylazonaphthalene-6-sulphonic acid | do | Do. |
| 72 | 1-(4'-amino-phenylazo)-4-phenylazonaphthalene-6-sulphonic acid | do | Do. |
| 73 | 1-amino-4-(4'-phenylazo-phenylazo)-naphthalene-6-sulphonic acid | do | Do. |

EXAMPLE 74

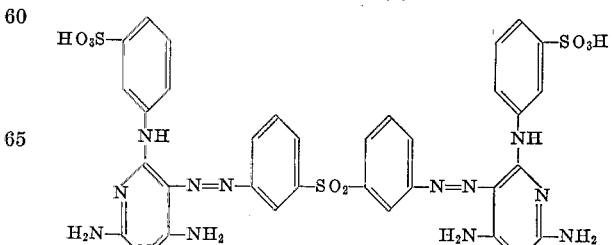

12.4 g. of 3,3'-diaminodiphenyl sulphone in 300 ml. of glacial acetic acid are tetrazotised with 30 ml. of 10 N hydrochloric acid and the solution of 6.9 g. of sodium nitrite. At 0–10°, a solution of 29.5 g. of 2,6-diamino-4-(3'-sulphophenylamino)-pyrimidine in 600 ml. of water and 11 ml. of 10 N sodium hydroxide solution is added to the tetrazonium salt solution formed. Additional sodium hydroxide solution is added dropwise to the reaction mixture until Congo red paper no longer turns blue. The disodium salt of the disazo dyestuff of the above formula precipitates as a yellow precipitate. The coupling product is filtered off and the filter residue is washed with water. It is then suspended in water, the suspension is heated to 65–70°, sodium carbonate is added until the dyestuff has completely dissolved and, after cooling the solution, the dyestuff is precipitated by the addition of sodium chloride. The product obtained is filtered off, washed with sodium chloride solution and dried. The dyestuff dyes wool from a neutral to weakly acid bath in pure yellow shades which have good fastness to light, perspiration, sea water, washing and abrasion. It produces equally valuable, wet-fast yellow dyeings on polyamide fibres.

If instead of the 12.4 g. of 3,3'-diamino-diphenyl sulphone, 9.4 g. of 4,4'-diamino-diphenyl or 11.4 g. of 4-aminobenzoic acid-(4'-aminophenylamide) are used and otherwise the procedure given in Example 74 is followed, then dyestuffs are obtained which produce on cellulose fibres valuable orange or yellow-orange dyeings respectively.

When cotton is pad dyed at 20° in a padding mangle with a 2% solution of the dyestuff produced according to paragraph 1 of Example 74, which solution also contains 20 g. of sodium carbonate, 100 g. of urea, 10 g. of tri-N-acryloyl-hexahydrotriazine-(1,3,5) and 2.5 g. of sodium alginate per litre, the impregnated goods are dried, then heated for 2 minutes at 140° and finally soaped at the boil for 30 minutes, a yellow dyeing is obtained.

The production of the coupling component is described further below in Example 187.

Dyestuffs having similar properties are obtained if, with otherwise the same procedure, instead of the components mentioned in the above example, the equivalent amount of each of the tetrazo and coupling components given in the following Table IV is used. The shades of the dyeings obtained on wool with the corresponding azo-pyrimidine dyestuffs are given in the last column of the table.

EXAMPLE 88

16.2 g. of 1-amino-2,4-dichlorobenzene are diazotised in the usual way, excess mineral acid being neutralised with sodium bicarbonate. The diazonium solution obtained is then added, at 0–10°, to an aqueous solution of 33.4 g. of 1,3-bis[4'-amino-2'(3''-sulphophenylamino)-pyrimidyl-(6')-amino]-benzene, 11 ml. of 10 N sodium hydroxide solution and 10 g. of sodium carbonate. The disodium salt of the disazo dyestuff of the above formula precipitates with a brown colour. The reaction mixture is then diluted with 1000 ml. of saturated sodium chloride solution, the dyestuff is filtered off, washed with sodium chloride solution and dried. The product is a brown powder which dyes wool, silk and polyamide fibres from a neutral to weakly acid bath and cotton and viscose from a neutral bath containing mineral salts, in yellow shades.

Dyestuffs having similar properties are obtained if with otherwise the same procedure, instead of the components mentioned in the above Example 88, the equivalent amount of each of the diazo components and coupling components which can be coupled twice listed in the following Table V is used. The shades of the dyeings obtained on wool with the corresponding azo-pyrimidine dyestuffs are given in the last column of the table.

TABLE IV

| Example Number | Tetrazo component | Coupling component | Shade on wool |
|---|---|---|---|
| 75 | 4',-diaminodiphenyl sulphone | 2,6-diamino-4-(3'-sulphophenylamino)-pyrimidine | Yellow. |
| 76 | 2,2-bis[4'-(2''-aminophenyl-sulphonyloxy)-phenyl]-propane | do | Do. |
| 77 | 2,2'-diamino-4,4'-dichlorodiphenyl sulphide | do | Do. |
| 78 | 2,2'-diamino-4',4-dichlorodiphenyl sulphoxide | do | Do. |
| 79 | 4,4'-diaminodiphenyl sulphide | do | Do. |
| 80 | 4,4'-diaminodiphenylmethane | do | Do. |
| 81 | 4,4'-diamino-2,2'-dimethyl-diphenyl | do | Yellow-orange. |
| 82 | 2,2'-diaminodiphenyldisulphimide | 2,4,6-tris-methylaminopyrimidine | Yellow. |
| 83 | 1,3-diaminobenzene-4-sulphonic acid | 2,6-diamino-4-phenylamino-pyrimidine | Do. |
| 84 | 1-aminobenzene-2-sulphonic acid-N-(4'-aminobenzoyl)-amide | 2,6-bis-ethylamino-4-(4'-sulphophenylamino)-pyrimidine | Do. |
| 85 | 4,4'-diaminodiphenylketone | do | Do. |
| 86 | 2,2'-diaminodiphenylether-4,4'-disulphonic acid phenyl ester | do | Do. |
| 87 | N,N'-dimethyl-N,N'-bis-2-aminobenzene sulphonyl-ethylenediamine | do | Do. |

TABLE V

| Example Number | Diazo component | Coupling component | Shade on wool |
|---|---|---|---|
| 89 | 1-amino-4-chlorobenzene | 1,3-bis-[2'-amino-4'-(3''-sulphophenylamino)-pyrimidyl-(6')-amino]-benzene | Yellow. |
| 90 | 1-aminobenzene-3-sulphonic acid amide | do | Do. |
| 91 | 1-amino-4-chlorobenzene | 1,2-bis-[2'-phenylamino-4'-(3''-sulphophenylamino)-pyrimidyl-(6')-amino]-ethane | Do. |
| 92 | 1-amino-4-methoxybenzene | do | Do. |
| 93 | 4-aminoazobenzene | do | Red. |

EXAMPLE 94

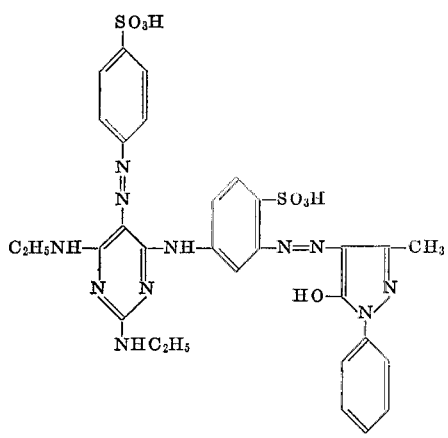

17.3 g. of 1-aminobenzene-4-sulphonic acid are diazotised in the usual way whereupon sodium bicarbonate is added to the diazo suspension obtained until the suspension has only a weakly acid reaction. Then, at 0–10°, it is added to a solution of 35.2 g. of 2,6-bis-ethylamino-4-(3'-amino-4'-sulphophenylamino)-pyrimidine and 10 g. of sodium carbonate in 300 ml. of water and 10 ml. of 10 N sodium hydroxide solution. The yellow coloured coupling product remains in solution. On completion of the reaction, a solution of 6.9 g. of sodium nitrite in water is added and the whole is added at a temperature below 10° to a mixture of 100 g. of ice and 60 ml. of 10 N hydrochloric acid. The reaction mixture is stirred until the diazotisation is complete, then sodium bicarbonate is added until Congo red paper no longer turns blue. The diazo suspension is then added at 0–10° to a solution of 17.4 g. of 1-phenyl-3-methyl-5-pyrazolone and 10 g. of sodium carbonate in 200 ml. of water and 11 ml. of 10 N sodium hydroxide solution. The reaction mixture is stirred until the coupling is complete whereupon the yellow-brown disodium salt of the disazo dyestuff of the above formula precipitates. The coupling product is filtered off, the filter residue is washed with sodium chloride solution and dried. The dyestuff is a brown powder which dyes wool, silk and polyamide fibres in valuable yellow shades.

Other valuable azo-pyrimidine dyestuffs having similar properties are obtained if, with otherwise the same procedure as given above, instead of the components mentioned in the above example, equivalent amounts of each of the diazo components, and 1st and 2nd coupling components given in the following Table VI are used. The shades of the dyeings obtained on wool with the corresponding azo-pyrimidine dyestuffs are given in the last column of the table.

EXAMPLE 110

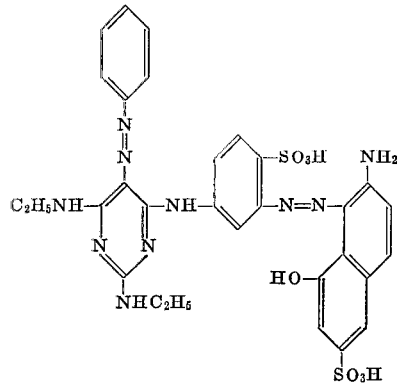

9.3 g. of aminobenzene are diazotised in the usual way and coupled as described in Example 94 with 35.2 g. of 2,6 - bis-ethylamino-4-(3'-amino-4'-sulphophenylamino)-pyrimidine. On completion of the coupling, the reaction mixture is diluted with sufficient warm water to completely dissolve the coupling product. 6.9 g. of sodium nitrite are then added and the yellow solution obtained is added dropwise to a mixture of ice and 60 ml. of 10 N hydrochloric acid. The solution is stirred until the diazotisation is complete, a small quantity of sulphamic acid is added and, at a temperature of 0–10°, the soluton of 23.9 g. of 2-amino-8-hydroxynaphthalene-6-sulphonic acid in 200 ml. of water and 11 ml. of 10 N sodium hydroxide solution is added. The dark brown disazo dyestuff of the above formula then precipitates. Sodium acetate is added to the coupling mixture until Congo red paper no longer turns blue and the whole is stirred until the coupling is complete. The coupling product is then filtered off, the residue is then again slurried in water, sodium carbonate is added until Brilliant Yellow paper shows a permanent alkaline reaction, the whole is heated until the reaction mixture becomes a complete solution and the end product is precipitated by the addition of sodium chloride. The precipitate is filtered off, washed with sodium chloride solution and dried. The dyestuff so formed is a dark powder which dyes wool and synthetic poyamide articles in valuable brown shades.

Other valuable azo-pyridine dyestuffs having similar properties are obtained if, with otherwise the same procedure as described above, instead of the components mentioned in the above example, equivalent amounts of each of the diazo components, 1st and 2nd coupling components mentioned in the following Table VII are used. The shades of dyeings obtained on wool with the corresponding azo-pyrimidine dyestuffs are given in the last column of the table.

TABLE VI

| Example Number | Diazo component | 1st coupling component | 2d coupling component | Shade on wool |
|---|---|---|---|---|
| 95 | Aminobenzene | 2,6-bis-ethylamino-4-(3'-amino-4'-sulphophenylamino)-pyrimidine. | 1-phenyl-3-methyl-5-pyrazolone | Yellow. |
| 96 | do | do | 2-hydroxynaphthalene | Orange. |
| 97 | 1-aminobenzene-4-sulphonic acid | do | do | Do. |
| 98 | do | do | 3-hydroxy-2-naphthoic acid anilide | Red-brown. |
| 99 | Aminobenzene | 2-6-diamino-4-(3'-amino-4'-sulphophenylamino)-pyrimidine. | 1-(2'-chloro-5'-sulphophenyl)-3-methyl-5-pyrazolone. | Yellow. |
| 100 | do | do | 2-hydroxynaphthalene-6-sulphonic acid. | Orange. |
| 101 | 1-(2',4'-dichloro-s-triazinyl-(6')-amino)-3-aminobenzene-4-sulphonic acid. | do | 1-(4'-sulphophenyl)-3-methyl-5-pyrazolone. | Yellow. |
| 102 | do | do | 1-[4',8'-disulphonaphthyl-(2')]-3-methyl-5-pyrazolone. | Do. |
| 103 | 1-(β-chloracroylamino)-3-aminobenzene-4-sulphonic acid. | do | do | Do. |
| 104 | 1-aminobenzene-2-sulphonic acid | 2,6-bis-ethylamino-4-(3'-amino-4'-sulphophenylamino)-pyrimidine. | Malonic acid dianilide | Do. |
| 105 | do | do | Malonyl hydrzaobenzene | Do. |
| 106 | do | do | Barbituric acid | Do. |
| 107 | do | do | Acetoacetic acid anilide | Do. |
| 108 | 1-aminobenzene-2-sulphonic acid | 2,6-bis-ethylamino-4-(3'-amino-4'-sulphophenylamino)-pyrimidine. | 1-ethyl-3-phenyl barbituric acid | Do. |
| 109 | do | do | 1-(3'.chlorophenyl)-3-methyl-5-pyrazolone. | Do. |

TABLE VII

| Example Number | Diazo component | 1st coupling component | 2d coupling component | Shade on wool |
|---|---|---|---|---|
| 111 | Aminobenzene | 2,6-bis-ethylamino-4-(3'-amino-4'-sulphophenylamino)-pyrimidine. | 1-phenyl-3-methyl-5-aminopyrazole | Orange. |
| 112 | do | do | 2,4,6-tris-methylamino-pyrimidine | Yellow-brown. |
| 113 | 1-aminobenzene-4-sulphonic acid | do | do | Do. |
| 114 | do | do | 1-phenyl-3-methyl-5-amino-pyrazole | Yellow. |
| 115 | 1-amino-2-chlorobenzene | 2,6-diamino-4-(3'-amino-4'-sulphophenylamino)-pyrimidine. | 2-aminonaphthalene-6-sulphonic acid | Orange. |

EXAMPLE 116

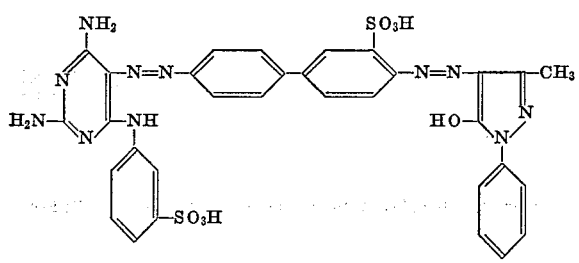

Further valuable azo-pyrimidine dyestuffs having similar properties are obtained if, with otherwise the same procedure as described above, instead of the components mentioned in the above example, equivalent amounts of the tetrazo components and 1st and 2nd coupling components given in the following Table VIII are used. The shades of the dyeings obtained on wool with the corresponding azo-pyrimidine dyestuffs are given in the last column of the table.

TABLE VIII

| Example Number | Tetrazo component | 1st coupling component | 2nd coupling component | Shade on wool |
|---|---|---|---|---|
| 117 | 4,4'-diaminodiphenyl-3-sulphonic acid. | 2,4,6-tris-methylamino-pyrimidine | 1-(3'-sulphophenyl)-3-methyl-5-pyrazolone. | Brown-orange. |
| 118 | do | do | 2-hydroxynaphthalene-6-sulphonic acid. | Brown. |
| 119 | do | 2,6-diamino-4-(3'-sulphophenyl-amino)-pyrimidine. | 1-(3'-chlorophenyl)-3-methyl-5-pyrazolone. | Orange. |
| 120 | do | do | 2-hydroxynaphthalene | Violet-brown. |
| 121 | 4,4'-diaminodiphenyl | do | 1-(2'-chloro-5'-sulphophenyl)-3-methyl-5-pyrazolone. | Orange. |
| 122 | do | do | 2-hydroxynaphthalene-6-sulphonic acid. | Violet-Brown. |

A solution of 26.4 g. of 4,4'-diamino-diphenyl-3-sulphonic acid and 13.8 g. of sodium nitrite in 150 ml. of water and 10 ml. of 10 N sodium hydroxide solution is added dropwise to a mixture of 70 ml. of 10 N hydrochloric acid and ice and the reaction mixture is stirred at 0–10° until the diamine has been completely tetrazotised. At the same temperature, the tetrazonium salt solution obtained is poured into a fine suspension of 28.1 g. of 2,6-diamino-4-(3'-sulphophenylamino)-pyrimidine which has been produced by dissolving the pyrimidine compound in 500 ml. of warm water and 11 ml. of 10 N sodium hydroxide solution and precipitating with acetic acid. Sufficient sodium hydroxide solution is added to the reaction mixture to attain a pH of 4–5 and the mixture is stirred until no more free pyrimidine compound is present. The coupling mixture is then added at 0–10° to a solution of 17.4 g. of 1-phenyl-3-methyl-5-pyrazolone in 200 ml. of water and 11 ml. of 10 N sodium hydroxide solution and sodium hydroxide solution is added dropwise simultaneously until the reaction mixture remains constantly alkaline. The whole is stirred until the dyestuff formation is complete whereupon the disodium salt of the disazo dyestuff of the above formula is in the form of a dark red suspension. The suspension is diluted with 1000 ml. of warm, saturated sodium chloride solution and the dyestuff is filtered off. The filter residue is washed with sodium chloride solution and dried. The end product is a brown powder which dyes wool, synthetic polyamide fibres, cotton and viscose in orange shades.

EXAMPLE 123

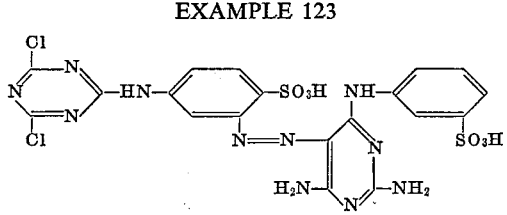

33.6 g. of the primary condensation product of 1 mol of cyanuric chloride and 1 mol of 1,3-diaminobenzene-4-sulphonic acid are stirred into 300 ml. of water, 300 g. of ice and 30 ml. of 30% hydrochloric acid and, at 0–5°, diazotised with 6.9 g. of sodium nitrite. The diazonium suspension obtained, which is acid to congo paper, is adjusted with sodium carbonate solution to a pH value of 4.5 and is then added to a solution of 28 g. of 2,6-diamino-4-(3'-sulphophenylamino)-pyrimidine in 900 ml. of water and 20 g. of sodium bicarbonate. On completion of the coupling, the dyestuff is precipitated by the addition of sodium chloride, filtered off, washed with sodium chloride solution and dried in vacuo at 40°. The monoazo dyestuff so obtained of the above formula is a yellow powder which dissolves in water with a greenish yellow colour.

Dyestuffs are obtained by this method from the primary or secondary condensation products of the formulae given in column 2 of the following Table IX and the coupling components mentioned in column 3 which dye cotton in the shades given in column 4.

TABLE IX

| Ex. No. | Diazo component | Coupling component | Shade on cotton |
|---|---|---|---|
| 124 | [structure: triazine with Cl, HN-phenyl-SO₃H, HO₃S-phenyl-HN, NH₂] | 2,6-diamino-4-(4'-sulphophenyl-amino)-pyrimidine | Greenish yellow. |
| 125 | [structure: 2,4-dichloro-triazine-HN-biphenyl-SO₃H, NH₂] | ....do.... | Yellow. |
| 126 | [structure: 2,4-dichloro-triazine-HN-phenyl-COHN-phenyl-SO₃H, NH₂] | ....do.... | Greenish yellow. |
| 127 | [structure: trichloro-pyrimidine-HN-phenyl-SO₃H, NH₂] | 2,6-bis-(3'-sulphophenylamino)-4-amino-pyrimidine | Yellow. |
| 128 | [structure: 2,6-dichloropyrimidine-COHN-phenyl-SO₃H, NH₂] | ....do.... | Do. |
| 129 | [structure: dichloro-pyrimidine-COHN-phenyl-SO₃H, NH₂] | ....do.... | Do. |
| 130 | [structure: dichloro-quinoxaline-COHN-phenyl-SO₃H, NH₂] | 2,6-bis-(4'-sulphophenylamino)-4-amino-pyrimidine | Do. |
| 131 | Cl—CH=CHCONH—phenyl—SO₃H, NH₂ | ....do.... | Do. |
| 132 | CH≡C—COHN—phenyl—SO₃H, NH₂ | ....do.... | Do. |
| 133 | [structure: 2-fluoro-5-nitro-benzoyl-NH-phenyl-SO₃H, NH₂] | ....do.... | Do. |
| 134 | [structure: 2-chloro-5-nitro-benzoyl-NH-phenyl-SO₃H, NH₂] | ....do.... | Do. |
| 135 | [structure: 2,6-dichloro-pyrimidine-HN-phenyl-SO₃H, NH₂] | 2,6-bis-(3'-sulphophenylamino)-4-phenylamino-pyrimidine. | Reddish yellow. |
| 136 | CH₃—CCl=CHCOHN—phenyl—NH₂, SO₃H | ....do.... | Do. |
| 137 | [structure: chloro-triazine with HN-phenyl-SO₃H, NH₂ and HO₃S-phenyl-HN] | 2,4,6-triamino-pyrimidine | Greenish yellow. |

TABLE—Continued

| Ex. No. | Diazo component | Coupling component | Shade on cotton |
|---|---|---|---|
| 138 | Same as above | 2,4,6-tris-methylaminopyrimidine | Do. |
| 139 | do | 4-sulphoethylamino-2,6-diamino-pyrimidine | Do. |
| 140 | do | 2,6-diamino-4-(2'-chloro-4'-sulphophenylamino)-pyrimidine. | Do. |
| 141 | 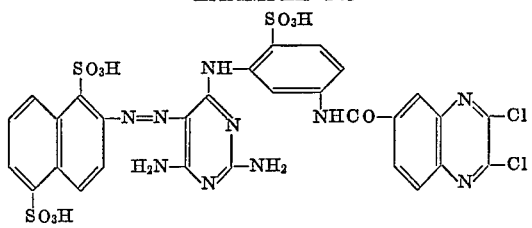 | 2,6-bis-(3'-sulphophenylamino)-4-amino-pyrimidine | Yellow. |
| 142 | 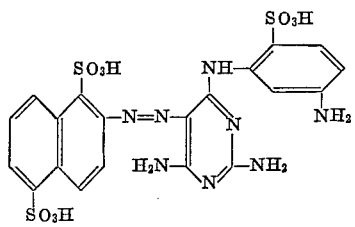 | ----do---- | Do. |

EXAMPLE 143

61 g. of the aminoazo dyestuff of the formula (obtained by coupling diazotised 2-naphthylamine-1,5-disulphonic acid with 2,6-diamino-4-(3'-amino-6'-sulphophenylamino)-pyrimidine), in the form of the sodium salt are dissolved in 1000 ml. of water, the solution having a neutral reaction. At 40°, a solution of 29 g. of 2,3-dichloroquinoxaline-6-carboxylic acid chloride in 50 ml. of acetone is added dropwise to this dyestuff solution, the pH being kept at 7 by the simultaneous addition of sodium carbonate solution. On completion of the condensation, the dyestuff is precipitated by the addition of sodium chloride, filtered and washed with sodium chloride solution. After drying in vacuo at 40°, a yellow powder is obtained which dissolves in water with a yellow colour.

When cotton or spun rayon is dyed or printed with this dyestuff by the processes usual for reactive dyestuffs, yellow dyeings or prints are obtained which have good fastness properties.

Other yellow dyestuffs having similar properties are obtained if the aminoazo dyestuffs given in column 2 of the following Table X are reacted as described in this example with the equivalent amounts of any of the reactive components given in column 3 at the temperatures given in column 4.

EXAMPLE 154

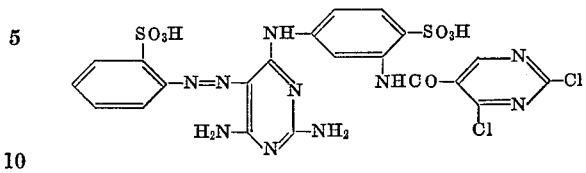

29.6 g. of 2,6-diamino-4-(3'-amino-4'-sulphophenylamino)pyrimidine are dissolved in 1000 ml. of water, the solution having a pH of 8, whereupon the solution is cooled to 0–5°. At this temperature, a solution of 24 g. of 2,4-dichloro-pyrimidine-5-carboxylic acid chloride in 100 ml. of acetone is added dropwise within 30 minutes and the pH of the reaction mixture is kept at 7–8 by the addition of sodium carbonate solution. As soon as no more unchanged amino compound can be determined, 30 g. of sodium bicarbonate are added to the reaction mixture and then a solution of 17.3 g. of diazotised 1-aminobenzene-2-sulphonic acid is poured in. On completion of the coupling, the reaction mixture is clarified, sodium chloride is then added to the reaction solution, the precipitated dyestuff is filtered off and washed with sodium chloride solution. After drying in vacuo at 40°, a yellow powder is obtained which dissolves in water with a yellow colour.

If cotton is pad dyed at 20° in a padding mangle with a 2% solution of this dyestuff which also contains 20 g. of sodium bicarbonate and 200 g. of urea per litre, the impregnated goods are dried, then heated for 2 minutes at 140° and finally soaped at the boil for 30 minutes, then a pure, strongly coloured, yellow dyeing is obtained.

Yellow dyestuffs having similar properties are obtained if the coupling components containing amino groups listed in column 2 of the following Table XI are condensed as described in this example with the reactive components given in column 3 at the temperatures given in column 4 and then coupled with the diazo components given in column 5.

TABLE X

| Ex. No. | Aminoazo dyestuff | Reactive component | Temp., degrees |
|---|---|---|---|
| 144 | 1-aminobenzene-2,4-disulphonic acid→2,6-diamino-4-(3'-amino-6'-sulphophenylamino)-pyrimidine. | 3-nitro-6-fluorobenzene carboxylic acid chloride | 20–40 |
| 145 | 2-naphthylamine-1,5-disulphonic acid→2,6-diamino-4-(3'-aminophenylamino)-pyrimidine. | 2,4,5,6-tetrachloropyrimidine | 80–90 |
| 146 | do | 3-nitro-4-fluorobenzenecarboxylic acid chloride | 20–40 |
| 147 | 1-aminobenzene-2,5-disulphonic acid→2,6-diamino-4-(3'-amino-4'-sulphophenylamino)-pyrimidine. | 2,4-dichloro-pyrimidine-5-carboxylic acid chloride | 0–10 |
| 148 | do | 2,4-dichloro-pyrimidine-6-carboxylic acid chloride | 30–40 |
| 149 | do | 2,4,6-trichloro-s-triazine | 0–10 |
| 150 | 1-aminobenzene-2,5-disulphonic acid→2,6-diamino-4-(3'-amino-6'-sulphophenylamino)-pyrimidine. | 1,4-dichlorophthalazine-6-sulphonic acid chloride | 40–60 |
| 151 | do | 2-chlorobenzoxazole-5-sulphonic acid chloride | 40–60 |
| 152 | do | 2,3-dichloroquinoxaline-6-sulphonic acid chloride | 40–60 |
| 153 | do | 2-dimethylamino-4-N-chloroformyl-N-methylamino-6-fluoro-s-triazine. | 0–10 |

TABLE XI

| Ex. No. | Acylatable coupling component | Reactive component | Temp., degrees | Diazo component |
|---|---|---|---|---|
| 155 | 2,6-diamino-4-(3'-amino-4'-sulphophenylamino)-pyrimidine. | 2,4,6-trichloro-s-triazine | 0-5 | 2-naphthylamine-1,5-disulphonic acid. |
| 156 | do | 2,4,5,6-tetrachloropyrimidine | 80-90 | Do. |
| 157 | do | 2,4-dichloro-pyrimidine-6-carboxylic acid chloride | 30-40 | 1-aminobenzene-2-sulphonic acid. |
| 158 | 2,6-diamino-4-(3'-amino-phenylamino)-pyrimidine. | 2,3-dichloroquinoxaline-6-carboxylic acid chloride | 40-60 | 1-aminobenzene-2,4-disulphonic acid. |
| 159 | do | 2-(4'-sulphophenylamino)-4,6-dichloro-s-triazine | 30-40 | 1-aminobenzene-2,5-disulphonic acid. |
| 160 | do | 2,4,6-trichloropyrimidine | 80-90 | Do. |
| 161 | do | β-(4,5-dichloro-6-pyridazonyl-1)-propionyl chloride | 20-40 | 2-napthylamine-1,5,7-trisulphonic acid. |
| 162 | do | Acid chloride of 1-(4'-carboxyphenyl)-4,5-dichloro-pyridazone-(6). | 20-40 | Do. |
| 163 | 2,6-diamino-4-(3'-amino-6'-sulphophenylamino)-pyrimidine. | β-chloroacrylic acid chloride | 20-40 | 3-amino-6-chlorobenzene-1-sulphonic acid. |
| 164 | do | β-chlorocrotonic acid chloride | 30-50 | 2-amino-5-methyl-benzene-1-sulphonic acid. |
| 165 | do | 1,4-dichloro-phthalazine-6-carboxylic acid chloride | 20-40 | 2-naphthylamine-1,5-disulphonic acid. |
| 166 | do | 2-chlorobenzoxazole-6-carboxylic acid chloride | 30-50 | Do. |
| 167 | do | 2-chlorobenzothiazole-6-carboxylic acid chloride | 30-05 | Do. |
| 168 | do | 2-ethylamino-4-N-chloroformyl-N-ethylamino-6-chloro-s-triazine. | 20-40 | Do. |
| 169 | do | 2-chloro-4-methyl-thiazole-(1,3)-5-carboxylic acid chloride. | 30-50 | Do. |

EXAMPLE 170

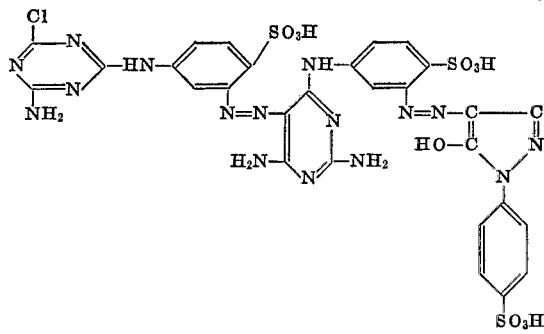

62.3 g. of the aminomonoazo dyestuff of the formula

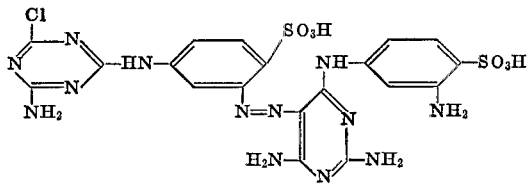

(obtained by coupling diazotised 1-amino-3-[2'-chloro-4'-aminotriazinyl-(6')-amino]-benzene-6-sulphonic acid with 2,6-diamino-4-(3'-amino-4'-sulphophenylamino)-pyrimidine according to Example 123) are suspended in 1000 ml. of water and, at 0–10°, diazotised with 30 ml. of 30% hydrochloric acid and 6.9 g. of sodium nitrite. The diazonium suspension obtained is then poured into a solution of the sodium salt of 25.4 g. of 1-(4'-sulphophenyl)-3-methyl-5-pyrazolone in 200 ml. of water and 30 g. of sodium bicarbonate. On completion of the coupling, the dyestuff is precipitated by the addition of sodium chloride, filtered off and washed with dilute sodium chloride solution. After drying, the dyestuff is a yellow powder which dissolves in water with a yellow colour.

Other reactive dyestuffs having similar properties are obtained with otherwise the same procedure as given above if, instead of the components mentioned in the above example, the equivalent amount of any of the diazo components and first and second coupling components given in the following Table XII is used. The last column gives the shades of the dyeings obtained on wool or cotton with the corresponding azo-pyrimidine dyestuffs.

TABLE XII

| Ex. No. | Diazo component | 1st coupling component | 2d coupling component | Shade |
|---|---|---|---|---|
| 171 | (structure shown) | 2,6-diamino-4-(3'-amino-phenylamino)-pyrimidine. | 1-(2',5'-dichloro-4'-sulphophenyl)-3-methyl-5-pyrazolone. | Yellow. |
| 172 | (structure shown) | 2,6-diamino-4-(3'-amino-4'-sulphophenylamino)-pyrimidine. | 1-(2',5'-disulphophenyl)-3-methyl-5-pyrazolone. | Do. |
| 173 | (structure shown) | 2,6-diamino-4-(3''-amino-4''-sulphophenylamino-carbonyl-(3')-phenyl-amino)-pyrimidine. | 1-(2'-chloro-5'-sulphophenyl)-3-methyl-5-pyrazolone. | Do. |
| 174 | (structure shown) | do | 1-(3'-sulphophenyl-3-methyl-5-pyrazolone. | Do. |

TABLE XII.—Continued

| Ex. No. | Diazo component | 1st coupling component | 2d coupling component | Shade |
|---|---|---|---|---|
| 175 | Cl-pyrimidine(Cl,Cl)-COHN-C6H3(NH2)-SO3H | ...do... | 1-(4'-sulphophenyl)-5-pyrazolone-3-carboxylic acid. | Do. |
| 176 | Cl-CH=CHCOHN-C6H3(NH2)-SO3H | 2,6-diamino-4-(3'-amino-4'-sulphophenylamino)-pyrimidine. | 1-[4',8'-disulphonaphthyl-(2')]-3-methyl-5-pyrazolone. | Do. |
| 177 | Cl-triazine(N(C2H5)2)-N(C2H5)-COHN-C6H3(NH2)-SO3H | ...do... | 1-[5',7'-disulphonaphthyl-(2')]-3-methyl-5-pyrazolone. | Do. |
| 178 | Cl-pyrimidine(Cl,Cl)-NH-C6H3(NH2)-SO3H | ...do... | 1-(4'-sulfophenyl)-5-pyrazolone-3-carboxylic acid. | Do. |
| 179 | Cl-pyrimidine(Cl,Cl)-HN-C6H3(NH2)-SO3H | ...do... | 2'-(3'-sulfophenylamino)-4-(3'-sulfophenylamino)-6-amino-pyrimidine. | Do. |
| 180 | Same as above | ...do... | 2-hydroxynaphthalene-3,6-disulfonic acid. | Orange. |
| 181 | 1-aminobenzene-2,5-disulfonic acid | ...do... | 2-(4'-sulfophenylamino)-4-[3'-(2'',5'',6''-trichloro-pyrimidyl-4''-amino)-phenylamino]-6-methyl-amino-pyrimidine. | Yellow. |
| 182 | 2-aminonaphthalene-1,5-disulfonic acid | ...do... | ...do... | Do. |
| 183 | 1-aminobenzene-2-sulfonic acid | ...do... | 1-[4'-amino-6'-chloro-1',3',5'-triazinyl-(2')-amino]-8-hydroxynaphthalene-4,6-disulfonic acid. | Scarlet. |
| 184 | 1-aminobenzene-2,4-disulfonic acid | ...do... | 1-[2'-sulfo-5'-(4'',6''-dichloro-1'',3'',5''-triazinyl-2''-amino)-phenyl]-3-methyl-5-pyrazolone. | Yellow. |
| 185 | Cl-pyrimidine(Cl)-HN-C6H3(NH2)-SO3H | ...do... | 2-(4'-sulfophenylamino)-4-[6'-sulfo-3'-(2'',6''-dichloropyrimidyl-4''-amino)-phenylamino]-6-amino-pyrimidine. | Do. |
| 186 | Cl-triazine(NH-C6H4-SO3H)-NH-C6H3(NH2)-SO3H | ...do... | 1-[4'-chloro-6'-(3''-sulfophenylamino)-1',3',5'-triazinyl-2'-amino]-8-hydroxynaphthalene-3,6-disulfonic acid. | Scarlet. |

EXAMPLE 187

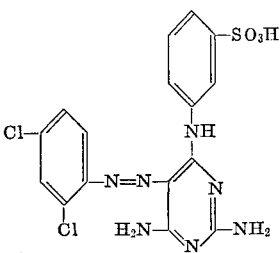

180 g. of 2-amino-4,6-dichloropyrimidine (produced according to M. J. Langermann and C. K. Banks, J. Amer. Chem. Soc. 73, 3012 (1951)) and 500 ml. of dioxan are added to a solution of 173 g. of 1-aminobenzene-3-sulfonic acid in 1000 ml. of water and 100 ml. of 10 N sodium hydroxide solution. The mixture is stirred at the boil and maintained neutral by the dropwise addition of an aqueous sodium carbonate solution. As son as the 1-aminobenzene-3-sulfonic acid is reacted, the mixture is filtered and the filtrate is evaporated to dryness. The residue is dissolved in water. After acidifying this solution with hydrochloric acid, 2-amino-4-(3'-sulfophenylamino)-6-chloropyrimidine precipitates as betaine. It is filtered off and purified by again dissolving in hot dilute sodium hydroxide solution, precipitating with hydrochloric acid and again filtering off.

The moist residue so obtained is stirred for 12 hours at 140° in a closed vessel with 300 ml. of 25% aqueous ammonia solution. After cooling, the reaction mixture is acidified with hydrochloric acid whereupon 2,6-diamino-4-(3'-sulfophenylamino)-pyrimidine precipitates in the form of its betaine. It is filtered off and purified by redissolving in hot dilute sodium hydroxide solution, precipitating with hydrochloric acid and again filtering off. Finally the product is washed well with water and dried.

31 g. of the 2,6-diamino-4-(3'-sulfophenylamino)-pyrimidine so produced are suspended in 1000 ml. of water and dissolved with a weakly alkaline reaction by the addition of sodium hydroxide solution. 10 g. of sodium carbonate are added to this solution which is then cooled and mixed with an ice cold diazonium chloride solution obtained from 16.2 g. of 1-amino-2,4-dichlorobenzene which has been neutralized with sodium bicarbonate. The dyestuff of the formula given above is obtained in the form of its sodium salt. The yellow suspension is heated to 80°, 20% of its volume of sodium chloride is added, the precipitated dyestuff is isolated by filtration, washed with dilute sodium chloride solution and dried. It is a yellow-brown powder which dyes wool and synthetic polyamide textiles in level, yellow shades.

EXAMPLE 188

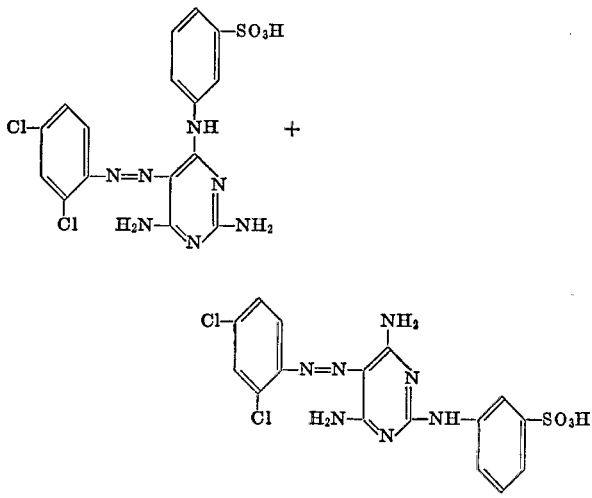

(a) 173 g. of 1-aminobenzene-3-sulfonic acid are dissolved in 1000 ml. of water and 100 ml. of 10 N sodium hydroxide solution. 184 g. of 2,4,6-trichloropyrimidine are added dropwise to this solution at 50° simultaneously with 10 N sodium hydroxide solution. In this way the pH of the mixture is kept at 5–6. The mixture is stirred at 50° and pH 5–6 until the reaction is complete whereupon 240 g. of sodium chloride are added. A mixture of 2,6-dichloro-4-(3'-sulfophenylamino)-pyrimidine and 2-(3'-sulfophenylamino)-4,6 - dichloropyrimidine precipitates. This mixture is filtered off and washed with 20% sodium chloride solution.

The moist filter residue and 60 ml. of 25% aqueous ammonia solution are heated to 140° and stirred for several hours at this temperature in a closed vessel. It is then cooled to 80°, and hydrochloric acid is added dropwise until the reaction is acid to Congo paper, whereupon the reaction product precipitates. It is a mixture of 2,6-diamino-4-(3'-sulfophenylamino)-pyrimidine and 2-(3'-sulfophenylamino)-4,6-diaminopyrimidine. The crystalline product is filtered off, washed well with water and dried.

0.11 g. of this mixture is dissolved in 900 ml. of water and 16 ml. of sodium hydroxide solution, 10 g. of sodium carbonate are sprinkled into the solution which is then cooled. It is then mixed slowly with the neutral, ice-cold diazonium salt solution made from 16.2 g. of 1-amino-2,4-dichlorobenzene. A mixture is formed of the monoazo dyestuffs of the above formulae in the form of their sodium salts. On completion of the coupling, the dyestuffs are precipitated by the addition of sodium chloride, the product is washed on the filter with dilute sodium chloride solution and dried. It is a yellow-brown powder which, from a weakly formic or acetic acid bath without the use of other auxiliaries, produces level, yellow, nonstreaky dyeings on yarns and fabrics made of wool and/or synthetic polyamide fibers, especially on polyamide fabrics which tend to dye in streaks.

If instead of 16.2 g. of 1-amino-2,4-dichloro-benzene the equivalent amount of one of the following diazo components is used and otherwise the procedure in the example is followed, then dyestuffs which also dye wool and synthetic polyamide fibers in level yellow shades are obtained:

(b) 1-amino-2-chloro-benzene,
(c) 1-amino-3-chloro-benzene,
(d) 1-amino-4-chloro-benzene,
(e) 1-amino-4-bromo-benzene,
(f) 1-amino-2,3-dichloro-benzene,
(g) 1-amino-2,4-dibromo-benzene,
(h) 1-amino-2,5-dichloro-benzene,
(i) 1-amino-2,6-dichloro-benzene,
(j) 1-amino-3,4-dichloro-benzene,
(k) 1-amino-2,5-dibromo-benzene,
(l) 1-amino-2-chloro-6-methyl-benzene,
(m) 1-amino-2-methylsulfonyl-benzene,
(n) 1-amino-3-methylsulfonyl-benzene,
(o) 1-amino-4-methylsulfonyl-benzene,
(p) 1-amino-4-ethylsulfonyl-benzene,
(q) 1-amino-4-butylsulfonyl-benzene,
(r) 1-amino-3-methylsulfonyl-6-methyl-benzene,
(s) 1-amino-2-carboxy-benzene,
(t) 1-amino-3-trifluoromethyl-benzene,
(u) 1-amino-3-methylsulfonyl-6-chloro-benzene,
(v) 1-amino-2-cyano-benzene,
(w) 1-amino-4-cyano-benzene,
(x) 1-amino-3-formyl-benzene,
(y) 1-amino-2-methoxycarbonyl-benzene,
(z) 1-amino-4-isopropoxycarbonyl-benzene,
(aa) 1-amino-3-carbamoyl-benzene,
(bb) 1-amino-4-carbamoyl-benzene,
(cc) 1-amino-2-(N,N-dimethylcarbamoyl)-benzene,
(dd) 1-amino-4-(N,N-diethylcarbamoyl)-benzene,
(ee) 1-amino-4-(β-hydroxyethyl)-benzene,
(ff) 1-amino-4-carboxymethyl-benzene,
(gg) 1-amino-4-(β-acetoxy-ethyl)-benzene,
(hh) 1-amino-4-(β-ethoxy-ethyl)-benzene,
(ii) 1-amino-4-(ethoxycarbonyl-methyl)-benzene,
(jj) 1-amino-4-cyanomethyl-benzene,
(kk) 1-amino-2-methoxy-benzene,
(ll) 1-amino-2-ethylthio-5-sulfamoyl-benzene,
(mm) 1-amino-4-acetyl-benzene,
(nn) 1-amino-2-dimethylamino-5-sulfamoyl-benzene,
(oo) 1-amino-3-acetylamino-benzene,
(pp) 1-amino-4-(N-ethyl-N-acetylamino)-benzene,
(qq) 1-amino-4-sulfamoyl-benzene,
(rr) 1-amino-4-(N-ethyl-N-methoxycarbonylamino)-benzene,
(ss) 1-amino-4-(N-ethyl-N-methylsulfonylamino)-benzene,
(tt) 1-amino-3-sulfamoyl-benzene,
(uu) 1-amino-2-(N,N-dimethylsulfamoyl)-benzene,
(vv) 1-amino-2-(N,N-diethylsulfamoyl)-benzene,
(ww) 1-amino-3-(N-methyl-N-butylsulfamoyl)-benzene,
(xx) 1-amino-3-(N,N-dipropylsulfamoyl)-benzene,
(yy) 1-amino-3-[N-ethyl-N-(β-hydroxyethyl)-sulfamoyl]-benzene,
(zz) 1-amino-2-chloro-5-sulfamoyl-benzene,
(ab) 1-amino-2-methyl-5-(N,N-dimethylsulfamoyl)-benzene,
(ac) 1-amino-2-methyl-5-(N-isopropylsulfamoyl)-benzene.

By repeating Example 188, but using instead 16.2 g. of 1-amino-2,4-dichlorobenzene, the equivalent amounts of one of the diazo components given in the following Table XIII, and using a mixture of pyrimidine isomers produced by the same procedure as described in the said example obtained from equivalent amounts of the reactants given in the third and fourth column of Table XIII below and 2,4,6-trichloro-pyrimidine as coupling component, and otherwise following the procedure given in the said Example 188, valuable dyestuffs are obtained which dye wool in the shades given in the last column of this table.

TABLE XIII

| Ex. No. | Diazo component | Coupling component obtained from 2,4,6-trichloropyrimidine and the following reactants— | | Shade on wool |
|---|---|---|---|---|
| | | 1st reactant | 2d reactant | |
| 189 | 1-amino-naphthalene | 1-aminobenzene-4-sulphonic acid | Methylamine | Yellow orange. |
| 190 | 1-amino-4-chloronaphthalene | do | Ethylamine | Do. |
| 191 | 1-amino-4-bromonaphthalene | do | do | Do. |
| 192 | 2-amino-6-sulfamoylnaphthalene | 1-aminobenzene-2-sulfonic acid | Ammonia | Yellow. |
| 193 | 2-amino-6-(N-ethylsulfamoyl)-naphthalene | do | do | Do. |
| 194 | 1-amino-6-[N-ethyl-N-(β-hydroxyethyl)-sulfamoyl]-naphthalene | do | do | Do. |
| 195 | 2-amino-4-(N-butylsulfamoyl)-naphthalene | do | do | Do. |
| 196 | 1-amino-3,6-bis-(N,N-dimethylsulfamoyl)-naphthalene | do | do | Do. |
| 197 | 3-aminopyridine | 1-aminobenzene-3-sulfonic acid | do | Do. |
| 198 | 4-amino-benzotriazole | do | do | Yellow orange. |
| 199 | 8-aminoquinoline | do | do | Do. |
| 200 | 2-aminobenzothiazole | do | do | Do. |
| 201 | 2-amino-6-methoxybenzothiazole | do | do | Do. |
| 202 | 1-amino-2,4-dichlorobenzene | do | Ethylamine | Do. |
| 203 | do | do | Iso-butylamine | Do. |
| 204 | do | 1-amino-2-methylbenzene-5-sulfonic acid | Methylamine | Do. |
| 205 | do | 1-amino-4-(isopropyl)-benzene-6-sulfonic acid | do | Do. |
| 206 | 1-amino-2-chloro-benzene-5-sulfonic acid | 1-aminobenzene | Ethylamine | Do. |
| 207 | 1-amino-2-methyl-benzene-5-sulfonic acid | 1-amino-2-methyl-benzene | Ammonia | Yellow. |
| 208 | 1-amino-2,5-dichlorobenzene-4-sulfonic acid | 1-amino-2,5-dimethyl-benzene | do | Do. |
| 209 | 1-amino-2-chloro-benzene-4-sulfonic acid | 1-amino-4-ethyl-benzene | Ethylamine | Yellow orange. |
| 210 | 4-amino-benzotriazole-6-sulfonic aicd | Aniline | do | Do. |
| 211 | 1 amino-naphthalene-4-sulfonic acid | do | do | Do. |
| 212 | 2-amino-naphthalene-6-sulfonic acid | do | do | Do. |
| 213 | 2-amino-naphthalene-3,6-disulfonic acid | do | Butylamine | Do. |
| 214 | do | do | Octylamine | Do. |
| 215 | 1-amino-2,5-dichlorobenzene | 1-amino-benzene-3-sulfonic acid | Methoxyethylamine | Do. |
| 216 | do | do | Ethyleneimine | Do. |
| 217 | do | do | Pyrrolidine | Do. |
| 218 | do | do | Piperidine | Do. |
| 219 | do | do | Hexamethyleneimine | Do. |
| 220 | do | do | Morpholine | Do. |
| 221 | 2-amino-4,4'-dichloro-diphenylether-2'-sulfonic acid | 1-amino-4-chloronaphthalene | do | Do. |
| 222 | 4-amino-4'-methyl-diphenylsulfide | 1-amino-2-bromobenzene-5-sulfonic acid | Ethylamine | Do. |
| 223 | 2-amino-benzophenone | 1-amino-2-bromobenzene-5-sulfonic acid | do | Do. |
| 224 | 4-amino-4'-methyl-benzophenone | 3-amino-diphenylsulfone-3'-sulfonic acid | do | Do. |
| 225 | 1-amino-4-phenoxycarbonyl-benzene | do | Propylamine | Do. |
| 226 | 2-amino-4'-methyldiphenylsulfone | 3-amino-4-chloro-diphenylsulfone-3'-sulfonic acid | Ammonia | Yellow. |
| 227 | 3-amino-4-chloro-diphenylsulfone | do | do | Do. |
| 228 | 3-amino-4-bromo-diphenylsulfone | 4-amino-benzotriazole-6-sulfonic acid | do | Do. |
| 229 | 1-amino-2-phenoxysulfonyl-benzene | 1,3-diaminobenzene-4-sulfonic acid | do | Do. |
| 230 | 1-amino-3-(3',5'-dimethylphenoxysulfonyl)-benzene | do | Aminoacetic acid | Yellow orange. |
| 231 | 1-amino-4-(2',4'-dichlorophenoxysulfonyl)-benzene | do | α-aminopropionic acid | Do. |

EXAMPLE 232

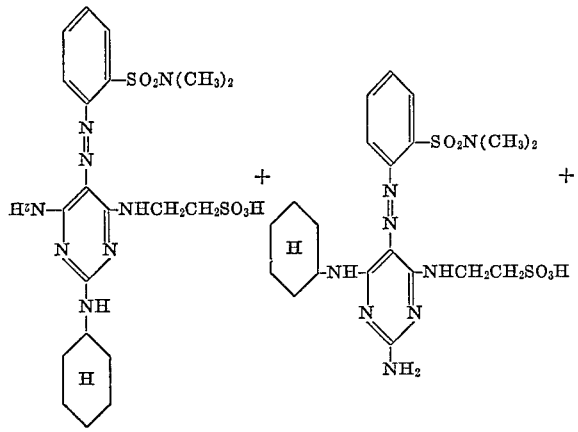

125 g. of β-aminoethane-sulphonic acid are dissolved in 1000 ml. of water and 100 ml. of 10 N sodium hydroxide solution, 184 g. of 2,4,6-trichloropyrimidine are added dropwise at room temperature and the pH of the mixture is maintained at 9–10 by the simultaneous addition of further sodium hydroxide solution. The whole is stirred while gently heating until the condensation is complete.

99 g. of cyclohexylamine are then added to the solution of the reaction products, the mixture is brought to the boil and stirred for several hours at boiling temperature, a phenolphthalein alkaline reaction being maintained by the dropwise addition of sodium hydroxide solution.

As soon as all the cyclohexylamine has been reacted, 300 ml. of 25% aqueous ammonia solution are added to the reaction mixture, the whole is heated to 140° in a closed vessel and it is stirred at this temperature for 12 hours. It is then cooled to 80° and acidified with hydrochloric acid. A mixture of about equal parts of the following pyrimidine compounds precipitates: 2-cyclohexylamino - 4 - (β-sulphoethylamino)-6-amino-pyrimidine, 2-amino - 4 - (β-sulphoethylamino)-6-cyclohexylamino-pyrimidine, 2 - (β-sulphoethylamino)-4-cyclohexylamino-6-amino-pyrimidine.

The product formed is filtered off, purified by dissolving in hot dilute sodium hydroxide solution, precipitated by acidifying with hydrochloric acid and isolated by again filtering. Finally, the filter residue is washed well with water and dried.

0.11 g.-mol of the product is dissolved in 1000 ml. of water while adding sodium hydroxide solution until a phenolphthalein alkaline reaction is obtained. 10 g. of sodium carbonate are added to the solution which is then cooled. It is then mixed slowly with the ice cold diazonium solution prepared from 20 g. of 1-amino-2-(N,N-dimethylsulphamoyl)-benzene and 6.9 g. of sodium nitrite by direct diazotisation in dilute hydrochloric acid followed by neutralisation with sodium bicarbonate. A mixture of about equal parts of the three isomeric dyestuffs of the above formulae in the form of their sodium salts is obtained by the coupling. After complete formation of the dyestuff, the product is precipitated by the addition of sodium chloride. It is filtered off, washed with dilute sodium chloride solution and dried. It dyes textiles made of wool and/or synthetic polyamide fibres in level yellow shades having good fastness to light.

By using each set of the compounds mentioned in the second, third, fourth and fifth columns of the following Table XIV analogously to Example 232, i.e. the diazo component given in the second column instead of 1-amino-2-(N,N-dimethylsulphamoyl)-benzene, the first reactant instead of β-aminoethane sulphonic acid, the second reactant instead of cyclohexylamine and the third reactant instead of ammonia, equally valuable dyestuffs are obtained which dye wool and synthetic polyamide fibres in yellow to yellow-orange shades which are fast to wet and light.

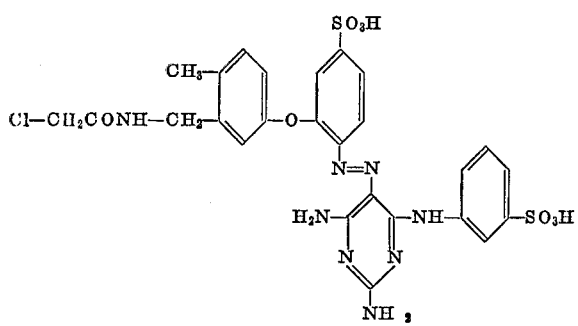

TABLE XIV

| Example No. | Diazo component | Coupling component obtained from 2,4,6-trichloro-pyrimidine and following reactants— | | |
|---|---|---|---|---|
| | | First reactant | Second reactant | Third reactant |
| 233 | 1-amino-3-benzoyl-aminobenzene-6-sulphonic acid | 1-amino-4-sulphamoylnaphthalene. | 1-amino-2-methylbenzene-5-sulphonic acid. | Ethylamine. |
| 234 | 1-amino-3-(4'-chlorobenzoylamino)-benzene-6-sulphonic acid. | 1-amino-4-bromonaphthalene | do | Do. |
| 235 | 1-amino-3-(4'-methylbenzoylamino)-benzene-6-sulphonic acid. | 1-amino-3,6-bis-(N-butyl-sulphamoyl)-naphthalene. | 1-aminobenzene-3-sulphonic acid. | Methylamine. |
| 236 | 1-amino-3-(3'-bromobenzoylamino)-benzene-6-sulphonic acid. | 2-amino-6-[N-ethyl-N-(β-hydroxyethyl)-sulphamoyl]-naphthalene. | do | Do. |
| 237 | 4-amino-2'-nitrodiphenylamine-4'-sulphonic acid | 1-amino-3 nitrobenzene | do | Isopropylamine. |
| 238 | 1-amino-3-(phenylsulphonyamino)-benzene-6-sulphonic acid. | 4-amino-4'-methyldiphenyl-sulphide. | do | Do. |
| 239 | 1-amino-3-(4'-methylphenylsulphonylamino)-benzene-6-sulphonic acid. | 1-amino-4-methylmercapto-benzene. | Aminoacetic acid | Butylamine. |
| 240 | 1-amino-3-(4'-chlorophenylsulphonylamino)-benzene-6-sulphonic acid. | 3-aminopyridine | do | Do. |
| 241 | 1-amino-3-(4'-bromophenylsulphonylamino)-benzene-6-sulphonic acid. | 8-aminoquinoline | β-Aminoethane-sulphonic acid. | Sec. butylamine. |
| 242 | 1-amino-3-chloro-4-(N-benzylcarbamoyl)-benzene | 1-amino-4-methylsulphonyl-benzene. | do | Cyclohexylamine. |
| 243 | 1-amino-3-[N-(4'-chlorophenyl)-carbamoyl]-4-chlorobenzene. | 2-amino-diphenylsulphone-3'-sulphonic acid. | 6-aminohexanoic acid | Ethylamine. |
| 244 | 1-amino-2-[N-(2'-methylphenyl)-N-ethylcarbamoyl]-5-chlorobenzene. | 3-amino-4-chlorodiphenylsulphone-3'-sulphonic acid. | Benzylamine | Do. |
| 245 | 1-amino-2-(N-ethyl-N-phenylcarbamoyl)-benzene. | 4-aminoacetophenone | γ-Aminopropane-sulphonic acid. | Do. |
| 246 | 1-amino-2-(N,N-dicyclohexylcarbamoyl)-benzene. | 3-amino-4-chlorobenzophenone-2'-carbonic acid. | 1-aminobenzene-3-sulphonic acid. | Ammonia. |
| 247 | 1-amino-4-[N-(4'-bromophenyl)-carbamoyl]-benzene. | 4-aminobenzophenone | do | Do. |
| 248 | 1-amino-2-(N-ethyl-N-phenylsulpamoyl)-benzene. | 2-amino-4,4'-dichlorodiphenyl-ether-2'-sulphonic acid. | 1-aminobenzene-3-phosphonic acid. | Ethylamine. |
| 249 | 1-amino-3-[N-(4'-methylphenylsulphonyl)-sulphamoyl]-benzene. | 1-aminobenzene-3-phosphonic acid. | 4-amino-2'-methyldiphenyl-ether-2-sulphonic acid. | Do. |
| 250 | 1-amino-4-(N-cyclohexylsulphamoyl)-benzene. | 4-aminodiphenylether | do | Do. |
| 251 | 1-amino-2-methyl-5-(N-benzoylsulphamoyl)-benzene. | 2-amino-2'-methyldiphenylether-4-sulphonic acid. | 1-aminobenzene-4-phosphonic acid. | Methylamine. |
| 252 | 1-amino-2-methyl-4-[N-(4'-methylbenzoyl)-N-ethylsulphamoyl]-benzene. | do | 1-aminobenzene-3-sulphonic acid. | Do. |
| 253 | 1-amino-4-methyl-6-[N-methyl-N-(3',4'-dimethylphenyl)-sulphamoyl]-benzene. | 1-amino-3-[N-ethyl-N-(4'-sulphopenyl)-carbamoyl]-benzene. | do | Ethylamine. |
| 254 | 1-amino-2-bromo-5-(N-benzyl-sulphamoyl)-benzene | 1-amino-4-[N-(2'-methyl-5'-sulphophenyl)-carbamoyl]-benzene. | do | Do. |
| 255 | 1-amino-2-chloro-5-[N-(4'-chlorophenylsulphonyl)-sulphamoyl]-benzene. | 1-amino-3-(N-cyclohexyl-carbamoyl)-benzene. | do | Do. |
| 256 | 1-amino-3-chloro-6-[N-ethyl-N-(4'-sulphophenyl)-sulphamoyl]-benzene. | 1-amino-3-(N-benzylcarbamoyl)-benzene. | do | Do. |
| 257 | 1-amino-3-chloro-5-[N-(4'-bromophenyl)-sulfamoyl]-benzene. | 1-amino-3-[N-ethyl-N-(β-hydroxyethyl)-carbamoyl]-benzene. | do | Do. |
| 258 | 2-amino-diphenylsulphone-3'-sulphonic acid | 1-amino-2-[N-ethyl-N-(β-hydroxyethyl)-sulphamoyl]-benzene. | Cyclohexylamine | Methylamine. |
| 259 | do | 1-amino-3-(N-benzylsulphamoyl)-benzene. | do | Do. |
| 260 | do | 1-amino-4-(N,N-dicyclohexyl-sulphamoyl)-benzene. | do | Do. |
| 261 | do | 1-amino-2-methyl-5-(N-phenyl-sulphamoyl)-benzene. | do | Do. |
| 262 | do | 1-amino-2-methyl-4-[N-ethyl-N-(4'-sulphophenyl)-sulphamoyl]-benzene. | Benzylamine | Cyclohexylamine. |
| 263 | do | 1-amino-2-chloro-5-[N-4'-methyl-phenylsuphonyl)-sulphamoyl]-benzene. | do | Do. |

EXAMPLE 264

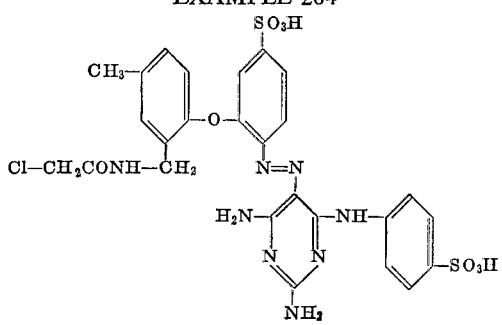

31 g. of 2,6-diamino-4-(3'-sulphophenylamino)-primidine are coupled as described in Example 187 with a diazonium suspension produced by indirect diazotisation from 28.3 g. of 2-amino-4'-methyl-diphenylether-5-sulphonic acid. The monoazo dyestuff formed is isolated and dried.

This dyestuff together with 12.3 g. of chloroacetic acid-N-(hydroxymethyl)-amide are then sprinkled into 1000 ml. of 90%, 0–5° cold sulphuric acid and the whole is stirred for several hours at room temperature. The reaction solution is then poured onto ice, the precipitated dyestuff is filtered off, stirred again in water, and the suspension is neutralised and filtered. Finally the filter residue is washed with dilute sodium chloride solution and dried in vacuo. It is a yellow-brown powder consisting of a mixture of the two compounds of the above formulae. The product dissolves in water with a yellow colour and produces yellow dyeings on wool, silk and synthetic polyamide textiles which have very good wet fastness.

Similar valuable dyestuffs are obtained by the same procedure by using, instead of 12.3 g. of chloroacetic acid-N-(hydroxymethyl)-amide, an equivalent amount of the N-(hydroxymethyl)-amide of one of the following acids: n-butyric acid, acrylic acid, β-chloro-propionic acid, β-bromopropionic acid, α-chloro-acrylic acid, β-chloro-acrylic acid, α-bromo-acrylic acid, β-bromo-acrylic acid, α,β-dichloro-propionic acid, α,β-dibromopropionic acid, crotonic acid, benzoic acid, 4-chloro-benzoic acid.

EXAMPLE 265

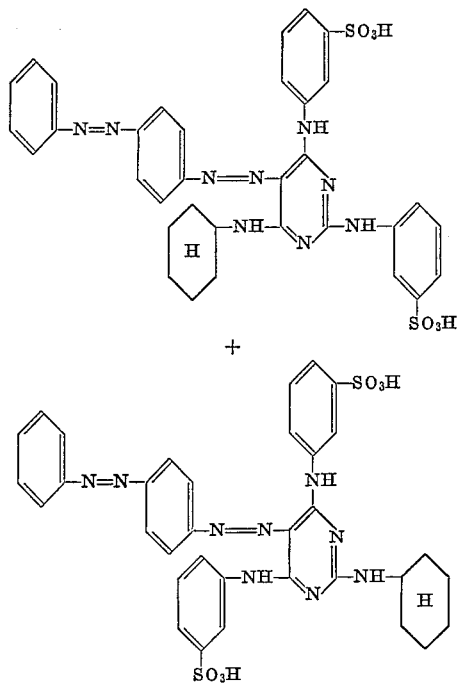

346 g. of 1-aminobenzene-3-sulphonic acid are slurried in 1000 ml. of water and sodium hydroxide solution is added to this suspension until the reaction remains neutral. A clear solution is formed which is heated to 90°. At 90–100°, while stirring well, 184 g. of 2,4,6-trichloropyrimidine are added dropwise and simultaneously sufficient sodium hydroxide solution is added to continuously neutralise the mineral acid liberated in the reaction. On completion of the reaction, 220 g. of cyclohexylamine are added, the whole is heated for some hours in a closed vessel at 130°, again cooled, 120 g. of sodium carbonate are added and excess cyclohexylamine is removed by steam distillation. Hydrochloric acid is added dropwise to the distillation residue until Congo paper turns blue. By then adding sodium chloride a mixture of 2,4-bis-(3'-sulphophenylamino)-6-cyclohexylamino - pyrimidine and 2-cyclohexylamino-4,6 - bis - (3' - sulphophenylamino)-pyrimidine is precipitated. It is filtered off, washed with sodium chloride solution and dried.

19.7 g. of 4-aminoazobenzene are diazotised directly in the usual way whereupon the solution of the diazonium salt obtained is added, at a temperature of 0–10°, to a solution of 0.11 g.-mol of the aforesaid mixture of bis-(3' - sulphophenylamino) - cyclohexylamino - pyrimidne compounds in 500 ml. of water and 12 ml. of 10 N sodium hydroxide solution. The reaction mixture is kept alkaline by the addition of further sodium hydroxide solution after which the disodium salt of the disazo dyestuff of the above formula dissolves with a red colour. The coupling product formed is then precipitated by the addition of sodium chloride; it is filtered; the filter residue is washed with sodium chloride solution and dried. The dyestuff so formed dyes wool and polyamide fibres from a neutral to weakly acid bath in pure scarlet shades. The dyeings on wool are distinguished by very good fastness to light, sea water, washing and milling. Those on polyamide fibres are distinguished by their levelness and also high grade light, perspiration and washing fastness.

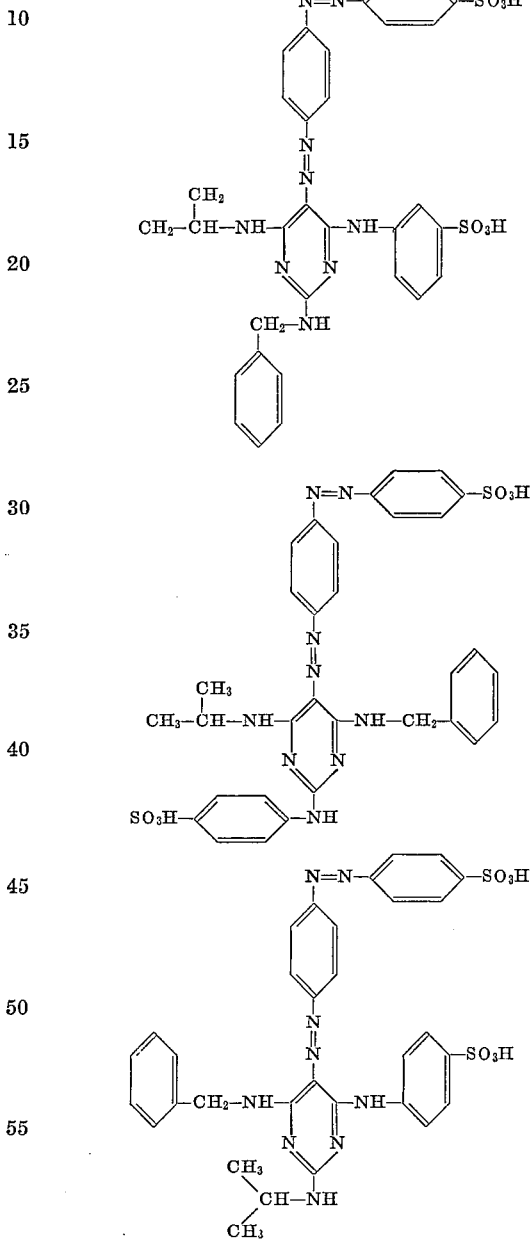

173 g. of 1-aminobenzene-4-sulphonic acid in 1000 ml. of water are reacted at 50–60° and pH 5–6 with 184 g. of 2,4,6-trichloropyrimidine. 107 g. of benzylamine are then added and, at 90–100° and pH 9–10, another chlorine atom of the trichloropyrimidine is replaced by the benzylamino radical. Finally, 177 g. of isopropylamine are added. The mixture is stirred for several hours at 130–140° in a closed vessel and, after cooling, it is acidified with hydrochloric acid. A mixture of the pyrimidine coupling components given in the lower part of the above formulae precipitates. This mixture is filtered off, washed with water and dried.

0.11 g.-mol of this mixture is dissolved in a mixture of water and ethylene glycol monomethyl ether, sodium hydroxide solution being added until the reaction is weakly alkaline. After cooling, 10 g. of sodium carbonate as well as the ice cold, neutral diazonium suspension prepared by indirect diazotisation of 27.7 g. of 4-amino-azobenzene-4'-sulphonic acid are added to this solution.

A mixture of the sodium salts of the 3 isomeric disazo dystuffs corresponding to the above formulae is formed by the coupling reaction. The red suspension is stirred until dyestuff formation is complete, whereupon the product is filtered off, washed with dilute sodium chloride solution and dried. It is a dark powder which dissolves in water with a scarlet colour. It dyes wool, silk and/or synthetic polyamide textiles from a neutral to weakly acid bath in pure red shades which have good wet-fastness properties.

By repeating Example 266, but using equivalent amounts of each set of compounds given in the second, third, fourth and fifth columns of Table XV below, i.e. the diazo component instead of 4-aminoazobenzene-4'-sulphonic acid and the first reactant instead of 1-amino-benzene-4-sulphonic acid, the second reactant instead of benzylamine and the third reactant instead of isopropylamine, and otherwise following the procedure given in the above example, similar valuable dyestuffs are obtained which dye wool and synthetic polyamide fibres in the shades given in the last column of the said table. These dyeings have good fastness to all types of moist conditions and treatments.

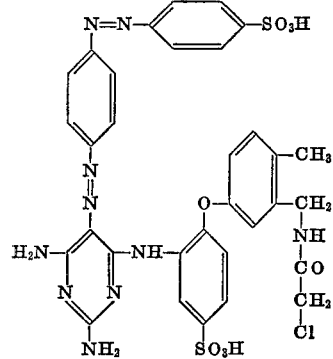

2,6 - diamino-4-[2'-(4''-methylphenoxy)-5'-sulfophen-ylamino]-pyridine is produced in analogous manner to the procedure described in Example 187, from 279 g. of 2-amino-4'-methyl-diphenyl ether-4-sulfonic acid, 180 g. of 2-amino-4,6-dichloro-pyrimidine and 300 ml. of 25% aqueous ammonia solution.

0.11 g.-mol of this compound is coupled as described in the second paragraph of Example 265 with the diazonium compound from 27.7 g. of 4-amino-azobenzene-4'-sulfonic acid. The dry disazo dyestuff and 12.3 g. of chloroacetic acid-N-(hydroxymethyl)-amine are sprinkled into

TABLE XV

| Example No. | Diazo component | Coupling component obtained from 2,4,6-trichloropyrimidine and following reactants— | | | Shade on wool |
|---|---|---|---|---|---|
| | | First reactant | Second reactant | Third reactant | |
| 267 | 4-aminobenzene-4'-sulphonic acid | 1-aminobenzene-2-sulphonic acid. | Cyclohexylamine | Ammonia | Orange-red. |
| 268 | 4-amino-2,6-dimethyl-4'-bromoazobenzene | 1-aminobenzene-4-phosphonic acid. | β-Aminoethane sulphonic acid. | Propylamine | Do. |
| 269 | 2-amino-4,5-dimethyl-2'-nitroazobenzene-4'-sulphonic acid. | 4-aminobenzotriazole-6-sulphonic acid. | Piperidine | Ethylamine | Red. |
| 270 | 1-(3'-aminophenylazo)-2-hydroxynaphthalene-6-sulphonic acid. | 2-amino-diphenylsulphide-4-sulphonic acid. | Aminoacetic acid | Isopropylamine | Orange. |
| 271 | 3-amino-2'-hydroxy-6,4',5'-trimethyl-azobenzene. | 1-amino-2-chloronaphthalene-4-sulphonic acid. | α-amino-β-hydroxy-propionic acid. | Methylamine | Orange-yellow |
| 272 | 4-amino-2-acetylamino-2'-(N,N-diethylcarbamoyl)-azobenzene-5-sulphonic acid. | 2-amino-3,6-bis-[N-ethyl-N-(β-hydroxyethyl)-sulphamoyl]-naphthalene. | β-Aminoethane-sulphonic acid. | Hexylamine | Violet. |
| 273 | 4-amino-2-benzoylamino-4'-cyano-azobenzene-5-sulphonic acid | 1-amino-2-chlorobenzene-5-sulphonic acid. | 1-amino-2-methoxy-benzene. | β-Hydroxyethylamine | Do. |
| 274 | 4-amino-2-(4'-methylbenzoylamino)-3'-trifluoromethyl-azobenzene-5-sulfonic acid. | 3-amino-4-chlorodiphenylsulfone-3'-sulfonic acid. | ε-Aminohexanoic acid. | Butylamine | Do. |
| 275 | 4-amino-2-(3'',4''-dichlorobenzoylamino)-2'-nitro-azobenzene-5,4'-disulfonic acid. | 2-amino-5-[N-ethyl-N-(β-hydroxyethyl)-sulfamoyl]-benzoic acid. | Cyclohexyamine | β-Methoxyethylamine | Do. |
| 276 | 4-amino-2-methylsulfonylamino-4'-acetyl-azobenzene-5-sulfonic acid. | 1-amino-2-methylbenzene-5-sulfonic acid. | 2-amino-5-(N-cyclohexylsulfamoyl)-benzoic acid. | Ethylamine | Do. |
| 277 | 4-amino-2-phenylsulfonylamino-4'-methyl-sulfony-azobenzene-5-sulfonic acid. | 1-amino-3-(3'-sulfophenyl-sulfamoyl)-benzene. | Cyclohexylamine | do | Do. |
| 278 | 4-amino-2-(4'-methylphenyl-sulfonylamino)-3' (N-propyl-carbamoyl)-azobenzene-5-sulfonic acid. | 1-amino-2-[N-ethyl-N-(4'-sulfophenyl)-sulfamyol]-benzene. | do | do | Do. |
| 279 | 4-amino-2-methyl-2'-(N,N-dimethylsulfamoyl)-azobenzene. | 1-amino-3-[N-ethyl-N-(4'-sulfophenyl)-carfamoyl]-benzene. | β-Amino-ethanesulfonic acid. | Methylamine | Orang red. |
| 280 | 4-amino-2-methyl-4'-[N-ethyl-N-(β-hydroxy-ethyl)-sulfamoyl]-azobenzene. | β-amino-4-[N-(2'-sulfo-phenyl])-carbamoyl]-benzene. | do | Cyclohexylamine | Do. |
| 281 | 4-amino-2-methyl-3'-(N-butyl-sulfamoyl)-azobenzene. | 1-aminobenzene-3-sulfonic acid. | do | do | Do. |
| 282 | 1-amino-4-(2'-methoxyphenylazo)-naphthalene | do | do | do | Violet-brown. |
| 283 | 4-amino-3,2'-dimethylazobenzene | do | do | do | Scarlet. |
| 284 | 4-amino-2,5-dimethoxy-4'-nitro-azobenzene | do | do | do | Do. |

EXAMPLE 285

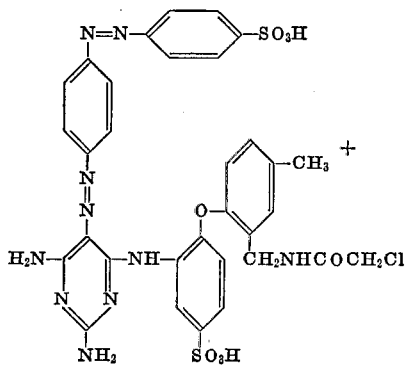

1000 ml. of 90% sulfuric acid at 0° and the whole is stirred for several hours at room temperature. The reaction solution is then poured onto ice, the precipitated dyestuff is filtered off, again stirred in water; the suspension is neutralized and then filtered. Finally the filter residue is washed with dilute sodium chloride solution and dried in vacuo. It consists of a mixture of the dyestuffs of the above formulae in the form of their sodium salts and produces scarlet dyeings on wool, silk or synthetic polyamide fibres. The dyeings have very good wet-fastness properties.

Equally valuable dyestuffs are obtained with otherwise the same procedure if, instead of 12.3 g. of chloroacetic acid-N-(hydroxymethyl)-amide, the equivalent amount of acrylic acid N-(hydroxymethyl)-amide, β-chloropropionic acid-N-(hydroxymethyl)-amide or α,β-dibromoacrylic acid-N-(hydroxymethyl)-amide is used.

EXAMPLE 286

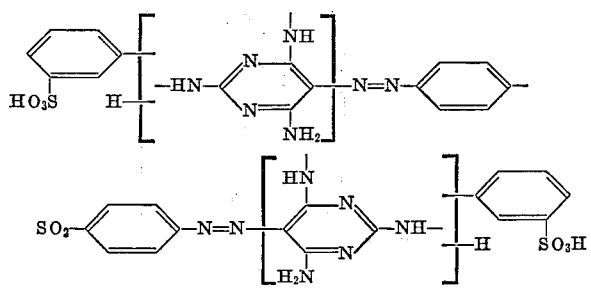

(a) 0.11 g.-mol of the mixture of 2,6-diamino-4-(3'-sulfophenylamino)-pyrimidine and 2-(3'-sulfophenylamino)-4,6-diaminopyrimidine, produced as described in Example 188, is dissolved in dilute sodium hydroxide solution with a weak alkaline reaction, and after adding 10 g. of sodium carbonate, the solution is cooled to 0–5°. It is then mixed slowly with the ice cooled tetrazonium solution from 12.4 g. of 4,4'-diaminodiphenylsulphone, produced by direct diazotisation and subsequent neutralisation with sodium bicarbonate, and the mixture is stirred until the coupling is complete. An orange coloured suspenson consisting of the sodium salt of the disazo dyestuffs of the above formulae is formed. Precipitation of the dyestuffs is completed by the addition of sodium chloride and the mixture is filtered. The residue is washed with dilute sodum chloride solution and dried.

The dry product is an orange-brown powder which dyes wool and/or polyamide fibres such as the polycondensation products of caprolactam or hexamethylenediamine adipate from a neutral to weakly acid dyebath in level yellow-orange shades. The dyeings have excellent fastness to light, washing, water, sea water and perspiration.

Similar valuable dyestuffs are obtained with otherwise the same procedure, but using, instead of the 12.4 g. of 4,4'-diaminodiphenylsulfone the equivalent amount of one of the tetrazo components listed below. Such dyestuffs dye wool and polyamide fibers in fast yellow to yellow orange shades:

(b) 3,3'-diamino-diphenylsulfone,
(c) 2,3'-diamino-diphenylsulfone,
(d) 2,4'-diamino-diphenylsulfone,
(e) 3,4'-diamino-diphenylsulfone,
(f) 3,3'-diamino-4,4'-dichloro-diphenylsulfone,
(g) 3,3'-diamino-4,4'-dimethyl-diphenylsulfone,
(h) 3,3'-diamino-4-methyl-diphenylsulfone-4'-sulfonic acid,
(i) 3,3'-diamino-diphenylsulfone-4,4'-disulfonic acid,
(j) 4,4'-diamino-diphenylethane,
(k) 4,4'-diamino-2,2'-dimethyl-bisphenyl,
(l) N,N'-di-(3'-aminophenylsulfonyl)-butylene-(1,4)-diamine,
(m) 3-[N-(3'-sulfo-4'-aminophenyl)-sulfamoyl]-1-aminobenzene,
(n) 1-amino-2-(4'-aminophenoxy)-5-methylsulfonyl-benzene,
(o) 1-amino-2-(4'-aminophenoxy)-5-[N,N'-di-(β-hydroxyethyl)-sulfamoyl]-benzene,
(p) 1-amino-2-(4'-aminophenoxy)-5-(N-methyl-N-butyl-sulfamoyl)-benzene,
(q) 4,4'-diamino-dibenzoyl,
(r) 4,4'-diamino-dibenzoylmethane,
(s) 4,4'-diamino-dibenzoylethane,
(t) 2,2-di[4'-(2''-aminophenyl-sulfonyloxy)-phenyl]-propane,
(u) 3,3'-diamino-4,4'-dimethoxy-diphenylsulfone.

EXAMPLE 287

Dyestuff obtained from 1 equivalent weight of tetrazotised

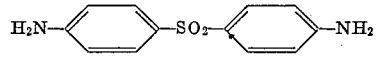

by coupling with 2 equivalent weights of the mixture consisting of the three isomers falling under the formula

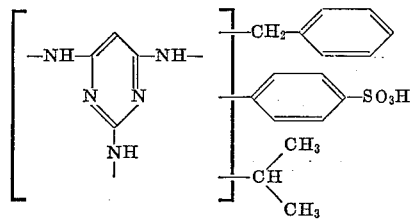

0.11 g.-mol of the ternary mixture of the three isomeric 2,4,6-triaminopyrimidines falling under the above formula produced as described in Example 266 is dissolved in a mixture of water and ethylene glycol monomethyl ether with the addition of sodium hydroxide solution until a weakly alkaline reaction is attained. 10 g. of sodium carbonate are added to this solution which is then cooled and mixed, at 0–10°, with the neutral tetrazonium solution of 12.4 g. of 4,4'-diaminodiphenyl sulphone. The reaction mass is stirred until the coupling is complete, sodium chloride is added to precipitate the coupling products, they are filtered off and washed with dilute sodium chloride solution. After drying, the product is a brown powder. It contains the isomeric disazo dyestuffs described by the above formulae. In water it dissolves with a yellow-orange shade and, from a neutral to weakly acid bath, produces orange dyeings on wool and polyamide fibres which have very good wet-fastness properties.

By repeating Example 287, but using equivalent amounts of the compounds given in the second, third, fourth and fifth columns of the following Table XVI, i.e. the tetrazo component given in the second column in-

TABLE XVI

| Example No. | Tetrazo component | Coupling component obtained from 2,4,6-trichloropyrimidine and following reactants— | | | Shade on wool |
|---|---|---|---|---|---|
| | | First reactant | Second reactant | Third reactant | |
| 288 | 4,4'-diaminodiphenylmethane | 4-aminobenzotriazole-6-sulphonic acid. | Aminoacetic acid. | n-Hexylamine. | Yellow-orange. |
| 289 | 4,4'-diaminodiphenylsulphide | 2-amino-naphthalene-6-sulphonic acid. | 1-aminobenzene-3-phosphonic acid | β-Hydroxyethylamine. | Do. |
| 290 | 3,3'-diamino-4,4'-dibromo-diphenylsulphone | 1,3-diaminobenzene-4-sulphonic acid. | Morpholine. | Ethylamine. | Orange. |
| 291 | 4,4'-diamino-diphenylamine-2-sulphonic acid | 3-amino-4-chloro-diphenyl-sulphone-3'-sulphonic acid. | 1-amino-4-methyl-sulphonylbenzene. | β-Methoxyethylamine. | Do. |
| 292 | 1-amino-2-(3'-aminophenoxysulphonyl)-benzene. | 1-amino-2-methylbenzene-5-sulphonic acid. | 2-amino-3,6-di-[N-ethyl-N-(β-hydroxyethyl)-sulfamoyl]-naphthalene. | Cyclohexylamine. | Do. |
| 293 | 1,1-di-(4'-aminophenyl)-cyclohexane | 1-amino-2-chlorobenzene-5-sulphonic acid. | 1-amino-2-methoxy-benzene. | Ammonia. | Yellow. |
| 294 | 1-amino-3-(4'-aminobenzoylamino)-benzene-6-sulphonic acid. | β-Aminoethane sulphonic acid. | 2-amino-4'-methyl-diphenylether. | Methylamine. | Yellow-orange. |
| 295 | N-(3'-aminophenyl)-N'-(3'-amino-4'-sulphophenyl)-urea. | 1-(N-ethylamino)-benzene-4-sulphonic acid. | 1-amino-3-(N,N-diethylsulphamoyl)-benzene. | Ethylamine. | Do. | stead of 4,4'-diaminodiphenylsulphone, and the first reactant instead of 1-aminobenzene-4-sulphonic acid, the second reactant instead of benzylamine, and the third reactant instead of isopropylamine, and otherwise following the same procedure, similar valuable dyestuffs are obtained which dye wool and synthetic polyamide fibres in the shades given in the last column of the table. The dyeings have very good wet-fastness properties.

EXAMPLE 296

Mixed dyestuff consisting of the four isomers falling under the formula

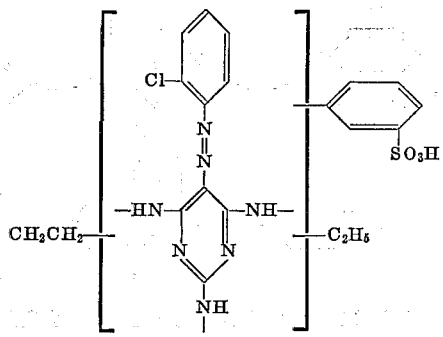

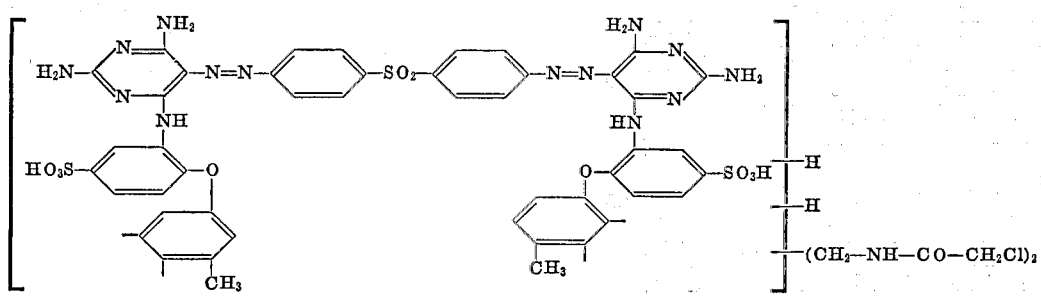

2,6-diamino-4[2' - (4''-methylphenoxy)-5'-sulphophenylamino]-pyrimidine is produced in analogous manner to the procedure described in Example 187 from 279 g. of 2-amino-4'-methyl-diphenyl ether-4-sulphonic acid, 180 g. of 2-amino-4,6-dichloropyrimidine and 300 ml. of 25% aqueous ammonia solution.

0.11 g.-mol of this compound is coupled as described in the first paragraph of Example 287 with the tetrazonium compound from 12.4 g. of 4,4'-diaminodiphenyl sulphone. The dry disazo dyestuc and 12.3 g. of chloroacetic acid-N-(hydroxymethyl)-amide are sprinkled into 1000 ml. of 90% sulphuric acid at 0° and the whole is stirred for several hours at room temperature. The reaction solution is then poured onto ice, the precipitated dyestuff is filtered off, again stirred in water, the suspension is neutralised and then filtered. Finally, the filter residue is washed with dilute sodium chloride solution and dried in vacuo. It consists of a mixture of the four isomeric dyestuffs falling under the above formula, in the form of their sodium salts; this mixed dye affords yellow-orange dyeings having very good wet-fastness properties on wool, silk or synthetic polyamide fibres.

Equally valuable dyestuffs are obtained in otherwise the same way by using, instead of 12.3 g. of chloroacetic acid-N-(hydroxymethyl)-amide, the equivalent amount of acrylic acid N-(hydroxymethyl)-amide, β-chloropropionic acid N - (hydroxymethyl)-amide or α,β - dibromoacrylic acid N-(hydroxymethyl)-amide.

EXAMPLE 297

Mixed dyestuff consisting of the six isomers falling under the formula

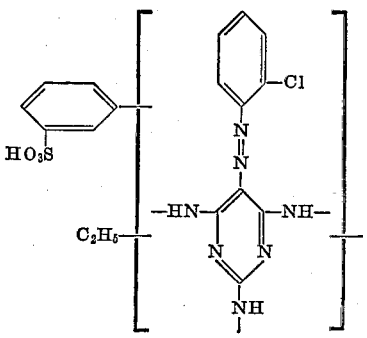

173 g. or 1-aminobenzene-3-sulphonic acid in 1000 ml. of water are condensed at 40–50° and pH 5–6 with 184 g. of 2,4,6-trichloropyrimidine whereupon the reaction product is salted out and filtered off. The moist filter residue is dissolved in hot water and reacted at 90–100° and pH 9–10 with 30 g. of ethylenediamine. On completion of the reaction, the product is precipitated by the addition of sodium chloride, filtered off and recrystallised from water. The product and 300 ml. of a 50% aqueous ethylamine solution are then heated for several hours in an autoclave at 120–130°. After cooling, the reaction mixture is acidified with hydrochloric acid. The precipitated mixture of the six isomeric 2,4,6-triaminopyrimidines of which three fall under the formulae

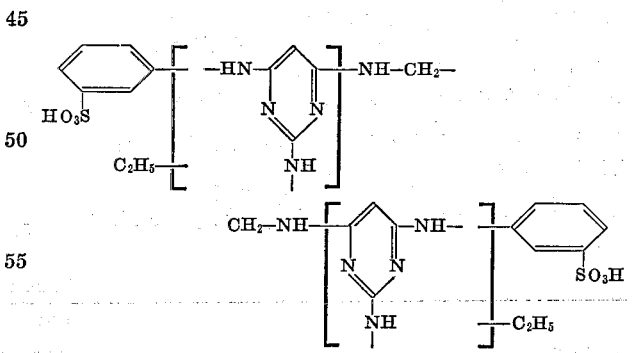

two fall under the formula

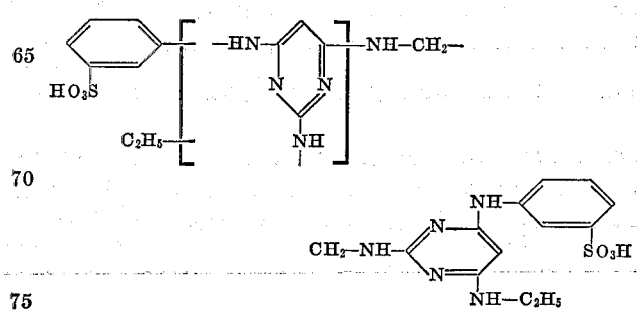

and the sixth isomer is of the formula

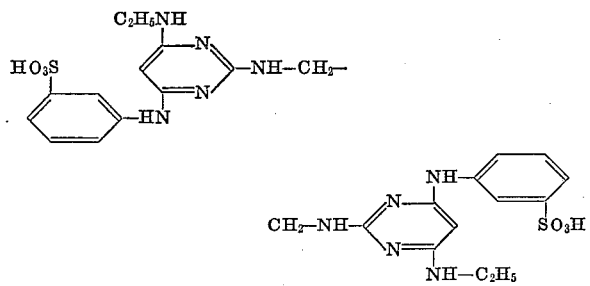

is filtered off, washed with water and dried. It would not be economical to isolate the individual isomers therefrom.

0.051 g.-mol of this mixture is dissolved in dilute sodium hydroxide solution and this solution is mixed at 0–10° with the diazonium solution from 12.8 g. of 1-amino-2-chlorobenzene. The coupling mixture is kept weakly alkaline by the dropwise addition of sodium carbonate solution and it is stirred until the dyestuff formation is complete. The suspension formed contains a mixture of the sodium salts of isomeric disazo dyestuffs corresponding to the above formulae. The suspension is filtered, the residue washed with sodium chloride solution and dried. The product so obtained is a yellow-brown powder which, from a neutral to weakly acid bath, dyes natural or synthetic polyamide textiles such as wool in reddish-yellow shades which have excellent wet-fastness properties.

By repeating Example 297, but using equivalent amounts of each set of compounds listed in the second, third, fourth and fifth columns of the following Table XVII, i.e. the diazo component given in the second column instead of 1-amino-2-chloro-benzene, and the first reactant instead of 1-aminobenzene-3-sulphonic acid, the second reactant instead of ethylenediamine, and the third reactant instead of ethylamine and the following procedure given in the said example, similar valuable dyestuffs are obtained which dye wool and synthetic polyamides in yellow to yellow-orange shades which have very good wet-fastness properties.

EXAMPLE 308

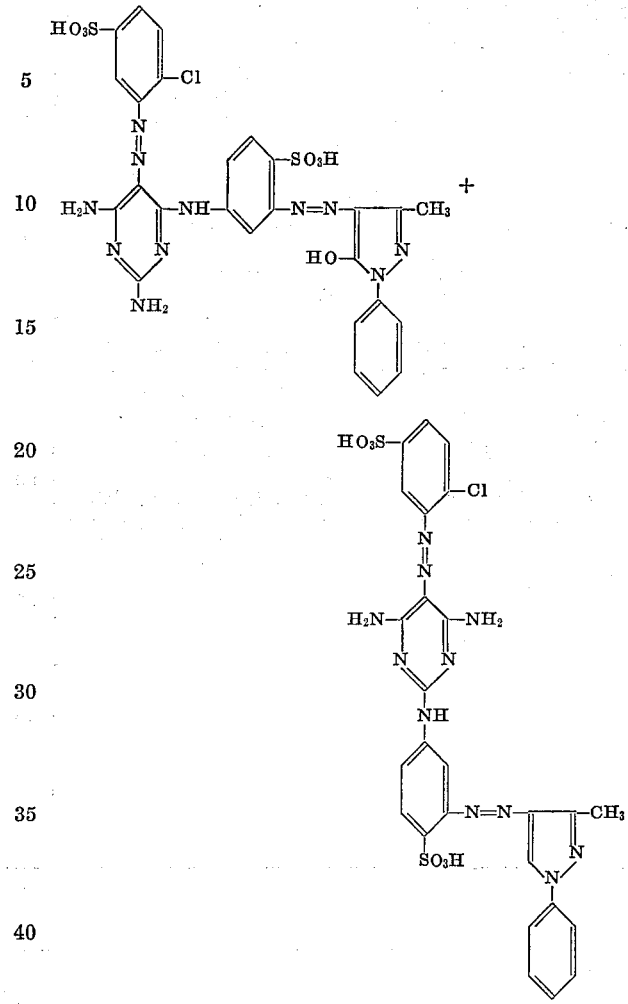

188 g. of 1,3-diaminobenzene-4-sulphonic acid are condensed analogously to Example 188 with 184 g. of 2,4,6-trichloropyrimidine and the condensation product is reacted with 600 ml. of 25% ammonia solution. 0.11 g.-mol of the mixture so produced consisting of 2,6-diamino-4-(3'-amino-4'-sulphophenylamino)-pyrimidine and 2-(3'-amino-4'-sulphophenylamino)-4,6-diamino-pyrimidine is coupled in weakly alkaline solution with the diazo compound of 20.8 g. of 1-amino-2-chlorobenzene-5-sulphonic acid and the monoazo dyestuffs formed are precipitated with sodium chloride. They are filtered off, again dissolved in dilute sodium hydroxide solution, 6.9 g. of sodium

TABLE XVII

| Example No. | Diazo component | Coupling component obtained from 2,4,6-trichloropyrimidine and the following reactants— | | |
|---|---|---|---|---|
| | | First reactant | Second reactant | Third reactant |
| 298 | 3-amino-4-chlorodiphenylsulphone-3'-sulphonic acid. | 2-aminobenzoic acid | Hydrazine | Ammonia. |
| 299 | 1-amino-3-[N-(2'-chloro-6'-methylphenyl)-sulphamoyl]-benzene. | 1-amino-2-methylbenzene-4-sulphonic acid. | Butylenediamine-(1.4) | Benzylamine. |
| 300 | 1-amino-3-(N-phenylsulphonyl-sulphamoyl)-benzene. | 1-amino-2-chlorobenzene-4-sulphonic acid. | β,β'-Diamino-diethylether | Cyclohexylamine. |
| 301 | 1-amino-2-(N,N-dimethylsulphamoyl)-benzene | 1-ethylaminobenzene-4-sulphonic acid. | β,β'-Diamino-diethylthio-ether. | Dimethylamine. |
| 302 | 1-amino-4-[N,N-di-(β-hydroxyethyl)-sulphamoyl]-benzene. | 1-amino-benzene-4-phosphonic acid. | 4,4'-diaminocyclohexane | Isopropylamine. |
| 303 | 1-amino-4-methylsulphonyl-benzene | 2-aminonaphthalene-6-sulphonic acid. | Propylenediamine-(1.3) | n-Butylamine. |
| 304 | 1-amino-2-methyl-5-nitrobenzene | 2-amino-4'-methyldiphenyl-ether-4-sulphonic acid. | Ethylene-diamine | β-Hydroxyethylamine |
| 305 | 1-amino-4-cyanobenzene | 3-amino-4-chloro-diphenyl-sulphone-3'-sulphonic acid. | 2,3-diaminopropane | Ethylamine. |
| 306 | 1-amino-3-trifluoromethylbenzene | β-Aminoethanesulphonic acid | 1,3-diamino-cyclohexane | n-Butylamine. |
| 307 | 1-amino-3-(N-cyclohexylsulphamoyl)-benzene | do | Ethylenediamine | Ethylamine. | nitrite are added and the yellow solution is dropped onto hydrochloric acid and ice. The mixture which is acid to Congo paper is stirred until diazotisation is complete, excess nitrous acid is decomposed with sulphamic acid and the excess mineral acid is neutralised with sodium bicarbonate. This diazo solution is added dropwise at 0–10° to a solution of 17.4 g. of 1-phenyl-3-methyl-5-pyrazolone and 10 g. of sodium carbonate in 200 ml. of water and 11 ml. of 10 N sodium hydroxide solution. The disazo dyestuffs of the above formulae are obtained by the coupling in the form of their sodium salts. On completion of the reaction they are precipitated from the reaction mixture by the addition of sodium chloride, filtered off and the residue is washed with sodium chloride solution. After drying, the product is a brown powder which dyes wool, silk and synthetic polyamide fibres from a neutral or acid bath in yellow shades. The dyeings are fast to light and have very good wet-fastness properties.

By repeating Example 308, but using equivalent amounts of each set of compounds given in the second, third, fourth and fifth columns of the following Table XVIII, i.e. the diazo component given in the second column instead of 1-amino-2-chlorobenzene-5-sulphonic acid, the first amino compound given in the third column and being required for the production of the first coupling component instead of 1,3-diaminobenzene-4-sulphonic acid, the second amino compound given in the fourth column instead of ammonia, and the second coupling component given in the fifth column instead of 1-phenyl-3-methyl-5-pyrazolone, and following procedures analogous to the above Example 308, similar valuable dyestuffs are obtained which dye wool and synthetic polyamides in the shades given in the last column of the table. The dyeings have good wet-fastness properties.

23 g. of 1-acetylamino-3-aminobenzene-4-sulphonic acid are dissolved in 200 ml. of water with a neutral reaction and the solution is diazotised at 0–5° with 6.9 g. of sodium nitrite and 30 ml. of 30% hydrochloric acid. The diazo suspension obtained which is acid to Congo paper is brought to pH 4.5 with sodium carbonate solution and then it is added to a solution of 28 g. of 2,6-diamino-4-(3'-sulphophenylamino)-pyrimidine in 800 ml. of water and 15 g. of sodium bicarbonate. On completion of the coupling, concentrated sodium hydroxide solution or caustic soda is added to the dyestuff solution so that a 5% sodium hydroxide solution is obtained and the whole is heated at 70–80° until the acetylamino group is completely saponified. The reaction solution is cooled, neutralised with concentrated hydrochloric acid and the dyestuff is precipitated completely by the addition of sodium chloride. After filtering and washing with dilute sodium chloride solution, the aminomonoazo dyestuff so obtained is dissolved in 400 ml. of water. A solution of 21 g. of 2,4,5,6-tetrachloropyrimidine in 50 ml. of acetone is added dropwise to this dyestuff solution at 70°, and the pH is kept at 6–7 by the simultaneous addition of sodium carbonate solution. On completion of the condensation, the dyestuff is precipitated with sodium chloride, filtered off and washed with sodium chloride solution. After drying in vacuo, a yellow powder is obtained which dissolves in water with a yellow colour.

Instead of 1-acetylamino-3-aminobenzene-4-sulphonic acid, e.g. 1-nitro-3-aminobenzene-4-sulphonic acid can also be used. The corresponding aminoazo dyestuff can also be obtained by reduction of the nitro group with sodium sulphide.

4 g. of the dyestuff obtained according to Example 328, are dissolved in 1000 ml. of water, and 20 g. of sodium carbonate are added. 100 g. of cotton are introduced at 20°

TABLE XVIII

| Ex. No. | Diazo component | First coupling component obtained from 2,4,6-trichloropyrimidine and the following amino compounds | | Second coupling component | Shade on wool |
|---|---|---|---|---|---|
| | | First amino compound | Second amino compound | | |
| 309 | 1-aminonaphthalene-6-sulphonic acid. | 1,3-diamino-benzene-4-sulphonic acid. | Methylene | 1-hydroxy-4-methyl-benzene | Brown. |
| 310 | 2-amino-3,6-di-[N-ethyl-N-(β-hydroxyethyl)-sulphamoyl]-naphthalene. | do | Ethylamine | N,N-dimethylamino-benzene | Do. |
| 311 | 4-amino-benzotriazole-6-sulphonic acid. | 1,4-diamino-benzene-3-sulphonic acid. | Iso-propylamine | 2,4,6-tri-(cyclohexylamino)-pyrimidine. | Yellow-orange. |
| 312 | 1-amino-2-methylbenzene-5-sulphonic acid. | do | Diethylamine | 2,4,6-tri-(benzylamino)-pyrimidine. | Do. |
| 313 | 1-aminobenzene-4-phosphonic acid | 1,6-diaminonaphthalene-3-sulphonic acid. | Cyclohexylamine | 2,6-diamino-4-(2'-methyl-5'-sulphophenylamino)-pyrimidine. | Do. |
| 314 | 1-amino-3-trifluoromethyl-benzene | 4,4'-diaminodiphenyl-3-sulphonic acid. | n-Butylamine | 2,6-diamino-4-(β-sulphoethyl-amino)-pyrimidine. | Orange. |
| 315 | 4-aminophenylacetic acid | do | do | 2,6-diamino-4-[2'-(2''-methyl-phenoxy)-4'-sulphophenyl-amino]-pyrimidine. | Do. |
| 316 | 1-amino-4-methylsulphonyl-benzene. | 1,3-diamino-4-methylbenzene-5-sulphonic acid. | Benzylamine | Acetoacetic-acid-N-(2-methyl-5-sulphophenyl)-amide. | Yellow-orange. |
| 317 | 1-amino-2-methoxy-benzene | do | Amino-acetic acid | Acetoacetic acid-N-(2-chloro-phenyl)-amide. | Do. |
| 318 | 2-amino-2'-methyl-diphenylether-4-sulphonic acid. | 1,3-diamino-2-chloro-benzene-5-sulphonic acid. | Ethylamine | Benzoylacetic acid amide | Do. |
| 319 | 3-amino-6-methyl-diphenylsulphone-3'-sulphonic acid. | 1,3-diamino-benzene-4-sulphonic acid. | 1-amino-4-methylbenzene | Acetoacetic acid-N-butylamide | Do. |
| 320 | 1-amino-4'-methyl-diphenylsulphide. | do | Ammonia | 1-(4'-bromophenyl)-3-methyl-5-pyrazolone. | Yellow. |
| 321 | 4-amino-2'-nitro-diphenyl amine-4'-sulphonic acid. | 1,3-diaminobenzene-4-sulphonic acid. | Ethylamine | 1-phenyl-3-carboxy-5-pyrazolone. | Yellow-orange. |
| 322 | 3-amino-4-chlorobenzophenone-2'-carboxylic acid. | do | do | 1,3-diphenyl-5-pyrazolone | Do. |
| 323 | 1-amino-4-methyl-5-(N-phenylsulphamoyl)-benzene. | do | do | 1-(3'-sulphamoylphenyl)-3-methyl-5-pyrazolone. | Do. |
| 324 | 1-amino-4-(N-cyclohexyl-carbamoyl)-benzene. | do | Aminoacetic acid | 1-(3'-acetylaminophenyl)-3-methyl-5-pyrazolone. | Do. |
| 325 | 1-amino-4-(4'-methylphenylsulphonylamino)-benzene. | 1,3-diaminobenzene-4-sulphonic acid. | Ethylamine | 1-(1-naphthyl)-3-methyl-5-pyrazolone. | Do. |
| 326 | 1-amino-2-[N-ethyl-N-(β-hydroxyethyl)-sulphamoyl]-benzene. | do | do | 1-(3'-nitrophenyl)-3-methyl-5-pyrazolone. | Do. |
| 327 | 1-amino-2-(2'-chlorophenoxysulphonyl)-benzene. | do | do | 1-(2'-methyl-5'-sulphophenyl)-3-methyl-5-pyrazolone. | Do. |

EXAMPLE 328

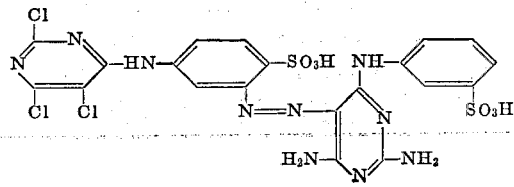

and the bath is heated for 30 minutes at either 40° or 90° depending on the reaction components. 80 g. of sodium chloride are added to the liquor and the dyeing is continued for 1 hour at the same temperature. The dyeing obtained is then rinsed and soaped at the boil for 15 minutes. In this way a deep yellow, wash-fast dyeing is obtained.

By using instead of the 21 g. of 2,4,5,6-tetrachloropyrimidine, equivalent amounts of a compound introducing a fibre-reactive grouping as listed in column II of the following Table XIX and performing the condensation with the aminoazo dyestuff in the manner described in the above example at the temperature range given in column III of the table, dyestuffs having similar properties are obtained.

TABLE XIX

| Example No. | I Reactive Component | III Temperature, degrees |
|---|---|---|
| 329 | 2,4,6-trichloro-s-triazine | 0-10 |
| 330 | 2,4,6-tribromo-s-triazine | 0-10 |
| 331 | 2-methoxy-4,6-dichloro-s-triazine | 20-40 |
| 332 | 2-ethoxy-4,6-dichloro-s-triazine | 20-40 |
| 333 | 2-phenoxy-4,6-dichloro-s-triazine | 20-40 |
| 334 | 2-mercapto-4,6-dichloro-s-triazine | 20-40 |
| 335 | 2-ethylthio-4,6-dichloro-s-triazine | 20-40 |
| 336 | 2-phenylthio-4,6-dichloro-s-triazine | 20-40 |
| 337 | 2-methyl-4,6-dichloro-s-triazine | 20-40 |
| 338 | 2-phenyl-4,6-dichloro-s-triazine | 20-40 |
| 339 | 2-amino-4,6-dichloro-s-triazine | 20-40 |
| 340 | 2-methylamino-4,6-dichloro-s-triazine | 20-40 |
| 341 | 2-butylamino-4,6-dichloro-s-triazine | 20-40 |
| 342 | 2-diethylamino-4,6-dichloro-s-triazine | 20-40 |
| 343 | 2-hydroxyethylamino-4,6-dichloro-s-triazine | 20-40 |
| 344 | 2-sulfoethylamino-4,6-dichloro-s-triazine | 20-40 |
| 345 | 2-N-sulfoethyl-N-methylamino-4,6-dichloro-s-triazine | 20-40 |
| 346 | 2-phenylamino-4,6-dichloro-s-triazine | 20-40 |
| 347 | 2-N-methyl-N-phenylamino-4,6-dichloro-s-triazine | 20-40 |
| 348 | 2-(2'-sulfophenylamino)-4,6-dichloro-s-triazine | 20-40 |
| 349 | 2-(2',5'-disulfophenylamino)-4,6-dichloro-s-triazine | 20-40 |
| 350 | 2-(4'-sulfophenoxy)-4,6-dichloro-s-triazine | 20-40 |
| 351 | 2-(4'-carboxyphenoxy)-4,6-dichloro-s-triazine | 20-40 |
| 352 | 2-(4'-sulfophenylthio)-4,6-dichloro-s-triazine | 20-40 |
| 353 | 2-cyclohexylamino-4,6-dichloro-s-triazine | 20-40 |
| 354 | 2-morpholino-4,6-dichloro-s-triazine | 20-40 |
| 355 | 2,4,6-trichloropyrimidine | 80-90 |
| 356 | 2,4,6-tribromopyrimidine | 80-90 |
| 357 | 5-methyl-2,4-6-trichloropyrimidine | 80-90 |
| 358 | 5-phenyl-2,4,6-trichloropyrimidine | 80-90 |
| 359 | 5-cyano-2,4,6-trichloropyrimidine | 80-90 |
| 360 | 5-nitro-2,4,6-trichloropyrimidine | 80-90 |
| 361 | 5-carbomethoxy-2,4,6-trichloropyrimidine | 80-90 |
| 362 | 5-nitro-2-methyl-4,6-dichloropyrimidine | 80-90 |
| 363 | 5-nitro-6-methyl-2,4-dichloropyrimidine | 80-90 |
| 364 | 2-methylsulfonyl-4-methyl-6-chloropyrimidine | 60-80 |
| 365 | 2-methylsulfonyl-4-methyl-5,6-dichloropyrimidine | 60-80 |
| 366 | 2,4-dichloropyrimidine-6-carboxylic acid chloride | 20-40 |
| 367 | 2,4,5-trichloropyrimidine-6-carboxylic acid chloride | 20-40 |
| 368 | 2,4-dichloropyrimidine-5-carboxylic acid chloride | 0-10 |
| 369 | 2,4-dichloro-6-methylpyrimidine-5-carboxylic acid chloride | 10-20 |
| 370 | 2,3-dichloroquinoxaline-6-carboxylic acid chloride | 40-60 |
| 371 | 2-3,dichloroquinoxaline-6-sulfonic acid chloride | 40-60 |
| 372 | 2,4-dichloroquinazoline-6-carboxylic acid chloride | 40-60 |
| 373 | 2,4-dichloroquinazoline-7-carboxylic acid chloride | 60-60 |
| 374 | 1,4-dichlorophthalazine-6-carboxylic acid chloride | 20-40 |
| 375 | β-[4,5-dichloropyridazonyl-(1)]-propionic acid chloride | 20-40 |
| 376 | [acid chloride from 1-(4'-carboxyphenyl)-4,5-dichloropyridazone-(6)] | 20-40 |
| 376 a | 2-ethylamino-4-N-chloroformyl-ethylamino-6-chloro-s-triazine | 20-30 |
| 377 | 2-dimethylamino-4-N-chloroformyl-methylamino-6-fluoro-s-triazine | 0-20 |
| 378 | 2-N-methyl-N-phenylamino-4-N-chloroformyl-methylamino-6-chloro-s-triazine | 20-30 |
| 379 | 2-methoxy-4-N-chloroformyl-ethylamino-6-chloro-s-triazine | 20-30 |
| 380 | 2-phenoxy-4-N-chloroformyl-methylamino-6-chloro-s-triazine | 20-30 |
| 381 | 2-morpholino-4-N-chloroformyl-methylamino-6-bromo-s-triazine | 20-30 |
| 382 | 2-methylthio-4-N-chloroformyl-methylamino-6-chloro-s-triazine | 20-30 |
| 383 | 2-phenylthio-4-N-chloroformyl-ethylamino-6-chloro-s-triazine | 20-30 |
| 384 | 2-butylamino-4-N-chloroformyl-butylamino-6-chloro-s-triazine | 20-30 |
| 385 | 2,2,3,3-tetrafluorocyclobutane-carboxylic acid chloride | 20-40 |
| 386 | β-2,2,3,3-tetrafluorocyclobutane-acrylic acid chloride | 20-40 |
| 387 | 2-chlorobenzothiazole-5-carboxylic acid chloride | 30-50 |
| 388 | 2-chlorobenzothiazole-5-sulphonic acid chloride | 30-50 |
| 389 | 2-chlorobenzoxazole-5-carboxylic acid chloride | 30-50 |
| 390 | 2-chlorobenzoxazole-5-sulphonic acid chloride | 30-50 |
| 391 | 3-nitro-4-fluorobenzene-1-carboxylic acid chloride | 20-40 |
| 392 | 3-nitro-4-fluorobenzene-1-sulphonic acid chloride | 20-40 |
| 393 | 3-nitro-6-fluorobenzene-1-carboxylic acid chloride | 20-40 |
| 394 | 3-nitro-6-fluorobenzene-1-sulphonic acid chloride | 20-40 |
| 395 | 3-nitro-4-chlorobenzene-1-carboxylic acid chloride | 20-40 |
| 396 | 3-nitro-6-chlorobenzene-1-carboxylic acid chloride | 20-40 |
| 397 | 3-methylsulfone-4-fluorobenzene-1-carboxylic acid chloride | 20-40 |
| 398 | 3-phenylsulfone-4-fluorobenzene-1-sulphonic acid chloride | 20-40 |
| 399 | chloracetyl chloride | 20-40 |
| 400 | β-chloropropionic acid chloride | 20-40 |
| 401 | α,β-dichloropropionic acid chloride | 20-40 |
| 402 | α,β-dibromopropionic acid chloride | 20-40 |
| 403 | α-chloroacrylic acid chloride | 20-40 |
| 404 | β-chloroacrylic acid chloride | 20-40 |
| 405 | α,β,β-trichloroacrylic acid chloride | 20-40 |
| 406 | chloromaleic acid anhydride | 50-70 |
| 407 | β-chlorocrotonic acid chloride | 30-50 |
| 408 | propiolic acid chloride | 20-40 |

EXAMPLE 409

67 g. of the dyestuff of the formula

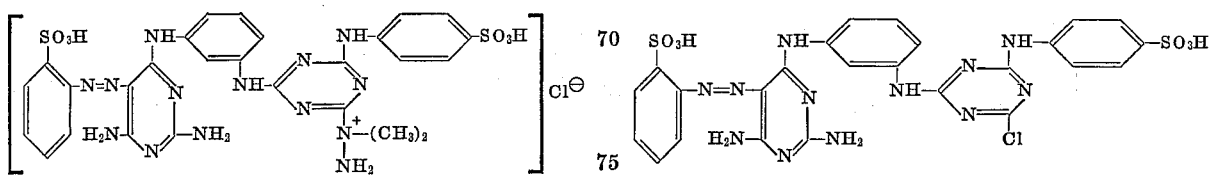

produced by condensation of the amino monoazo dyestuff of the formula

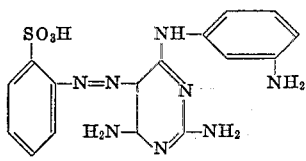

with 2 - (4''-sulphophenylamino)-4,6-dichloro-s-triazine, are dissolved in 1000 ml. of water. The pH of the solution is 7. 8 g. of N,N-dimethyl hydrazine are added dropwise to this solution at 25° whereupon the pH rises to about 9.5. On completion of the reaction, the pH is again adjusted to 7 with diluted hydrochloric acid and the new dyestuff is precipitated with sodium chloride, filtered off, washed with sodium chloride and dried in vacuo at 40–50°. It is a yellow powder which dissolves in water with a yellow colour.

Cotton is pad-dyed at 20° with a 2%-aqueous solution of this dyestuff to which 20 g. of sodium carbonate and 200 g. of urea per liter have been added, the impregnated goods are dried, then heated for 5 minutes at 110° and finally soaped at the boil for 30 minutes, whereby a pure, strongly coloured yellow dyeing is obtained which is fast to wet treatments.

By condensing the aminomonoazo dyestuff of Example 409 with equivalent amounts of 2,4,6-trichloro-s-triazine, 2,4,6 - trichloro-pyrimidine, 2,4,5,6-tetrachloropyrimidine, 2,4-dichloropyrimidine-5-carboxylic acid chloride, 2,4-dichloropyrimidine-6-carboxylic acid chloride, 2-ethylamino-4 - N-chloroformyl-ethylamino-6-chloro-s-triazine instead of with 2-(4-sulphophenylamino)-4,6-dichloro-s-triazine, and reacting this compound with an equivalent amount of
(a) acetone-N,N-dimethyl hydrazone,
(b) trimethylamine,
(c) N,N-dimethyl-N-ethylamine,
(d) N,N-dimethyl-N-β-hydroxyethylamine,
(e) N,N-dimethyl-N-allylamine,
(f) N,N-dimethyl-N-benzylamine,
(g) N,N-dimethyl-N-cyclohexylamine,
(h) N-methyl-pyrrolidine,
(i) N-methyl-morpholine,
(j) N,N-dimethyl-hydrazine,
(k) N-aminopiperidine,
(l) N-aminomorpholine,
(m) pyridine,
(n) 3-methylpyridine, or
(o) 1,4-diaza-bicyclo[2.2.2]-octane, as described in the above example, reactive dyestuffs are obtained which afford wet-fast yellow dyeings on cellulose or polyamide fibres by the processes usual for dyeing such dyestuffs, e.g. that described in Example 409.

EXAMPLE 409A

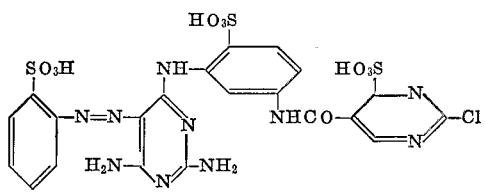

48 g. of the dyestuff of the formula

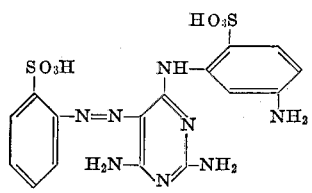

obtained by coupling diazotised 1-aminobenzene-2-sulphonic acid with 2,6-diamino-4-(3'-amino-6'-sulphophenylamino)-pyrimidine, are dissolved with a neutral reaction in 1000 ml. of water. 23 g. of 2,4-dichloropyrimidine-5-carboxylic acid chloride in 50 ml. of acetone are added dropwise at 0–10° to this dyestuff solution and the pH is kept at 6 by the simultaneous addition of sodium carbonate solution. The reaction mixture is stirred until no more diazotisable amino groups can be traced whereupon 12.6 g. of sodium sulphite are added at room temperature and the whole is stirred until the pH remains stable. The newly formed dyestuff is salted out with sodium chloride, filtered, washed with sodium chloride solution and dried in vacuo at 40–50°. It corresponds substantially to the formula first mentioned above and dissolves in water with a yellow colour. It dyes cotton by the processes usual for reactive dyestuffs in wet-fast yellow shades.

By using instead of the 23 g. of 2,4-dichloropyrimidine-5-carboxylic acid chloride, equal amounts of 2,4-dichloropyrimidine-6-carboxylic acid chloride and otherwise repeating Examples 409A, a dyestuff is obtained which has similar fastness properties but less reactivity.

Other dyestuffs having somewhat less reactivity are also obtained when using 19.6 g. of the sodium salt of 1-hydroxybenzene-4-sulphonic acid, 17.7 g. of the sodium salt of 1-mercapto-4-nitrobenzene or 19.5 g. of 1-aminobenzene-4-sulphonic acid instead of 12.6 g. of sodium sulphite with otherwise the same reaction conditions as given in Example 409A.

EXAMPLE 410

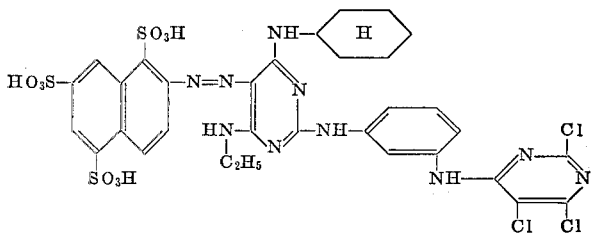

38.3 g. of 2-naphthylamine-1,5,7-trisulphonic acid are dissolved with a neutral reaction in 300 ml. of water and the solution is diazotised at 0–5° with 25 ml. of 30% hydrochloric acid and 6.9 g. of sodium nitrile. The diazonium solution is adjusted with sodium carbonate to pH 4.5 and then poured into a suspension of 35.5 g. of 2-(3'-nitrophenylamine)-4-cyclohexylamino - 6 - ethylamino-pyrimidine in 900 ml. of water and 20 g. of sodium bicarbonate. On completion of the coupling, the pH of the dyestuff solution is raised to 9 and then, at 70–80°, a solution of 14 g. of sodium sulphide in 100 ml. of water is slowly added dropwise. Reduction is performed at this temperature until no more nitro compound can be traced, 40 g. of sodium bicarbonate are added to the cooled dyestuff solution and precipitated sulphur is removed. The dyestuff is completely precipitated by the addition of sodium chloride, filtered, washed with sodium chloride solution and then again dissolved in 700 ml. of water. After adding 20 g. of 2,4,5,6-tetrachloropyrimidine, the whole is heated to 80–90° and condensation is performed at this temperature until no more free amino groups can be traced.

After cooling, the new dyestuff is precipitated by adding sodium chloride, filtered, washed with sodium chloride solution and dried in vacuo at 60–70°. It is a yellow-orange powder which dissolves in water with a yellow colour.

It dyes cotton in wet-fast yellow shades, the dyeing procedure being, for instance, that given in Example 409.

Dyestuffs having similar properties are obtained by using in Example 410, instead of the 35.5 g. of 2-(3'-nitrophenylamino)-4-cyclohexylamino - 6 - ethylamino-pyrimidine, equal amounts of 2-cyclohexylamino - 4 - (3'-nitrophenylamino) - 6 - ethylamino-pyrimidine or 2-ethylamino-4-(3' - nitrophenylamino) - 6 - cyclohexylamino-pyrimidine.

EXAMPLE 411

The three isomeric 3'-nitrophenylamino-cyclohexyl-amino-ethylamino-pyrimidines used as coupling components in Example 410 are produced as follows:

(A) 82.8 g. of m-nitroaniline are dissolved in a mixture of 750 g. of water and 750 ml. of acetone. 110 g. of 2,4,6-trichloropyrimidine dissolved in 100 ml. of acetone together with 10 normal aqueous sodium hydroxide solution are then added dropwise to the solution at such a rate that the pH of the reaction mixture remains between 4 and 6 throughout the addition of the trichloropyrimidine. Stirring is then continued for about 2½ hours, the reaction is terminated and a condensation product precipitates which is separated from the reaction liquor by filtration.

The residue consists of a mixture of about 75% by weight of 4-(3'-nitrophenylamino)-2,6-dichloro-pyrimidine and about 25% by weight of 2-(3'-nitrophenylamino)-4,6-dichloro-pyrimidine; it is then dissolved in 2000 ml. of 80° warm 1,2-dichlorobenzene, and, upon cooling, 112 g. of the 4-(3'-nitrophenylamino) isomer crystallizes (M.P. 233°).

From the mother liquor which still contains some 4-(3'-nitrophenylamino) isomer and the 2-(3'-nitrophenylamino) isomer, the latter can be isolated in the manner described below.

(B) 57 g. of 4-(3'-nitrophenylamino)-2,6-dichloro-pyrimidine obtained from step (A) are dissolved in 100 ml. of dioxan, and 160 ml. of water are added to the solution; to the resulting suspension there are added 30 g. of ethylamine in 30 ml. of water, the reaction mixture is then heated to 85–90° during 24 hours with stirring, and stirring is continued while the mixture cools down to room temperature. Technically pure 4-(3'-nitrophenylamino)-2-ethylamino-6-chloro-pyrimidine precipitates and is separated by filtration and dried.

(C) 58 g. of this product are mixed with an excess of undiluted cyclohexylamine, above the stoichiometrically required amount, and the mixture is heated in a closed vessel with stirring at 140–150° for 2 hours. 4-(3'-nitrophenylamino)-2-ethylamino-6-cyclohexylamino-pyrimidine of syrupy consistency is obtained, which can be used directly as coupling component in the production of the dyestuff in Example 410.

(D) The mother liquor obtained from step (A) is evaporated to dryness in vacuo, and about 25 g. of crude 2-(3'-nitrophenylamino)-4,6-dichloropyrimidine are obtained; the product has a melting point of 162–190°. Upon recrystallization of the crude product from 500 ml. of ligroin, the pure compound crystallizes upon cooling, while a small amount of residual 2-(3'-nitrophenylamino) isomer and some 4-(3'-nitrophenylamino)isomer remains in the ligroin mother liquor.

(E) Step (B) is then repeated, but using 57 g. of 2-(3'-nitrophenylamino)-4,6-dichloro-pyrimidine as starting material. When cooled down to room temperature, 40 g. of technically pure 2-(3'-nitrophenylamino)-4-ethylamino-6-chloro-pyrimidine precipitates and is separated by filtration and dried.

(F) Step (C) is repeated with this intermediate and a syrupy product consisting of 2-(3'-nitrophenylamino)-4-ethylamino-6-cyclohexylamino-pyrimidine is obtained which is used directly as coupling component in Example 410.

(G) Step (A) is repeated, but in lieu of 82.8 g. of m-nitroaniline employed therein, 59.4 g. of cyclohexylamine are used; from the resulting mixture of two isomers, the 2-cyclohexylamino-4,6-dichloro-pyrimidine is isolated as described and steps (E) and (F) are then repeated with the last-mentioned isomer as starting material for step (E); 2-cyclohexylamino-4-(3'-nitrophenylamino)-6-ethyl-amino-pyrimidine is obtained which can be used directly as coupling component in Example 410.

EXAMPLE 412

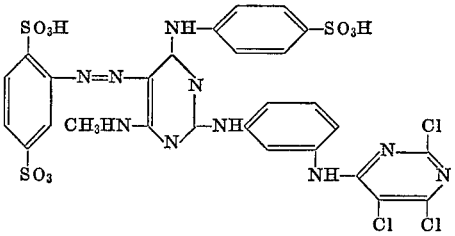

63 g. of 2-(3'-nitrophenylamino)-4-(4'-sulphophenyl-amino)-6-methylamino-pyrimidine, in the form of the sodium salt, are dissolved in 1500 ml. of water and the solution is slowly added dropwise at 90° to a vigorously stirred mixture of 40 g. of iron powder and 12 ml. of acetic acid in 400 ml. of water, whereupon reduction is performed for 2 hours. The temperature is allowed to drop to 70–80° and solid sodium carbonate is carefully added to the reaction mixture until a sample gives a pale pink reaction to phenolphthalein paper. After 15 minutes the reduction mixture is filtered over charcoal through a previously warmed filter; hydrochloric acid is added to the filtrate until the reaction is acid to congo paper, and the precipitated amine is filtered off, washed with sodium chloride solution and dried in vacuo at 60–70°.

38 g. of 2-(3'-aminophenylamino)-4-(4'-sulphophenyl-amino)-6-methylamino-pyrimidine, as the sodium salt, are dissolved with a neutral reaction in 700 ml. of water. 22 g. of finely pulverised 2,4,5,6-tetrachloropyrimidine are added at 80–90° and pH 7–8, care being taken to maintain the pH value by simultaneous dropwise addition of sodium carbonate solution. The reaction mixture is stirred until no more diazotisable amino compound can be traced and then cooled. 25.3 g. of a diazo solution of 1-amino-benzene-2,5-disulphonic acid is added to the mixture at 20–30° within 15 minutes. The pH of the reaction mixture is kept between 7 and 8 by dropwise addition of sodium carbonate solution. On completion of the coupling, the new dyestuff is completely precipitated by adding sodium chloride, filtered off and washed with sodium chloride solution. When dry, it is a yellow powder, which dissolves in water with a yellow colour.

Dyestuffs having similar properties are obtained by using instead of 63 g. of 2-(3'-nitrophenylamino)-4-(4'-sulphophenylamino)-6-methylamino - pyrimidine, equal amounts of 2-(4'-sulphophenylamino)-4-(3'-nitrophenyl-amino)-6-methylamino-pyrimidine or 2-methylamino-4-(3'-nitrophenylamino)-6-(4'-sulphophenylamino) - pyrimidine and otherwise following the procedure of Example 412.

EXAMPLE 413

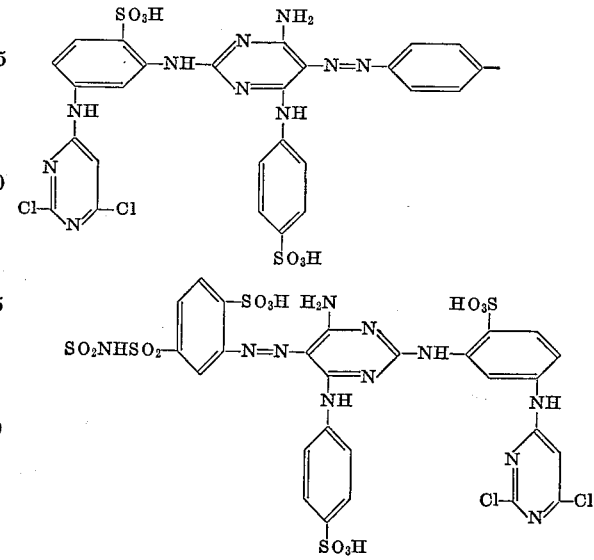

20.3 g. of 3,4'-diaminodiphenyl-1,1'-disulphimide-4-sulphonic acid are dissolved neutral in 400 ml. of water and, at 0–5°, the solution is diazotised with 25 ml. of 30% hydrochloric acid and 6.9 g. of sodium nitrite. The pH of the diazonium suspension is adjusted to 4.5 with sodium carbonate solution, whereupon it is added to 56.7 g. of 2-[6'-sulpho-3'-(2'',6''-dichloropyrimidyl-4''-amino)-phenylamino] - 4 - (4' - sulphophenylamino)-6-amino-pyrimidine dissolved in the form of the sodium salt in 1000 ml. of water. Care is taken to ensure that the pH does not drop below 8 by appropriate addition of sodium carbonate solution. On completion of the coupling reaction, the dyestuff is precipitated by adding sodium chloride, filtered off and washed with sodium chloride solution. When dried in vacuo at 60–70°, the dyestuff is a yellow powder which dissolves in water with a yellow colour.

Cotton is dyed with this dyestuff in yellow shades of good wet fastness, in the manner described in Example 409.

Yellow-dyeing reactive dyestuffs having similar properties are obtained by repeating the procedure of Example 413 but replacing the reactants employed therein by equivalent amounts of each set of tetrazo and coupling components given in the following Table XX.

30.6 g. of 4-acetylamino-4'-aminodiphenyl-3'-sulphonic acid, in the form of the sodium salt, ar dissolved in 500 ml. of water and, at 0–5°, the solution is diazotised with 25 ml. of 30% hydrochloric acid and 6.9 g. of sodium nitrite. The pH of the diazonium suspension is adjusted to 4.5 with sodium carbonate solution and then it is added in portions to a solution of 43 g. of 2-(3'-sulphophenyl-amino)-4-(3'-sulphophenylamino) - 6 - aminopyrimidine in 800 ml. of water, 20 g. of sodium carbonate being added simultaneously. On completion of the coupling, sufficient caustic soda is added to the coupling mixture to produce a 5% alkali solution and this is then heated to 70–80° until the acetylamino dyestuff has been completely saponified. After cooling, the reaction mixture is neutralised with hydrochloric acid and the dyestuff is precipitated by adding sodium chloride, filtered, washed with sodium chloride solution and dried in vacuo at 60–70°.

35.6 g. of the aminomonoazo dyestuff so obtained are dissolved with a neutral reaction in 900 ml. of water, 3.5 g. of sodium nitrite are added and the yellow solution obtained is added dropwise to 15 ml. of 10 N hydrochloric acid in 200 ml. of water. The yellow diazonium mixture which is acid to Congo paper, is then slowly added to a neutral suspension of 33.7 g. of 2-(2',4'-disulphophenyl-amino)-4-[6'sulpho - 3' - (4''-chloro-6''-amino-1'',3'',5''-

TABLE XX

| Ex. No. | Tetrazo component | Coupling component |
|---|---|---|
| 414 | 2,3'-diaminodiphenyl-1,1'-disulphimide | 2-[6'-sulpho-3'-(2'',5'',6''-trichloropyrimidyl-4''-amino)-phenylamino]-4-(2',4'-disulphophenylamino)-6-methylaminopyrimidine. |
| 415 | 3,3'-diaminodiphenyl-sulphone | Do. |
| 416 | 4,4'-diaminodiphenyl-methane | Do. |
| 417 | 4,4'-diaminodiphenyl-ketone | Do. |
| 418 | 3,3'-diaminodiphenyl-1,1'-disulphimide-4'-sulphonic acid | 2-[3'-(2'', 5'', 6''-trichloropyrimidyl-4''-amino)-phenylamino]-4-(2',5'-disulphophenylamino)-6-amino-pyrimidine. |
| 419 | 2,3'-diamino-4-chlorodiphenyl-1,1'-disulphimide | Do. |
| 420 | 2,2'-diamino-4,4'-dichloro-diphenyl-sulphide | Do. |
| 421 | 2,2'-diamino-4,4'-dichloro-diphenyl-sulphoxide | Do. |
| 422 | 4,4'-diaminodiphenyl-3-sulphonic acid | Do. |

EXAMPLE 423

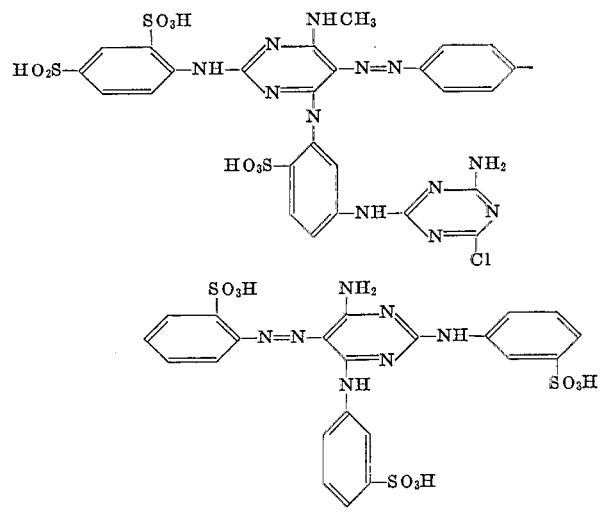

triazinyl - 2'' - amino)-phenylamino] - 6 - methylaminopyrimidine in 500 ml. of water and coupling is performed with the addition of sodium carbonate at a pH of 8. The new dyestuff is completely precipitated by the addition of sodium chloride, filtered, washed with sodium chloride solution and dried in vacuo at 60°. It is a yellow powder which dissolves in water with a yellow colour and dyes cotton in wet-fast yellow shades, using the dyeing procedure given in Example 409.

Other yellow disazo pyrimidine dyestuffs having similar properties are obtained if, with otherwise the procedure given above, equivalent amounts of each of the tetrazo and first and second coupling components given in the following Table XXI are used instead of the components mentioned in the above Example 423.

TABLE XXI

| Ex. No. | Tetrazo component | First coupling component | Second coupling component |
|---|---|---|---|
| 424 | 3-acetylamino-3'-amino-diphenyl-1,1'-disulphimide-4'-sulphonic acid. | 2-(4'-sulphophenylamino)-4-(4'-sulphophenylamino)-6-amino-pyrimidine. | 2-(2',4'-disulphophenylamino)-4-[3'-(2'',5'',6''-trichloropyrimidyl-4''-amino)-phenylamino]-6-amino-pyrimidine. |
| 425 | 4-acetylamino-4'-amino-diphenyl-3'-sulphonic acid. | do | Do. |
| 426 | do | do | 2-(2',4'-disulphophenylamino)-4-[3'-(4'',6''-dichlorotriazinyl-2''-amino)-phenylamino]-6-amino-pyrimidine. |
| 427 | do | 2-(3'-sulphophenylamino)-4-(3'-sulphophenylamino)-6-(3'-sulphophenylamino)-pyrimidine. | 2-[4''-(2'',6''-dichloropyrimidyl-4''-amino)-phenylamino]-4-(4'-sulphophenylamino)-6-methylamino-pyrimidine. |
| 428 | 3'-acetylamino-3'-amino-diphenyl-1,1'-disulphimide-4'-sulphonic acid. | do | Do. |

EXAMPLE 429

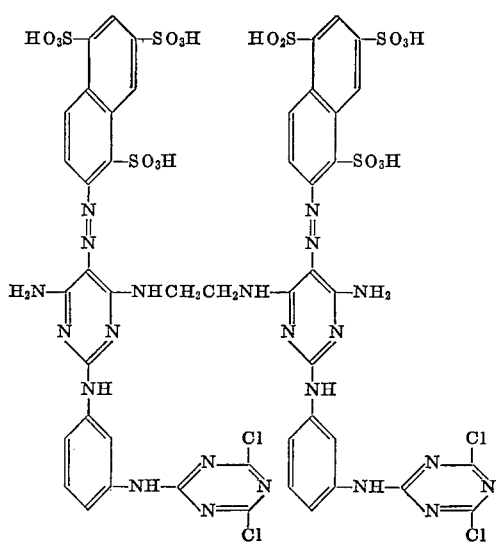

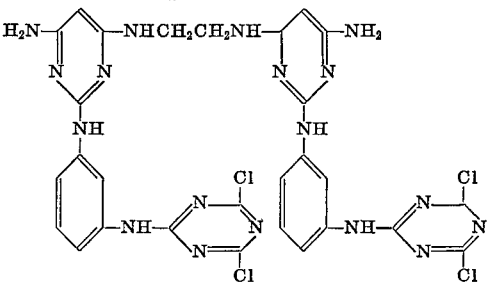

37.7 g. of the compound of the formula are dissolved in 500 ml. of acetone and 500 ml. of water, and 20 g. of sodium bicarbonate are added. A solution of 38.3 g. of diazotised 2-naphthylamine-1,5,7-trisulphonic acid is poured into this reaction mixture and the mixture is stirred until the coupling is complete. The dyestuff formed is precipitated by the addition of sodium chloride, filtered and washed with sodium chloride solution. After drying in vacuo at 40–50°, a brown-yellow powder is obtained which dissolves in water with a yellow colour and dyes cotton in wet-fast yellow shades, using the dyeing method given in Example 409.

EXAMPLE 430

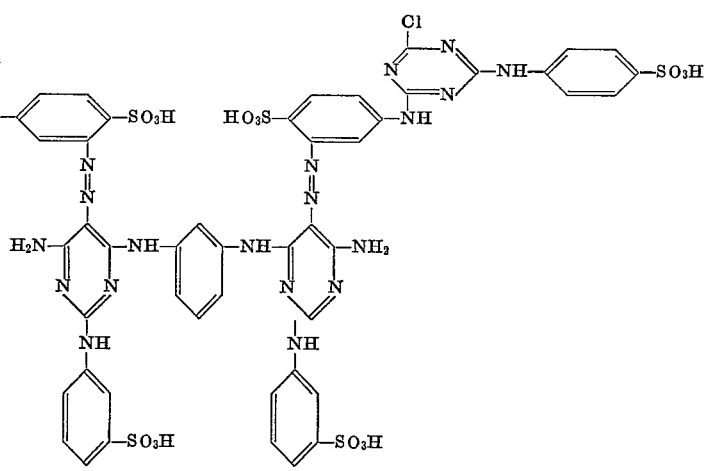

47.2 g. of 1 - amino - 3 - [4' - (4" - sulphophenylamino) - 6' - chloro - 1',3',5' - triazinyl - 2' - amino]-benzene-6-sulphonic acid are stirred into 300 ml. of water,

TABLE XXII

| Ex. No. | Diazo component | Coupling component |
|---|---|---|
| 431 | CH₂BrCHBrCOHN—⟨phenyl-SO₃H⟩—NH₂ | 1,3-bis-[2'-(4"-sulphophenylamino)-4'-amino-pyrimidyl-(6')-amino-]-benzene. |
| 432 | [Cl, Cl-triazinyl]-NH—⟨phenyl-SO₃H⟩—NH₂ | Do. |
| 433 | HO₃S—⟨phenyl⟩—NH-[Cl-triazinyl]-NH—⟨phenyl-SO₃H⟩—NH₂ | 1,2-bis-2'-(2",5"-disulphophenylamino)-4'-amino-pyrimidyl-(6')-amino]-ethane. |
| 434 | [Cl,Cl,Cl-pyrimidinyl]-HN—⟨phenyl-SO₃H⟩—NH₂ | Do. |

300 g. of ice and 25 ml. of 30% hydrochloric acid and, at 0–5°, diazotised with 6.9 g. of sodium nitrite. The pH of the diazonium suspension, which is acid to congo paper, is adjusted to 4.5 with sodium carbonate solution and it is then added in portions to 31.8 g. of the sodium salt of 1,3 - bis - [2' - (3" - sulphophenylamino)-4'-aminopyrimidyl-(6')-amino]-benzene and 20 g. of sodium carbonate in 700 ml. of water. On completion of the coupling, the dyestuff is precipitated by the addition of sodium chloride, filtered off and washed with sodium chloride solution. After drying in vacuo at 60–70°, it is a yellow-orange powder which dissolves in water with a yellow colour and dyes cotton in wet-fast yellow shades (see Example 409).

sion is then added at room temperature to an aqueous suspension of 51.9 g. of 2 - (3' - sulphophenylamino)- 4 - [3' - (2",6" - dichloropyrimidyl - 4" - amino)-phenylamino]-6-amino-pyrimidine and 30 g. of sodium carbonate. The dyestuff partially precipitates from the coupling mixture. It is completely precipitated by the addition of sodium chloride, filtered, washed with sodium chloride solution and dried. It dyes cotton and spun rayon in yellowish-red shades of good wet-fastness.

Disazo dyestuffs having similar properties are obtained if, with otherwise the same procedure, instead of the components given in Example 435, equivalent amounts of the aminoazo compounds and coupling components given in the following Table XXIII are used.

TABLE XXIII

| Ex. No. | Aminoazo compound | Coupling component | Shade |
|---|---|---|---|
| 436 | [structure] | [structure] | Reddish yellow. |
| 437 | do | [structure] | Do. |
| 438 | [structure] | [structure] | Do. |
| 439 | [structure] | [structure] | Do. |

Dyestuffs having similar properties are obtained with otherwise the same procedure but using instead of the components mentioned in the above example, equivalent amounts of any of the diazo components and coupling components, which can be coupled twice, mentioned in the Table XXII.

EXAMPLE 435

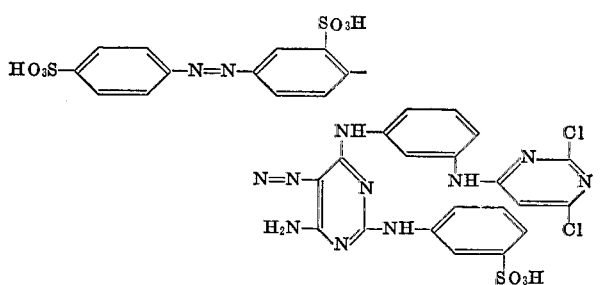

35.7 g. of 4 - aminoazobenzene - 3,4' - disulphonic acid are dissolved with a neutral reaction in 500 ml. of water and, at 0–5°, diazotised with 25 ml. of 30% hydrochloric acid and 6.9 g. of sodium nitrite. The diazonium suspen-

EXAMPLE 440

100 g. of previously well wetted wool are introduced at 50° into a dyebath which contains 1 g. of the dyestuff obtained according to Example 1, 5 g. of sodium sulphate and 3 ml. of 40% acetic acid in 5000 ml. of water. The bath is brought to the boil within 15 minutes and boiled for 1 hour. A very pure yellow wool dyeing is obtained and the bath is completely exhausted. The dyeing is distinguished by good fastness to light and excellent wet-fastness properties.

EXAMPLE 441

100 g. of Banlon-tricot are introduced into a solution having a temperature of 40° comprising 1 g. of the dyestuff prepared according to Example 188 dissolved in 5000 ml. of water and 3 ml. of 85% formic acid. While mixing well, the whole is brought to the boil within 30 minutes and dyed in the boiling bath for 60 minutes. The dyed goods are then rinsed thoroughly and dried. The resulting dyeing has a pure brilliant yellow shade; it is perfectly level—particularly free from streakiness—and possesses good fastness to light, water, perspiration, abrasion and washing at 50°, and also possesses a good depth of shade.

EXAMPLE 442

100 g. of Perlon fabric are introduced into a solution having a temperature of 40° comprising 1 g. of the dyestuff prepared according to Example 265, 2 g. of a highly hydroxyethylated reaction product of a polyamine and styrene oxide as well as 3 g. of ammonium sulphate dissolved in 5000 ml. of water. While mixing well, the whole is heated to 120° within 30 minutes in a closed container and then dyed for 60 minutes at this temperature. After cooling, the dyed goods are first rinsed with hot and then with cold water and dried. In this manner, a strong, perfectly level, brilliant scarlet-red dyeing with very good fastness to light, abrasion, water, perspiration and washing is obtained.

We claim:
1. A dyestuff of the formula

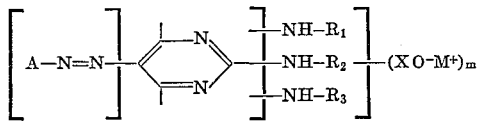

the molecule of which dyestuff contains at least three rings which are not fused with one another, two of which are the above pyrimidine and a carbocyclic or heterocyclic ring selected from benzene, naphthalene, pyridine, quinoline, benzotriazole and benzthiazole and the third ring is benzene or cyclohexane, and in which formula A represents the residue of an aromatic mono-amine selected from
(a) naphthyl substituted apart from any $X$—$O^-M^+$ group by one or two substituents selected from hydrogen, halogeno and a grouping

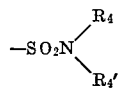

each of $R_4$ and $R_4'$ representing independently of the other hydrogen, lower alkyl or hydroxy-lower alkyl;
(b) pyridinyl-(3);
(c) benzotriazolyl-(4);
(d) quinolinyl-(8);
(e) benzothiazolyl-(2);
(f) 6-lower alkoxy-benzothiazolyl-(2); or
(g) a phenyl radical bearing apart from any $XO^-M^+$ group the following substituents:
(I) a first substituent selected from hydrogen, halogeno, cyano, nitro, trifluoromethyl, lower alkyl, lower alkoxy, lower alkylthio, lower alkanoyl, lower alkoxycarbonyl, lower alkylsulfonyl, phenoxycarbonyl; lower alkyl monosubstituted by hydroxy, lower alkoxy, lower alkanoyloxy, lower alkoxycarbonyl, cyano or the grouping —COO⁻M⁺; phenoxy; phenylthio; benzoyl; phenylsulfonyl; phenoxysulfonyl; the grouping —CH₂NH—CO—L; the grouping

and the grouping

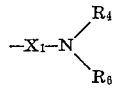

in which groupings
L represents lower alkyl, lower alkenyl, halogeno-lower alkyl, halogeno-lower alkenyl, phenyl or halogeno-phenyl,
$R_4$ has the aforesaid meaning,
$R_5$ represents lower alkanoyl, lower alkoxycarbonyl, lower alkylsulfonyl, benzoyl or phenylsulfonyl, $R_6$ represents hydrogen, lower alkyl, hydroxy-lower alkyl, cyclohexyl; benzyl; benzoyl; phenylsulfonyl; phenyl, chlorophenyl, bromophenyl or lower alkyl-phenyl and
$X_1$ represents $SO_2$ or $CO$; and
(II) a second substituent selected from hydrogen, bromine, chlorine, nitro and lower alkyl;
$R_1$ represents hydrogen, alkyl of from 1 to 8 carbon atoms, hydroxy-lower alkyl, lower alkoxy-lower alkyl, cyclohexyl; benzyl; phenyl or phenyl substituted by one or two substituents selected from lower alkyl and lower alkoxy,
$R_2$ represents hydrogen, alkyl of from 1 to 8 carbon atoms, hydroxy-lower alkyl, lower alkoxy-lower alkyl, cyclohexyl, lower alkyl substituted by one of the groups —$X_1$—$O^-M^+$; benzyl; a naphthyl radical as defined under (a) supra; or a phenyl radical bearing apart from any X—O⁻M⁻ group the following substituents,
(α) as first substituent hydrogen, halogeno, lower alkyl, lower alkoxy, lower alkylsulfonyl, lower alkanoyl, a phenylsulfonyl radical; benzoyl; phenoxy; the aforesaid grouping

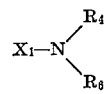

or the aforesaid grouping —CH₂—NH—CO—L; and
(β) and as second substituent hydrogen, chlorine or lower alkyl, and
$R_3$ represents a substituent as defined under $R_2$ or aminophenyl, nitrophenyl, lower alkylthio-phenyl, phenylthio-phenyl, lower alkyl-phenylthio-phenyl, pyridinyl-(3), quinolinyl-(8) or benzotriazolyl-(4);
and wherein the benzene nuclei of any aforesaid benzyl, benzoyl, phenoxy, phenylthio, phenylsulfonyl and phenoxysulfonyl radicals carry apart from any $XO^-M^+$ group no further substituents or are substituted by the following substituents:
(i) a first substituent selected from chlorine, nitro, lower alkyl and the aforesaid grouping

—CH₂—NH—CO—L and
(ii) a second substituent selected from hydrogen, chlorine and lower alkyl;
and any halogeno represents chlorine or bromine;
X represents $SO_2$, CO or $PO(O^-M^+)$;
M⁺ represents a hydrogen ion, an alkali metal ion or ammonium ion; and
m represents a number ranging from 1 to 2;
each grouping —$XO^-M^+$ being linked to an aromatic ring carbon atom, unless expressly defined otherwise.
2. A dyestuff as defined in claim 1, wherein
A represents monochlorophenyl, dichlorophenyl, monobromophenyl, dibromo phenyl, lower alkyl-monochloro-phenyl, lower alkanoylphenyl, lower alkylsulfonyl-phenyl, chloro-N,N-(di-lower alkyl)-carbamoylphenyl, lower alkyl-lower alkylsulfonyl-phenyl, carboxyphenyl, cyanophenyl, trifluoromethylphenyl, lower alkoxycarbonylphenyl, carbamoyl-phenyl, N,N-(di-lower alkyl)-carbamoyl-phenyl, N-lower alkyl-carbamoyl-phenyl, sulfamoyl-phenyl, N,N-(di-lower alkyl)-sulfamoylphenyl, lower alkyl-N,N-(di-lower alkyl)-sulfamoyl-phenyl, sulfamoyl-chloro-phenyl, N-lower alkyl-sulfamoyl-phenyl, lower alkyl-N-lower alkyl-sulfamoyl-phenyl;
R' represent hydrogen,
$R_1$ represents phenyl lower alkylphenyl, or lower alkoxyphenyl and each of
$R_2$ and $R_3$ represents hydrogen or lower alkyl;
one of said groups —$XO^-M^+$ being a group wherein X represents $SO_2$ and which is linked to a ring carbon atom of $R_1$.

3. A dyestuff as defined in claim 1, which is of the formula
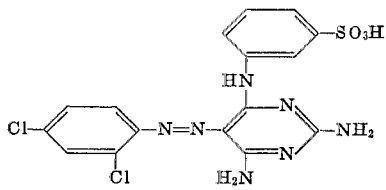
4. A dyestuff as defined in claim 1, which is of the formula
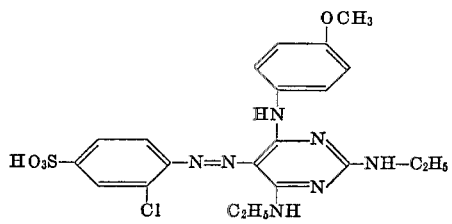
5. A dyestuff as defined in claim 1, which is of the formula
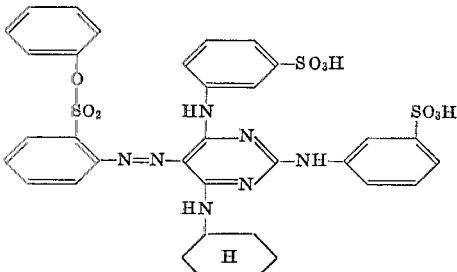
References Cited
UNITED STATES PATENTS
2,628,229  2/1953  Boon et al. _____ 260—154
3,042,648  7/1962  Lewis _____ 260—154X
FLOYD D. HIGEL, Primary Examiner
U.S. Cl. X.R.
8—4, 41R, 41B, 50; 117—138.8R, 138.8D, 144; 260—37N, 144, 153, 249.6, 249.8, 256.4N